US012519696B2

(12) United States Patent
Lucas et al.

(10) Patent No.: US 12,519,696 B2
(45) Date of Patent: Jan. 6, 2026

(54) SYSTEMS AND METHODS FOR ELASTIC EDGE COMPUTING

(71) Applicant: Veea Inc., New York, NY (US)

(72) Inventors: Roger William Lucas, England (GB); Clint Smith, New York, NY (US)

(73) Assignee: Veea Inc., New York, NY (US)

( * ) Notice: Subject to any disclaimer, the term of this patent is extended or adjusted under 35 U.S.C. 154(b) by 0 days.

(21) Appl. No.: 18/311,156

(22) Filed: May 2, 2023

(65) Prior Publication Data

US 2023/0362056 A1 Nov. 9, 2023

Related U.S. Application Data

(60) Provisional application No. 63/338,356, filed on May 4, 2022.

(51) Int. Cl.
*H04L 41/0893* (2022.01)
*H04L 41/0813* (2022.01)

(52) U.S. Cl.
CPC ...... *H04L 41/0893* (2013.01); *H04L 41/0813* (2013.01)

(58) Field of Classification Search
None
See application file for complete search history.

(56) References Cited

U.S. PATENT DOCUMENTS

| | | | |
|---|---|---|---|
| 10,440,043 B2 | 10/2019 | Glenn | |
| 10,609,016 B2 | 3/2020 | Goeringer et al. | |
| 10,944,780 B2 | 3/2021 | Glenn | |
| 11,252,049 B2 | 2/2022 | Scriber et al. | |
| 11,277,746 B2 | 3/2022 | Goeringer et al. | |
| 11,316,935 B2 | 4/2022 | Goeringer et al. | |
| 11,343,226 B2 | 5/2022 | Goeringer et al. | |
| 11,411,945 B2 | 8/2022 | Goeringer et al. | |
| 11,652,711 B1 | 5/2023 | Scriber et al. | |
| 11,863,405 B1 | 1/2024 | Scriber et al. | |
| 11,989,984 B2 | 5/2024 | Imanuel et al. | |
| 2022/0052925 A1* | 2/2022 | Vandikas | G06N 3/08 |
| 2022/0116289 A1* | 4/2022 | Ramanathan | H04L 41/5051 |
| 2022/0210649 A1 | 6/2022 | Goeringer et al. | |
| 2022/0345541 A1 | 10/2022 | Goeringer et al. | |
| 2023/0148301 A1 | 5/2023 | Goeringer et al. | |

* cited by examiner

*Primary Examiner* — Atta Khan
(74) *Attorney, Agent, or Firm* — The Marbury Law Group, PLLC

(57) ABSTRACT

An edge computing system configured to dynamically distribute in an Elastic Edge Computing Platform (ECP) that includes one or more processors or devices configured to perform dynamic grouping operations for the automatic formation of logical groups that may be used for more efficient resource sharing among edge nodes and devices. A processor in the ECP system may collect information about edge nodes and associated end devices within the ECP system, use the collected information to determine characteristics of the edge nodes and end devices, determine a group objective for each of groups, request membership to one of available groups, cluster the edge nodes based on the determined characteristics and group memberships, and dynamically adjust the group configurations or group memberships based on changes in conditions in the ECP system.

20 Claims, 65 Drawing Sheets

| Supported | Tier 3 | Tier 2 | Tier 1 |
|---|---|---|---|
| Device Only | Primary | N/A | N/A |
| Edge Accelerated Cloud Native | N/A | Optional | Primary |
| Edge Enhanced Device Native | Primary | Optional | N/A |
| Edge Native | Primary | Primary | N/A |

FIG. 2A

| Supported | FOG | MEC | Cloudnet |
|---|---|---|---|
| Node Devices | Routers, Switches, Access Points, Gateways | Servers | Datacenter In A Box |
| Node Locations | Varying Between End Devices And The Cloud | Local | Local |
| Software Architecture | Fog Abstraction Layer | Mobile NFV Edge Cloud | Mobile NFV Using A Cloudnet Agent |
| Proximity | One Or Multiple Hops | One Hop | One Hop |
| Internode Communication | Supported | Partial | Partial |
| Standards Based | No | Yes | No |

FIG. 2B

SYSTEMS AND METHODS FOR ELASTIC EDGE COMPUTING

RELATED APPLICATIONS

This application claims the benefit of priority to U.S. Provisional Application No. 63/338,356, entitled "Methods and Systems of a Versatile Elastic Edge Architecture" filed May 4, 2022, the entire contents of which are hereby incorporated by reference for all purposes.

BACKGROUND

Communication service providers (CSPs) have recognized the importance of placing computing, storage, and networking infrastructure near the points of application access. This has resulted in the development of edge computing, which may allow applications to be executed at the network's edge, resulting in reduced latency, enhanced throughput, and improved security and isolation.

Edge computing extends the cloud to the network edge, enabling faster response times and local computing power. Edge computing aims to provide context-sensitive storage and distributed computing by shifting some computing requirements from the cloud to the network's edge. In contrast to relying on cloud services, edge applications may be designed to run at the network's edge, enabling faster response times due to lower latency and local computing power.

The rapid growth of Internet of Things (IoT) devices and the increasing demand for real-time, data-driven applications have placed significant pressure on traditional computing infrastructures. Conventional two-tiered architectures in which IoT devices are connected directly to the cloud are unable to meet the requirements of low latency, mobility, and location awareness. Edge computing has emerged as a promising solution to address these and other challenges by enabling resource sharing and enhancing the performance of edge-based software applications.

SUMMARY

Various aspects include methods of dynamically grouping edge nodes within an elastic edge computing system, which may include collecting, by a processor in an edge node, information about edge nodes and associated end devices within the elastic edge computing system, using, by the processor, the collected information to determine characteristics of the edge nodes and end devices, determining, by the processor, a group objective for each of a plurality of available groups based on group configurations and the determined characteristics, requesting, by the processor, membership to one or more of the plurality of available groups based on the determined group objectives, clustering, by the processor, the edge nodes based on the determined characteristics and group memberships, and dynamically adjusting, by the processor, group configurations or the group memberships in response to changes in conditions in the elastic edge computing system.

In some aspects, determining the group objective for each of the plurality of available groups based on the group configurations and the characteristics of the edge node may include one or more of determining a specific set of device capabilities or resources required for each group, determining an intended function or service to be provided by the edge nodes within each group, determining a specific communication protocol or network architecture to be used by the edge nodes within each group, determining a desired level of redundancy or resiliency for each group, determining a specific geographic coverage area or proximity for each group, determining a specific set of security or privacy requirements for each group, determining a specific set of performance metrics or quality of service (QoS) criteria for each group, determining a specific set of energy consumption or power management requirements for each group, determining a specific set of device management or maintenance requirements for each group, determining a specific set of data storage or processing requirements for each group, or determining a distribution of containers within the edge nodes, between edge nodes, within end devices, between end devices, or between edge nodes and end devices.

In some aspects, the edge nodes and end devices run containers, the method further which may include dynamically allocating container groups within the edge nodes, between edge nodes, within end devices, between end devices, or between edge nodes and end devices.

Some aspects may further include determining relationships among the edge nodes and end devices across multiple dimensions, determining a set of common criteria representing similarities among the edge nodes and end devices for forming logical groups, automatically forming logical groups of edge nodes and end devices based on the determined common criteria, in which each group consists of devices sharing similar characteristics or devices configured to implement a corresponding group objective, allocating each edge node and end device to an appropriate logical group based on the identified relationships and common criteria, monitoring the performance or status of the edge nodes and end devices within each group and changes in the overall elastic edge computing system, and dynamically adjusting group memberships and configurations based on a result of the monitoring.

Some aspects may further include dynamically forming, by the processor, a group based on two or more of a unique identifier parameter, edge node capability parameter, an edge node location parameter, a subnet parameter, an application parameter, a classification parameter, or an amount of time one or more of the edge nodes or associated end devices have been active and connected to the elastic edge computing system.

In some aspects, the logical groups may include overlapping groupings and multiple group memberships. In some aspects, generating the N-dimensional correlation for edge nodes and end devices across multiple dimensions may include one or more of generating the N-dimensional correlation for edge nodes and end devices based on collected information, the collected information identifying at least one or more of device capabilities, scalability, device location, network parameters, application requirements, device classification, power consumption, security requirements, privacy requirements, device reliability, resource availability, or device interoperability information, or using machine learning or clustering to generate the N-dimensional correlation for edge nodes and end devices.

Further aspects may include a computing device (edge node, etc.) having a processor configured with processor-executable instructions to perform various operations corresponding to the methods discussed above.

Further aspects may include a computing device having various means for performing functions corresponding to the method operations discussed above.

Further aspects may include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings, which are incorporated herein and constitute part of this specification, illustrate exemplary aspects of the claims, and together with the general description given above and the detailed description given below, serve to explain the features of the claims.

FIGS. 2A and 2B are tables that illustrate relationships between several types of computing paradigms, edge computing tiers, and supported applications.

DETAILED DESCRIPTION

Figure 1A:
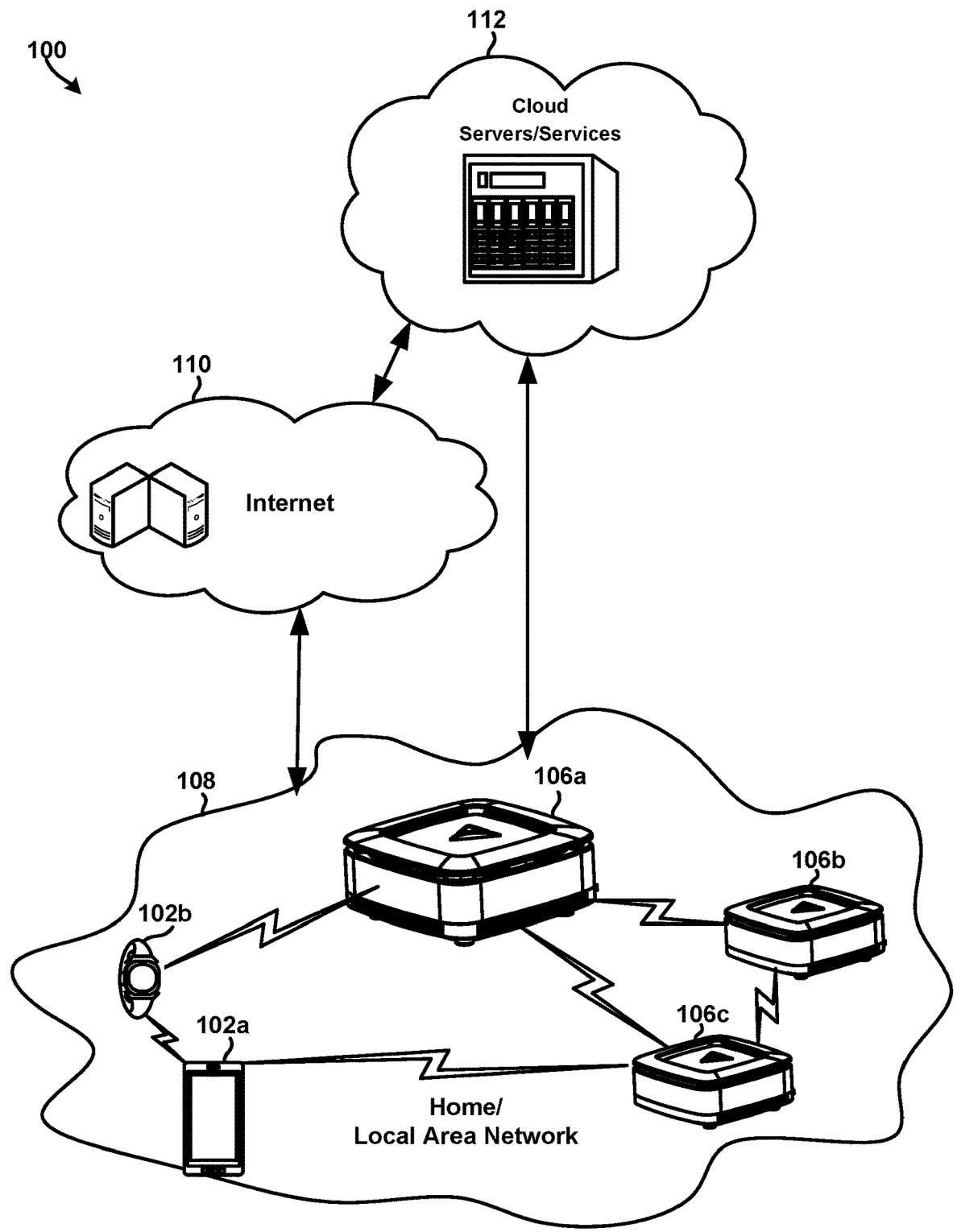
FIG. 1A is a component block diagram that illustrates an example edge computing system suitable for implementing the various embodiments.

Various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

In overview, the various embodiments may include an elastic edge computing system, such as an Elastic Edge Computing Platform (ECP), that includes one or more processors or devices configured to significantly enhance or improve the performance and functioning of a network or computing devices by optimizing resource allocation, reducing latency, and increasing resilience. Some embodiments may include a dynamic grouping method that may allow for the automatic formation of logical groups based on common criteria, enabling more efficient resource sharing among edge nodes and devices. Some embodiments may include a network automation method that simplifies network management by performing functions without manual intervention and adapting to specific services or network outages. Some embodiments may include a network slicing method that facilitates the reallocation of resources within or between groups, allowing for better network performance and addressing factors such as power stability and backhaul reliability. Some embodiments may include a reallocation method that reduces or minimizes latency by strategically relocating applications to the most suitable edge nodes, devices, or cloud systems. Some embodiments may include an application division method that efficiently divides software applications based on their computational and application requirements, offloading parts of the applications to appropriate resources within the elastic edge computing network. Some embodiments may include an enforce rules and policies method that ensures adherence to established rules and policies via a mesh network, managing inputs from various channels and distributing the computing mesh across nodes and devices. Individually, each of these methods may improve the performance and functioning of a network or computing devices within the elastic edge computing system. Collectively, these methods and operations may further contribute to a more agile, robust, and high-performing network or computing device within the elastic edge computing system.

The term "computing device" may be used herein to refer to any one or all of quantum computing devices, edge devices, Internet access gateways, modems, routers, network switches, residential gateways, access points, integrated access devices (IAD), mobile convergence products, networking adapters, multiplexers, personal computers, laptop computers, tablet computers, user equipment (UE), smartphones, personal or mobile multi-media players, personal data assistants (PDAs), palm-top computers, wireless electronic mail receivers, multimedia Internet enabled cellular telephones, gaming systems (e.g., PlayStation™, Xbox™, Nintendo Switch™, etc.), wearable devices (e.g., smartwatch, head-mounted display, fitness tracker, etc.), IoT devices (e.g., smart televisions, smart speakers, smart locks, lighting systems, smart switches, smart plugs, smart doorbells, smart doorbell cameras, smart air pollution/quality monitors, smart smoke alarms, security systems, smart thermostats, etc.), media players (e.g., DVD players, ROKU™, AppleTV™, etc.), digital video recorders (DVRs), automotive heads up displays, portable projectors, 3D holographic displays, and other similar devices that include a programmable processor and communications circuitry for providing the functionality described herein.

The terms "user equipment" (UE) "end device" (ED) and "user device" (UD) may be used interchangeably herein to refer to any one or all of the wireless devices, mobile devices, internet-of-things (IOT) devices, cellular telephones, smartphones, personal or mobile multi-media players, personal data assistants (PDA's), laptop computers, tablet computers, ultrabooks, palm-top computers, wireless electronic mail receivers, multimedia Internet enabled cellular telephones, wireless gaming controllers, smart cars, connected vehicles, wearable device (e.g., HMD, etc.) and similar electronic devices which include a programmable processor, a memory and circuitry for sending and/or receiving wireless communication signals. While various embodiments are particularly useful in wireless devices such as smartphones and tablets, the embodiments are generally useful in any electronic device that includes wireless communications capabilities and a programmable processor suitable for executing software applications.

The term "container" may be used herein to refer to a software component that supports virtualization technology, enables the abstraction (or virtualization) of computing resources, and/or separates software applications from their underlying infrastructure (thus making them infrastructure agnostic). For example, a container may be one of a plurality of isolated user space instances operating on the kernel, each of which operates under the illusion of having full or exclusive access to the processors, peripherals, memory and I/O of the computing system. Application programs running inside of a container may only see the container's contents and devices assigned to that container. In addition to these isolation mechanisms, a container or kernel may include resource-management features that limit the impact of one container's activities on other containers. In the various embodiments, the functions described herein may be run as a native program to the individual hardware elements, be deployed as a virtual machine or machines or be deployed in containers.

The term "computing mesh" may be used herein to refer to any or a variety of techniques and technologies for distributing or linking various computing resources that are connected by wireless or wired communication links, but which are not otherwise connected to each other. This may include a software defined network in which computing resources are located in one node/component and the data used for the program or application resides in another node/component as part of the computing mesh. A computing mesh typically utilizes a self-organizing network in which computing resources are shared between different nodes in a computing mesh environment.

The term "application mesh" may be used herein in to refer to any or a variety techniques and technologies used for running and executing applications across different physical devices. The devices may be connected via wireless or wired communication links, or a combination thereof. An application mesh may include different components or processes of the application running on different nodes/components based on computing resources, sensors, or auxiliary devices attached to each node/component, enabling the application to utilize all the resources it needs to perform the functions of the application using different nodes/components concurrently.

The term "connectivity mesh" may be used herein in to refer to any or a variety of techniques and technologies used for connecting different computing platforms for the ability to share computing resources, run and execute applications, or provide connectivity with other devices or systems. The connectivity mesh may also be a self-organizing network (SON) network, with an ability to adapt and provide the optimum connectivity based on node/component availability, latency and other parameters necessary to sharing computing resources, performing application mesh techniques or providing a self healing backbone for delivering and receiving information.

The term "network slicing" may be used herein to refer to is a network computing technique that may allow a single physical network infrastructure that includes multiple nodes to be divided into multiple virtual networks or "slices", each of which may be customized to meet the specific requirements of a particular type of service or application. This may allow a single network to support a diverse range of services, each with its own set of performance and functional requirements. The various embodiments may implement network slicing in various ways, including vertical slicing, horizontal slicing, and diagonal slicing. Vertical slicing may involve dividing the network into layers, with each layer dedicated to a specific type of service or application. Horizontal slicing may involve dividing the network into horizontal planes, each of which may be dedicated to a particular service or application. Diagonal slicing may involve a combination of vertical and horizontal slicing, with some slices combining elements from multiple layers or planes of the network. Network slicing may allow for a more efficient and flexible delivery of diverse services over a single network infrastructure. Network slicking may also help reduce the complexity of network management by allowing each slice to be independently managed and configured to meet the specific needs of the service it is supporting.

The term "virtual local area network" (VLAN) may be used herein to refer to a logical grouping of devices that are connected to a network. VLANs may allow administrators to create logical groupings of devices based on their function or role within the network, rather than their physical location. For example, a VLAN could be created for devices that perform a specific function within the network. VLANs may be used to segment a network into smaller, virtual subnetworks, and are typically implemented using software-defined networking (SDN) technologies. In the various embodiments, VLANs may be used to combine sub networks into a single network layer.

The term "edge computing," may be used herein to refer to system, techniques or technologies that improve the user experience by offloading computation-intensive tasks to edge devices or servers deployed at the edge of the networks, thereby freeing up resources on the computing device and/or allowing the computing device to perform more computations or more resource-intensive tasks. Edge computing may reduce latency, increase performance, and improve the efficiency of data processing by bringing computation and storage closer to the devices generating and/or using the data.

The term "edge device" may be used herein to refer to a computing device that includes a programmable processor and communications circuitry for establishing communication links to consumer devices (e.g., smartphones, UEs, IoT devices, etc.) and/or to network components in a service provider, core, cloud, or enterprise network. For example, an edge device may include or implement functionality associated any one or all of an access point, gateway, modem, router, network switch, residential gateway, mobile convergence product, networking adapter, customer premise device, multiplexer and/or other similar devices. An edge device may also include various memories and an edge database. Some embodiments may include an edge computing system that includes one or more edge devices, any or all of which may be configured to perform or implement edge computing techniques or technologies.

The term "edge node" may be used herein to refer to any computing device that is included in a network that includes edge computing capabilities. As such, the term edge node may be used herein to refer to edge devices, user devices, consumer devices (e.g., smartphones, UEs, IoT devices, etc.).

The term "edge application" may be used herein to refer to software application is designed to run at the edge of a network (network edge), rather than in a remote data center or cloud service. An edge application may utilize a distributed network that provides computing power and capabilities close to the devices accessing or providing services. An edge application may utilize local computing power for faster response times and lower latency than would be available from a centralized or cloud service. The edge application may utilize computing resources that are in a remote data center or cloud service for parts of the edge application.

The term "network edge" may be used herein to refer to the point at which data is processed or analyzed as close as possible to its source, while balancing other trade-offs such as performance, latency, and power consumption. That is, network edge computing generally includes the use of distributed computing resources, such as edge devices and servers, to process, analyze, and store data as close to its source as possible. The "network edge" is the point at which this processing and analysis takes place. The specific location of the network edge may vary depending on the context in which it is being used. For example, in a home network, the edge of the network may be different from the edge of a large enterprise network. As another example, for an IOT device, the network edge may be located on the device itself, allowing an edge application to process and analyze data locally without needing to send it to a central server or cloud for processing. In other cases, the network edge may be located at the boundary between a local network and a wider network, such as the internet, allowing for the processing of data as it enters or leaves the local network.

The specific location of the network edge may vary depending on the needs and goals of the system in which it is being used. Due to a lack of standardization in the edge computing field, there is no one clear and widely agreed upon definition of what constitutes the network edge. For example, Fog Computing, Mobile Edge Computing (MEC), and Cloudlets are three popular edge computing solutions that each have their own distinct characteristics and definitions. Since there is a lack of standardization in the edge computing field, each vendor may have their own specific definitions for these technologies.

Some embodiments may provide, improve upon, include, use, or implement Fog Computing. Fog Computing is a decentralized computing paradigm that brings computing and data storage closer to the edge of the network, where data is generated and used. It is meant to complement cloud computing by extending its capabilities to the edge of the network, where devices and sensors generate and collect data. Fog Computing aims to reduce the latency and bandwidth requirements of cloud computing by performing some processing and storage locally, rather than sending all data to a remote data center for processing. This may be especially useful for Internet of Things (IoT) applications, where devices and sensors generate large amounts of data and may have limited connectivity or computing resources. In Fog Computing, processing is mainly performed in the local area network (LAN), in an IoT gateway, and/or in the Fog computing node. Systems that implement or use Fog Computing techniques or technologies generally experience lower latency (e.g., compared to cloud computing, which is located far from the end user).

Some embodiments may provide, improve upon, include, use, or implement Mobile Edge Computing (MEC). MEC is a computing paradigm that brings computing and data storage capabilities to the edge of the network, specifically in the base stations of cellular networks and edge computing platforms. It aims to reduce the latency and bandwidth requirements of cloud computing by performing some processing and storage locally, rather than sending all data to a remote data center for processing. MEC may be especially useful for mobile fixed applications, where devices may have limited connectivity or computing resources and may require low-latency access to data and services. MEC may be a virtual platform (part of a larger NFV cloud service) that may be used to offload applications from the cloud to the edge of the network.

Some embodiments may provide, improve upon, include, use, or implement Cloudlets. A Cloudlet is a small data center that is located at the edge of the network, typically one hop away from end devices. It is designed to provide computing and data storage capabilities to the edge of the network, allowing devices to offload computing to the Cloudlet with resource provisioning similar to that of a data center. Cloudlets may be especially useful for applications that require low-latency access to data and services, or for devices that have limited computing resources. A Cloudlet may be an NFV environment that is running virtual machines (VM) locally with a hypervisor at the edge of the network. Cloudlets are meant to be small-box data centers that are normally deployed at one hop away from end devices. Cloudlets may be based on dedicated devices with capacities similar to a data center but on a lower scale present in logical vicinity to the consumers, enabling end devices to offload computing to the Cloudlet devices with resource provisioning similar to that of a data center.

Some embodiments may provide, improve upon, include, use, or implement Dew computing. Dew computing, also known as "data-centric computing" or "data-driven computing," is a computing paradigm that focuses on the data itself, rather than the processing of the data. Dew computing systems are generally designed to make it easy to access, store, and manipulate data. This may involve storing data in a centralized repository and providing tools and interfaces for accessing and manipulating the data. Another important aspect of dew computing is the ability to process data at the edge of the network, rather than in a centralized location, to reduce latency and improve the efficiency of the system (data does not have to be transferred over long distances). A dew computing system may include a special purpose component (e.g., processor, server, service, etc.) that resides inside the user devices, and an on-premises computer software-hardware organization paradigm in a cloud server/service. The on-premises computers may be configured to provide functionality independent of cloud server/service and/or to work in conjunction with the cloud server/service.

FIG. 1A illustrates an example edge computing system 100 suitable for implementing the various embodiments. In the example illustrated in FIG. 1A, the edge computing system 100 includes end devices 102a, 102b and edge devices 106a-106c, any or all of which may be included in a home or local area network 108 and linked to the internet 110 and cloud servers/services 112 via wired or wireless communication links. In various embodiments, any or all of the end devices 102 and/or edge devices 106a-106c may include one or more processors that are configured to implement the functionality described with reference to the edge computing system 100.

The edge computing system 100 may be configured to overcome various limitations of conventional solutions, such as limitations related to resource shortages on resource-constrained end devices 102 that run complex software applications and/or for which the performance, end-to-end latency and/or energy consumption characteristics of end devices 102 may have a direct, significant and/or user-perceivable impact on the user experience.

For example, the edge computing system 100 may include or work in conjunction with an end device 102, a cloud server 112 and one or more edge devices 106a-106c to offload computationally intensive tasks from an end device 102 to the one or more edge devices 106a-106c and/or to one or more cloud servers 112. As another example, the edge computing system 100 may offload the main components of a software application from an end device 102 to one or more edge devices 106a-106c.

In some embodiments, the edge computing system 100 may be configured to allow for the sharing of common resources (e.g., hardware resources, software resources, etc.) between multiple devices (e.g., edge devices 106a-106c). For example, edge devices 106a-106c may be configured to operate as a computing mesh in which the computing resources of each of the edge devices 106a-106c are shared with one another. The edge computing system 100 may intelligently and dynamically utilize or allocate edge devices resources based on their workloads, local computation capacities, performance requirements, etc. The sharing of common resources may improve the performance and functioning of the edge computing system (e.g., by improving the performance of latency-sensitive edge-native applications, etc.).

In various embodiments, edge devices 106a-106c may implement homogenous or heterogeneous computing architectures or environments. For example, edge devices 106a-106c may be homogeneous in that they have identical platforms and software versions. Similarly, edge devices 106a-106c may be heterogeneous in that they each include different operating systems, hardware architectures, processors, storage capabilities, wireless and wired capabilities, kernel capabilities, backhaul capabilities, software, or firmware versions, etc. In some embodiments, edge devices 106a-106c may be included as part of a processor cluster architecture (e.g., a synchronous processor cluster architecture, an asynchronous or heterogeneous processor cluster architecture, etc.).

Figure 1B:
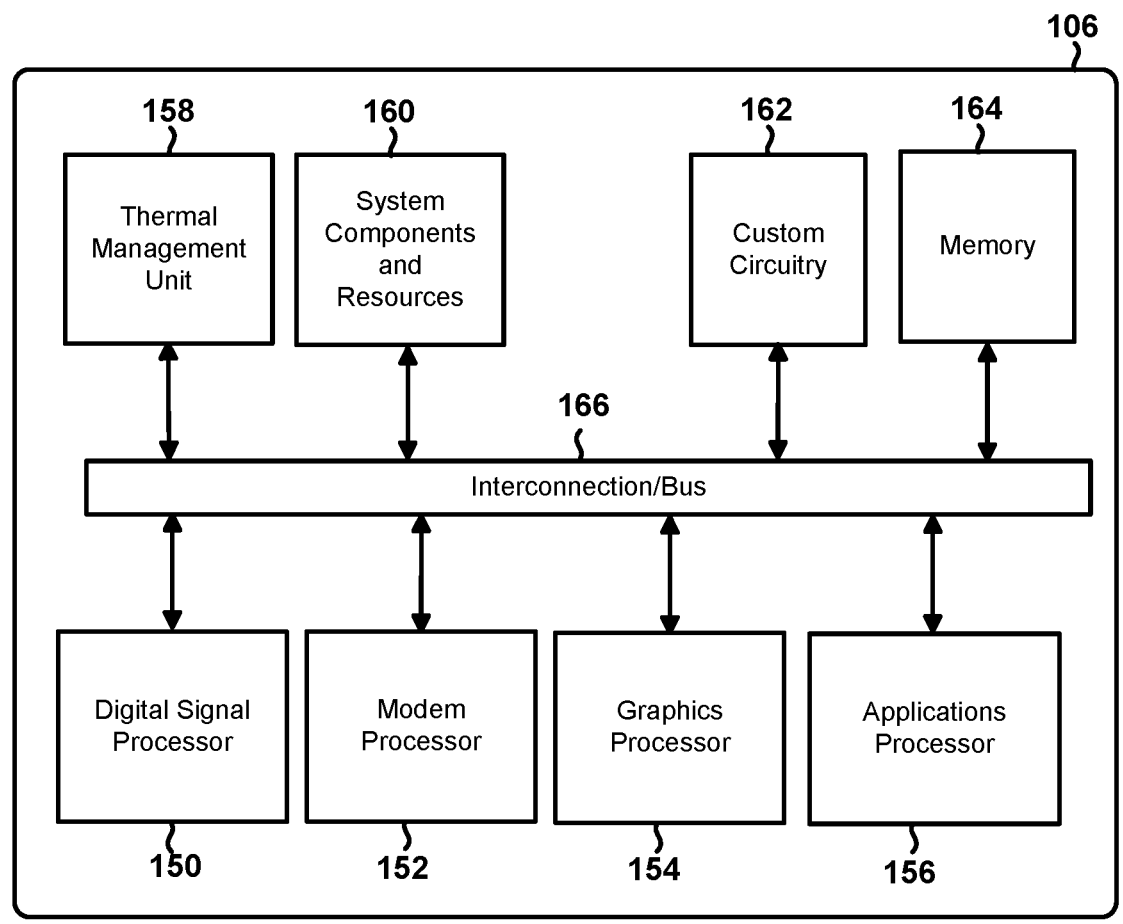
FIG. 1B is a component block diagram illustrating an example system on chip (SOC) that could be configured to implement an edge node (e.g., edge computing device, end device, etc.) in accordance with some embodiments.

FIG. 1B illustrates components that could be included in an edge device 106 configured in accordance with some embodiments. In the example illustrated in FIG. 1B, the edge device 106 includes a digital signal processor (DSP) 150, a modem processor 152, a graphics processor 154, an application processor 156 connected to one or more of the processors, memory 164, custom circuitry 162, system components and resources 160, a thermal management unit 158, and an interconnection/bus module 166. The edge device 106 may operate as a central processing unit (CPU) that carries out the instructions of software application programs by performing the arithmetic, logic, control, and input/output (I/O) operations specified by the instructions.

Each processor 150, 152, 154, 156 may include one or more cores, and each processor/core may perform operations independent of the other processors/cores. For example, the edge device 106 may include a processor that executes a first type of operating system (e.g., FreeBSD, LINUX, OS X, etc.) and a processor that executes a second type of operating system (e.g., MICROSOFT WINDOWS). In addition, any or all of the processors 150, 152, 154, 156 may be included as part of a processor cluster architecture (e.g., a synchronous processor cluster architecture, an asynchronous or heterogeneous processor cluster architecture, etc.).

The processors 150, 152, 154, 156 may be interconnected to one another and to the memory 162, system components and resources 160, custom circuitry 162, and the thermal management unit 158 via the interconnection/bus module 166. The interconnection/bus module 166 may include an array of reconfigurable logic gates and/or implement a bus architecture (e.g., CoreConnect, AMBA, etc.). Communications may be provided by advanced interconnects, such as high-performance networks-on-chip (NoCs).

The thermal management unit 158 may be configured to monitor and manage the device's junction temperature, surface/skin temperatures, and/or the ongoing consumption of power by the active components that generate thermal energy in the device. The thermal management unit 158 may determine whether to throttle the performance of active processing components (e.g., CPU, GPU, LCD brightness), the processors that should be throttled, the level to which the frequency of the processors should be throttled when the throttling should occur, etc.

The system components and resources 160 and custom circuitry 162 may manage sensor data, analog-to-digital conversions, wireless data transmissions, and perform other specialized operations, such as decoding data packets and processing video signals. For example, the system components and resources 160 may include power amplifiers, voltage regulators, oscillators, phase-locked loops, peripheral bridges, temperature sensors (e.g., thermally sensitive resistors, negative temperature coefficient (NTC) thermistors, resistance temperature detectors (RTDs), thermocouples, etc.), semiconductor-based sensors, data controllers, memory controllers, system controllers, access ports, timers, and other similar components used to support the processors and software clients running on a device. The custom circuitry 162 may also include circuitry to interface with other computing systems and peripheral devices, such as wireless communication devices, external memory chips, etc.

The edge device 106 may further include an input/output module (not illustrated) for communicating with resources external to the SOC, such as a clock and a voltage regulator. Resources external to the SOC (e.g., clock, etc.) may be shared by two or more of the internal SOC processors/cores.

In addition to the edge device 106 discussed above, the various embodiments may include or may be implemented in a wide variety of computing systems, which may include SOCs, SIPs, a single processor, multiple processors, multi-core processors, or any combination thereof.

Edge nodes (e.g., edge device 106, end device 102, etc.) may be resource-constrained, leading to congestion and a need to balance demand and resource usage. However, conventional solutions do not allow for increasing computing resources and wireless capacity on-demand, which may lead to either a reduction in offered load or increased queuing at the edge node.

Some embodiments include an Elastic Edge Computing Platform (ECP) system that redistributes resource consumption among edge nodes in a homogeneous or heterogeneous edge environment, allowing for augmentation of user device capacity (e.g., by transferring computation to other more resourceful devices, etc.). Said another way, the ECP system may offload computations for edge nodes, thus increasing available resources for resource-constrained nodes.

Edge nodes (ENs) may restrict the types of applications and user experiences, or failover to cloud resources, in response to experiencing congestion, resource constraints, or resource scarcity. In some embodiments, rather than failing over to cloud resources, the ECP system may use a compute distribution scheme to overcome resource constraints and resource scarcity. The ECP system may enhance the types of applications and user experiences available on user devices. The ECP system may offload computations for edge nodes, whether mobile or IoT devices. The ECP system may augment the capacity of mobile devices by transferring computation to more resourceful devices or servers located elsewhere.

Figure 1C:
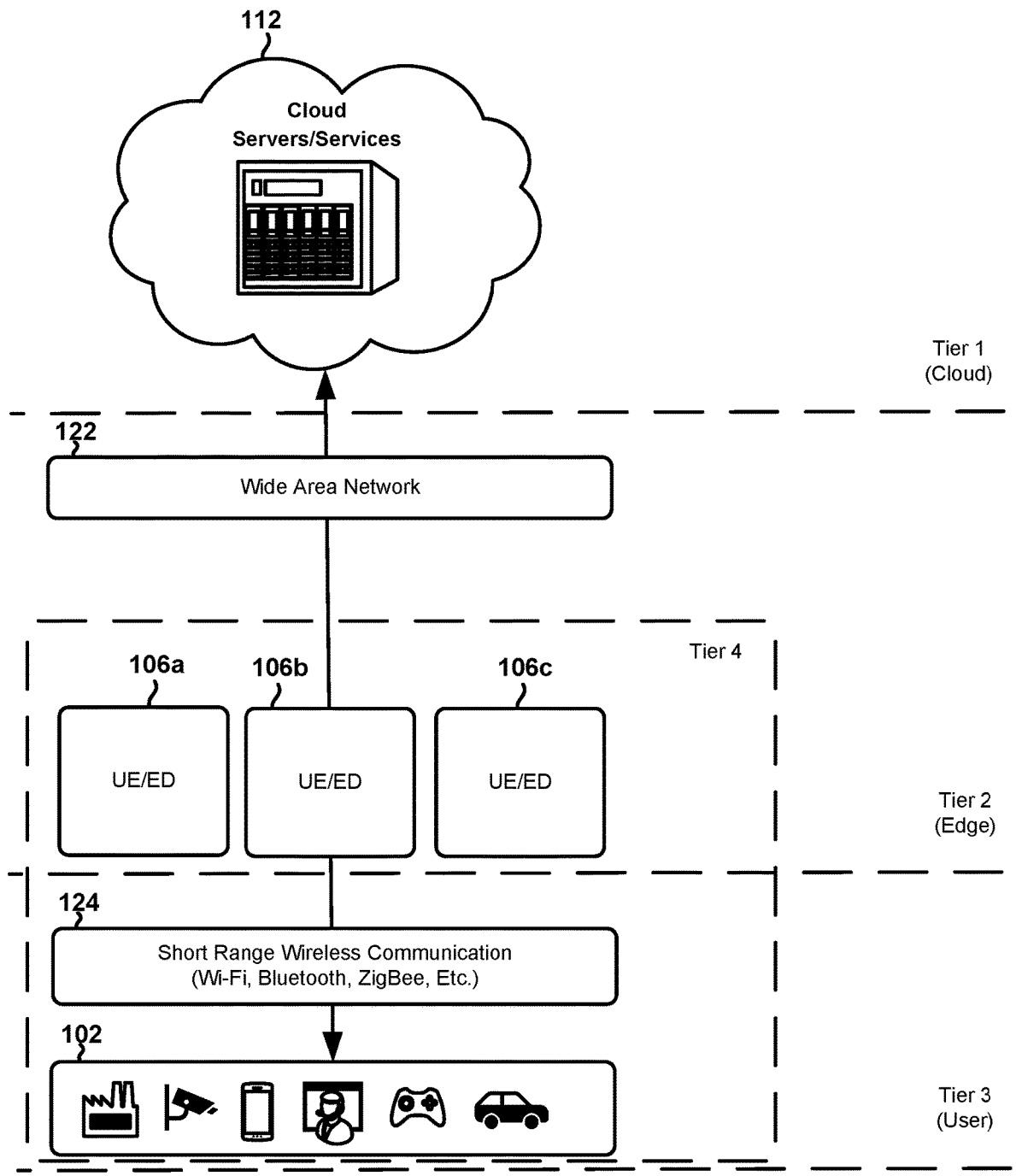
FIG. 1C is a component block diagram that illustrates an example edge computing system that is divided into tiers in accordance with some embodiments.

FIG. 1C illustrates an example edge computing system that is divided into tiers in accordance with some embodiments. The edge computing system 200 may include cloud servers/services 112 coupled to edge devices 106a-106c via a wide area network (WAN) 122. The edge devices 106a-106c may be coupled to the user devices 102 and/or each other via short range wireless communications 124, such as Wi-Fi, Bluetooth, ZigBee, etc.

The user devices 102 and edge devices 106a-106c may be edge computing nodes (ENs) that are used to support edge computing, which involves the processing and analysis of data at the edge of a network, rather than in a centralized data center. ENs may be equipped with both wired and wireless connectivity, which may allow them to communicate with other devices, such as other edge devices 106a-106c that connect to them and other ENs.

As mentioned above, the components illustrated in FIG. 1C are organized into divided into tiers. The cloud servers/services 112 may be included as part of a first tier (Tier 1). The edge devices 106a-106c may be included in the second tier (Tier 2). The user devices 102 may be included in a third tier (Tier 3). Some embodiments may include a fourth tier that straddles the second and third tiers (Tiers 2 and 3). The fourth tier may include a Dew computing node (not illustrated separately in FIG. 1C) and/or the versatile ECP system 350 architecture disclosed herein. For example, in some embodiments, the ECP system 350 may be included in the fourth tier.

A computing system may include three tiers: Tier 1 may represent the upper level, which includes cloud services like AWS, Azure, or private data networks; Tier 2 may include the edge computing layer; and Tier 3, the lowest level, may include the edge nodes being served. Dew computing may serve as a fourth tier, straddling tiers 2 and 3.

In an edge computing system (which may encompass tiers 2, 3, or a combination thereof) the available resources may be constrained by the edge node itself. The types of applications supported by the edge computing device may depend on the device's capability and its position within the network hierarchy. Each of the tiers may support different application types differently.

FIG. 2A is a table that illustrates the different types of edge computing tiers and what types of applications may be supported in each tier. For example, device-only applications are primarily supported on the third tier (Tier 3). Edge accelerated and/or cloud-native applications are primarily supported on the first tier (Tier 1), but could optionally be run on the second tier (Tier 2). Edge-enhanced and/or device-native applications are primarily supported on the third tier (Tier 3) but could also optionally be run on the second tier (Tier 2). Edge native applications are primarily supported on both the second and third tiers (Tier 2 and Tier 3).

FIG. 2B is a table that illustrates attributes for Tier 2 computing paradigms (e.g., Fog Computing, MEC, Cloudlets, etc.) and how they relate to different edge types. As discussed above, Fog computing supports ubiquitous connected devices and the processing primarily occurs in the local area network and in an gateway or fog node, offering lower latency compared to cloud computing, which is farther from the end-user. MEC extends the cloud to edge nodes for an enhanced user experience, and is a virtual platform that is part of a larger NFV cloud service. A Cloudlet is an NFV environment that runs virtual machines (VM) locally with a hypervisor at the network's edge.

With reference to FIGS. 1A-2B, traditional two-tiered architecture schemes, which connect IoT devices directly to the cloud, may not always fulfill requirements related to low latency, mobility of the "things," and location awareness. A potential solution to this challenge is a multi-tiered architecture, such as a three-tiered system, in which an edge hub or gateway is positioned between the end devices and the cloud. In some cases, the edge hub or gateway may be able to perform functions with the end device without necessitating the involvement of the next higher layer, making a two-tier architecture adequate for accomplishing its objectives. However, certain edge-cloud applications incorporate features from both edge and cloud, resulting in various factors that could impact the deployment, provisioning, or operation of the edge nodes. In addition, conventional architectures are not designed to share common resources among multiple edge nodes within an edge computing ecosystem.

The ECP system may allow for the sharing of common resources, which may improve the performance of latency-sensitive edge-native applications. This enhanced architecture may enable more effective resource allocation and better overall functionality for IoT applications that demand low latency, mobility, and location awareness.

Figure 3A:
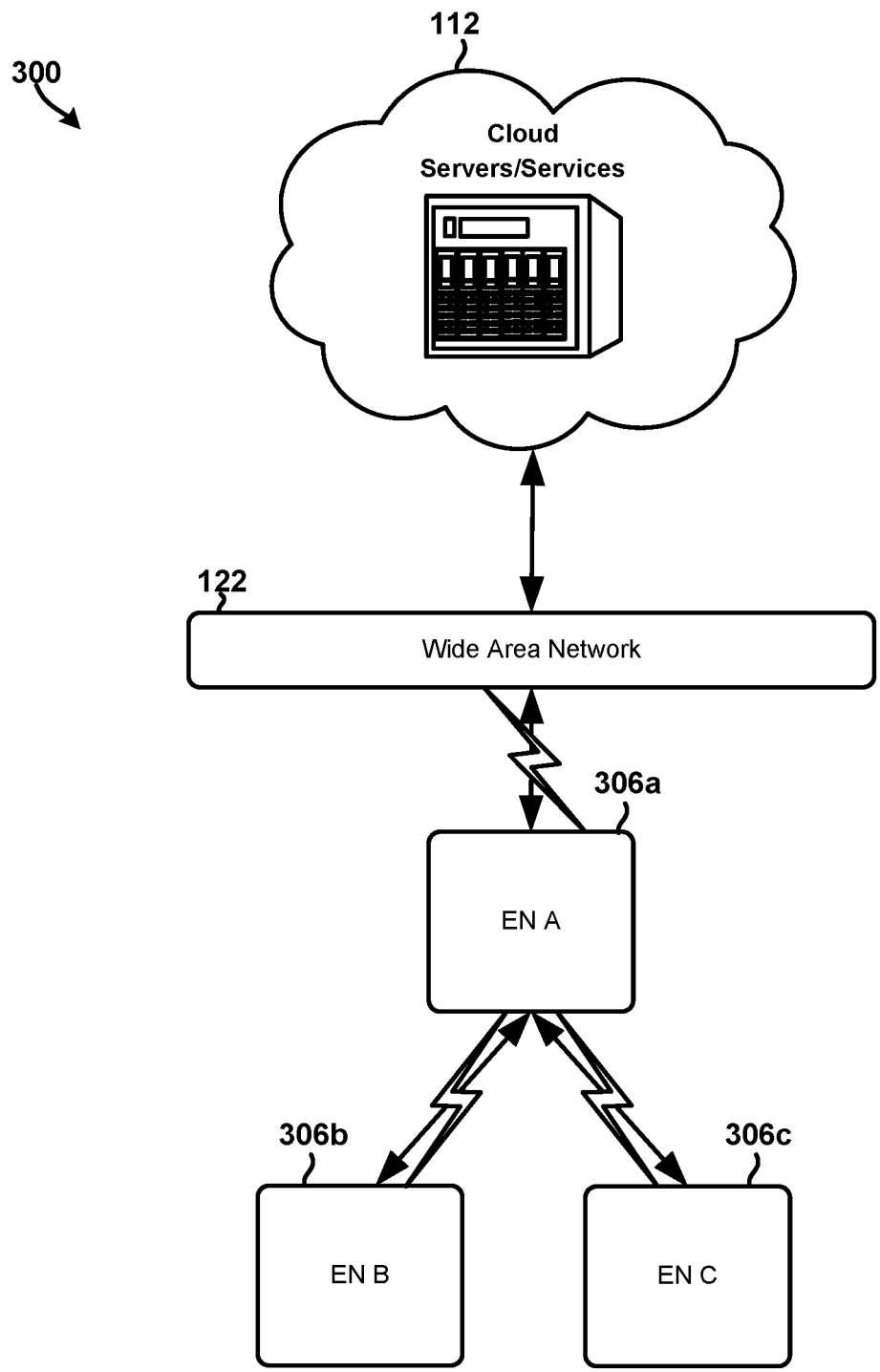
FIGS. 3A-3C are component block diagrams that illustrate edge computing systems that implement an elastic edge computing system or Elastic Edge Computing Platform (ECP) in accordance with some embodiments.

FIG. 3A is a component block diagram that illustrates an example edge computing system 300 that could be configured to implement a distributed access system in accordance with some embodiments. In the example illustrated in FIG. 3A, the edge computing system 300 includes cloud servers/services 112, a WAN 122, and a plurality of edge computing nodes (ENs) 306a-308c. Each of the ENs 306a-308c may be an edge node (e.g., edge devices 106 illustrated in FIGS. 1A-1C). As such, the ENs 306a-308c may be configured to implement or operate a distributed access system and/or otherwise support edge computing by processing and analyzing data at the edge of a network (network edge) instead of in a central data center or cloud 122. The ENs 306a-308c may be equipped with both wired and/or wireless connectivity, which may allow them to communicate with other devices (e.g., user devices 102, other ENs 306a-308c, etc.) in the system 300.

In some embodiments, each of the ENs 306a-306c may be equipped with wireless access points (WAPs) with overlapping or distinct coverage areas, depending on the configuration of the network. Each edge node 306a-308c may also have its own service set identifiers (SSIDs) so that it may operate as a local network or WAP. In the example illustrated in FIG. 3A, EN A 306a provides the connectivity to the WAN 122 for EN B 306b and EN C 306c both of which connect to EN A 306a through a wired or wireless link. Such edge node-to-EN C 306c connectivity may be configured in a variety of ways, such as in a star or mesh topology.

ENs 306 that incorporate a WAP may be installed to work jointly, with each edge node 306 placed at regular intervals based on the effective coverage range of the wireless signal and/or the intended use of the devices. For example, a plurality of ENs 306 might be installed in a warehouse to provide connectivity to a WAN 112 and/or to provide/support the monitoring and control of various systems and devices. Additional ENs 306 may be added to the network or system 300, and the added ENs 306 may reuse the same set of SSIDs that are part of the edge node network. This may extend the effective coverage of the local network independent of whether the ENs 306 have direct wireless connectivity with each other.

As discussed above, the edge computing system 100 may include or work in conjunction with an end device 102, a cloud server 112 and one or more edge devices 106a-106c to offload computationally intensive tasks from an end device 102 to the one or more ENs 306 and/or to one or more cloud servers 112. Yet, elastic edge computing may differ from conventional distributed computing for a number of reasons. For example, distributed computing may encompass specific attributes that are not applicable to edge computing devices. For example, conventional solutions may not enable sharing of CPU resources between edge devices, such as allowing a cluster of edge devices to function as a single process. The various embodiments overcome these limitations to allow a cluster of edge devices to function as a single process. These ENs may be represented with the same architecture but may also exhibit dissimilarities concerning CPU, RAM, storage, and backhaul capabilities. In the various embodiments, elastic edge computing system may support, utilize, or allow multiple edge computing devices, irrespective of their similarities or differences. This approach may enable more efficient resource allocation and improved performance for edge-native applications, accounting for the diverse nature of edge computing devices within an ecosystem.

Figure 3B:
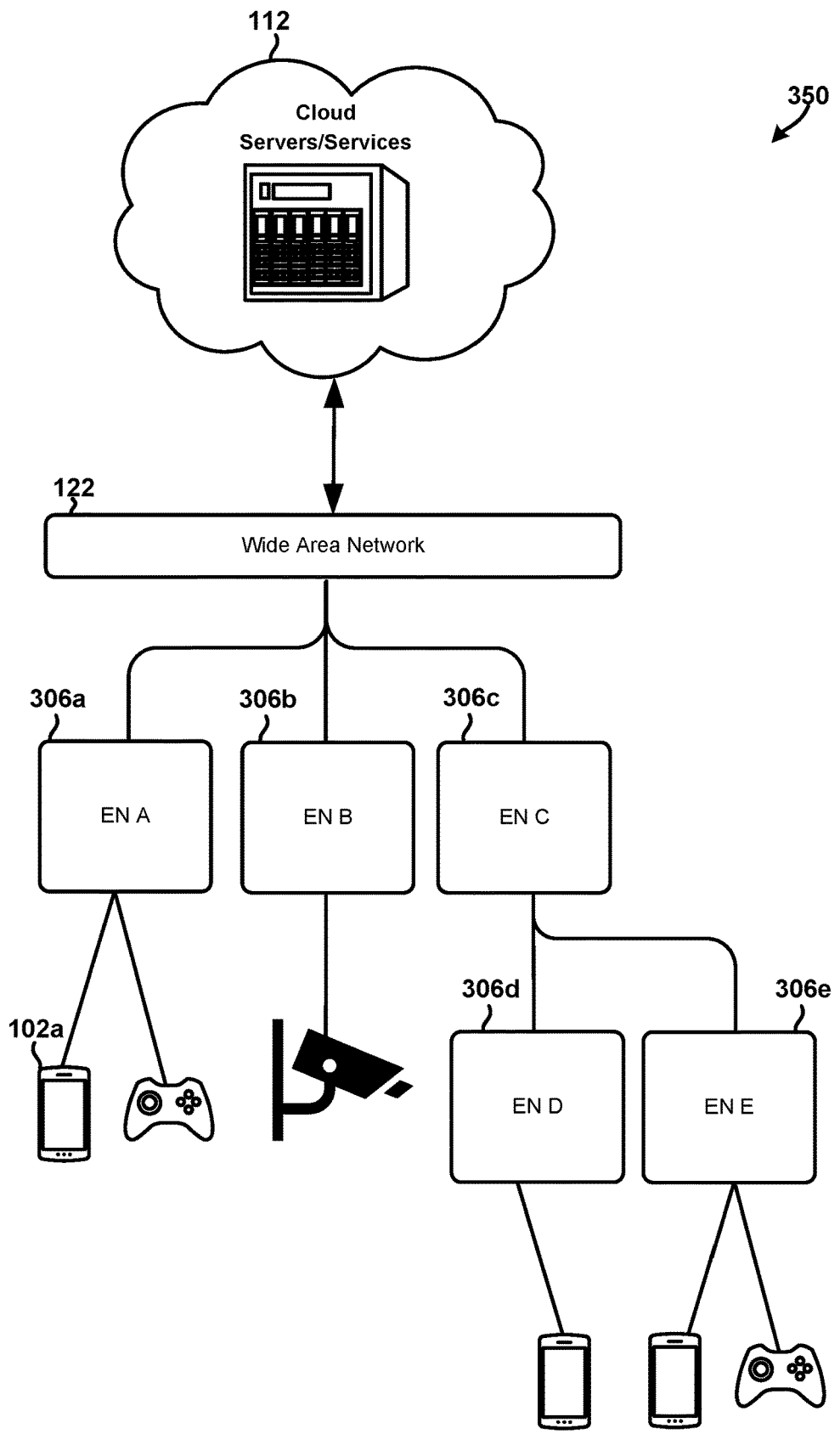
Figure 3C:
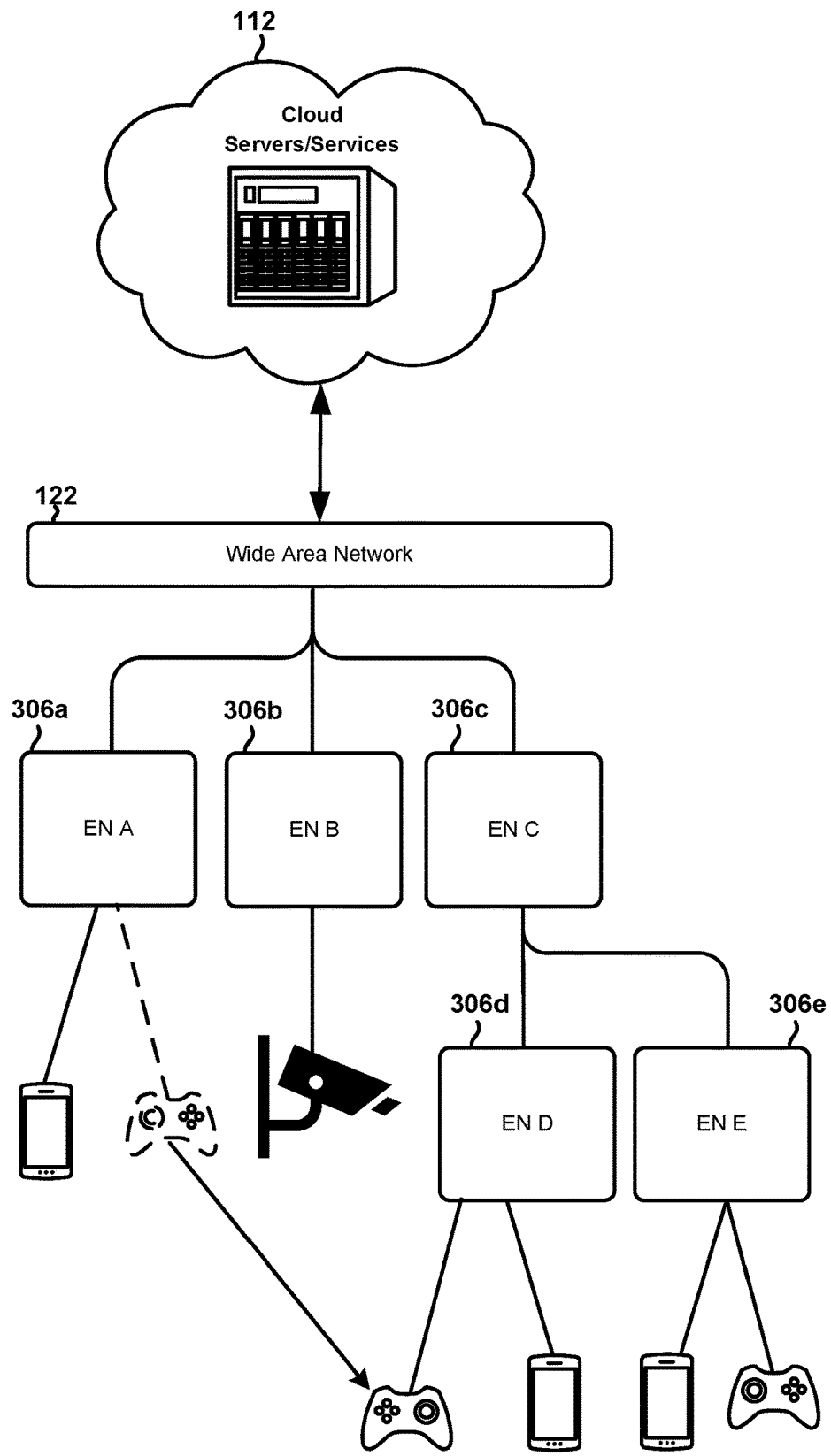

FIGS. 3B and 3C illustrate several edge computing devices or ENs 306a-306e that are part of an ECP system 350, demonstrating the relative locations and hierarchies of the components (e.g., UE 102, ENs 306a-306e). The ENs 306a-306e may edge computing devices that heterogenous or dissimilar in terms of their architecture or capabilities (e.g., CPU, RAM, storage, or backhaul capabilities, etc.). The ECP system 350 may be configured to allow, support, and/or utilize multiple edge ENs 306a-306e irrespective of whether they are similar or dissimilar (or irrespective of whether they are homogenous or heterogenous).

In some embodiments, the ECP system 350 may be configured to enable performance improvements, enhanced capabilities, and resiliency at the network's edge by clustering or grouping similar and dissimilar ENs to perform selected functions.

In some embodiments, the ECP system 350 may be configured to support both Uniform Edge Computing (UEC) and Non-Uniform Edge Computing (NUEC).

In some embodiments, the ECP system 350 may be configured to enable certain end devices to perform specific functions as needed, further enhancing the overall ECP system 350 ecosystem. For example, a mobile device 102a could be configured to assist in Augmented Reality/Virtual Reality tasks by reading a quick response (QR) code, providing an image of a device, or offering additional information such as the location, orientation, or other attributes of the mobile device 102a. The mobile device 102a may also be configured to help render the visual illustration of processes and enhanced information.

In some embodiments, the ECP system 350 may be configured to dynamically scale both horizontally and vertically to meet demands.

In some embodiments, the ECP system 350 may be configured to facilitate the densification of resources at the network's edge, involving capacity from both radio and processing capabilities. Radio spectrum densification may include providing more Mbps/km2 or Mbps/m2 to edge nodes for connecting to the edge node ecosystem. Spectrum densification may be achieved by increasing radio spectrum availability for end devices. However, with traditional techniques, it may not be possible to add radio spectrum beyond the existing allocated or permitted bands, whether licensed, license-exempt, or a combination of both.

In some embodiments, the ECP system 350 may be configured to enable radio spectrum densification by incorporating more edge gateways/nodes into a specific geographic area or edge network ecosystem. In some embodiments, the ECP system 350 may be configured to allow an edge node (e.g., mobile device 102a, etc.) to access resources from another edge node that it is not directly connected to. In some embodiments, the ECP system 350 may be configured to allow for an end device to use an edge node that is connected to over a wired connection.

In addition, radio spectrum densification may involve situations in which the ECP system 350 instructs the end device to communicate with an edge node that may not be geographically close or has weaker radio RSSI but offers more available resources for the application being executed. In some embodiments, the ECP system 350 may be configured to perform radio spectrum densification via enhanced resource utilization, allowing more end devices to use radio services in a given area with the same or different radio spectrum assets or a combination of additional radio resources.

It should be understood that the ECP system illustrated in FIGS. 3A-3C is a representation of a ECP system, which may have more or less ENs than the illustrated example.

With reference to FIGS. 3A-3C, the ECP system 350 may include five edge nodes A through E (e.g., ENs 306a-306e). The example illustrated in FIG. 3B, edge node 306a (EN A 306a) is connected to several end devices. However, due to resource constraints, edge node 306a (EN A 306a) may not meet the service requirements while delivering the service to end users. Typically, an additional edge node might be installed and configured to handle the extra load. Using conventional solutions, real-time installation of another edge node or enhancement of the capabilities edge node 306a (EN A 306a) is readily available. On the other hand, the ECP system 350 may be configured to determine that edge node 306d (EN D 306d) possesses the necessary resources to support the application running on edge node 306a (EN A 306a).

Edge node 306d (EN D 306d) may have more capabilities and may be a different type of device or a dissimilar EN C 306c compared to edge node 306a (EN A 306a). Nonetheless, the ECP system 350 may move the device 102a and its application to edge node 306d (EN D 306d), as illustrated in FIG. 3C. This high-level example illustrates the game application and connectivity being transferred from EN A 306a to EN D 306d, resulting in better system utilization and efficiency in service delivery. In FIG. 3C, the end device may communicate with either EN A 306a or D. Although EN A 306a might offer slightly better radio spectrum quality, the difference may not be significant enough to hinder the use of EN D 306d. The switching of end devices between Edge Nodes may occur during the initiation or delivery of a particular application or service. In addition, if EN A 306a experiences a failure or reliability issue, such as an intermittent power source, EN D 306d may be selected for application or service delivery, irrespective of EN A 306a's resource constraints. By reallocating end devices to different edge nodes based on available resources within the ECP system 350 ecosystem, radio spectrum utilization for both front haul and backhaul may be improved or optimized, resulting in more efficient and effective use of radio spectrum.

In some embodiments, the ECP system 350 may be configured to allow for on-demand, adaptive densification of both compute resources and wireless capabilities. Some of the key attributes of the ECP system 350 may include performance improvements achieved by sharing resources to enhance application delivery, resilience, or both.

Scalability (e.g., a network's ability to handle increasing workloads efficiently or expand to accommodate growth) is a key factor for many networks. Size scalability may be particularly important for services or applications that encounter changes in the number of users, data volume, or computational needs over time. In edge computing networks, scalability is important for ensuring that the network may handle increasing workloads while maintaining efficient and reliable service delivery. Typically, an edge computing network may scale linearly by relying on northbound infrastructure, such as cloud servers, to manage increased loads and by adding new edge computing devices. Latency-sensitive applications and functions in edge computing may be limited by the capabilities of individual edge nodes. In edge computing, size scalability often includes increasing the physical computing attributes, such as processors, cache, memory, storage, and I/O channels.

In some embodiments, the ECP system 350 may be configured to allow for application allocation using both horizontal and vertical scaling. The ECP system 350 may be configured to perform horizontal scaling operations that utilize resources available on other edge nodes within the network, even if they are not adjacent, depending on the available resources matched to application requirements. Vertical scaling, on the other hand, may include an edge node sending a resource request to a Mesh Edge Node (MEN). The MEN may run the application, use cloud services, or rely on another MEN and its associated ENs to perform the required task. In some embodiments, the ECP system 350 may be configured to achieve size scalability by utilizing other edge nodes in the network, running applications or processes on nodes that have the most resources at a given time, and adhering to the defined policy for the service.

Generally, a computing cluster may include several interconnected stand-alone computers that work cooperatively as a single integrated computing resource. They may be combined as a group to provide high availability for specific services, which are typically built with multiple applications operating in an application layer. Clustering may eliminate single points of failure by distributing computational work across all layers of the cluster system.

In elastic edge computing (e.g., ECP system 350), all edge nodes may be part of the collective and are not treated as stand-alone computing nodes.

Figure 4:
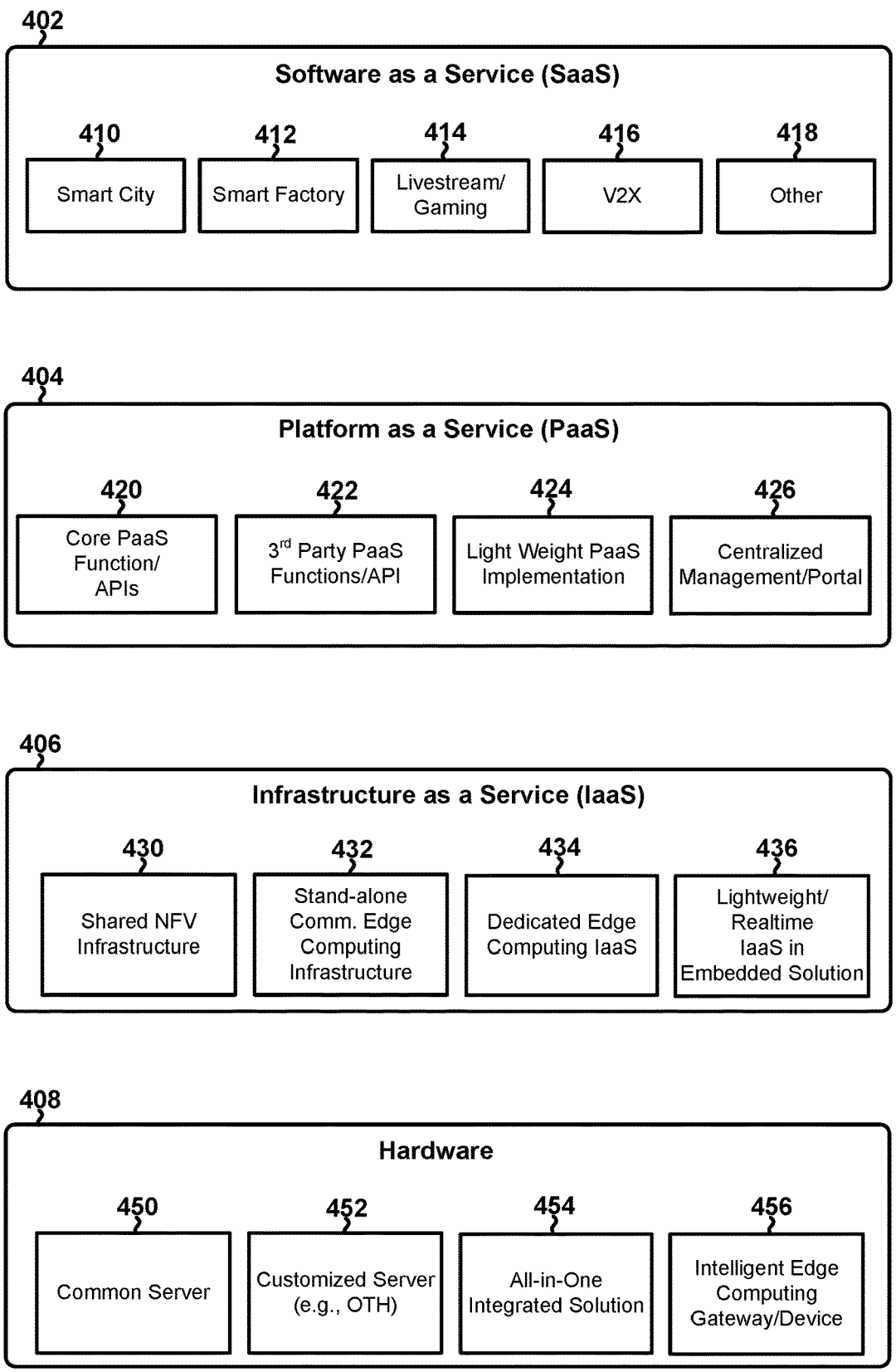
FIG. 4 is a component block diagram illustrating example components that may be included in an elastic edge computing system configured in accordance with some embodiments.

FIG. 4 illustrates that the ECP system 350 may be configured to support various service architectures typically based on cloud computing models, such as Software as a Service (SaaS) 402, Platform as a Service (PaaS) 404, and Infrastructure as a Service (IaaS) 406, any or all of which may run on hardware 408. PaaS 404, IaaS 406, and the associated hardware 408 platforms used for end devices may be part of an edge computing solution as a standalone service or any combination of components providing a service.

In the example illustrated in FIG. 4, the SaaS 402 component includes Smart City 410, Smart Factory 412, Livestream/Gaming 414, V2X 416, and Other 418. The PasS component includes Core PaaS Function/APIs 420, 3rd Party PaaS Functions/API 422, Light Weight PaaS Implementation 424, and Centralized Management/Portal 426. The IaaS 406 component includes Shared NFV Infrastructure 430, Stand-alone Communication Edge Computing Infrastructure 432, Dedicated Edge Computing IaaS 434, and Lightweight/Realtime IaaS in Embedded Solution 436. The Hardware 408 includes a Common Server 450, Customized Server (e.g., OTH) 452, All-in-One Integrated Solution 454, and Intelligent Edge Computing Gateway/Device 456.

Figure 5:
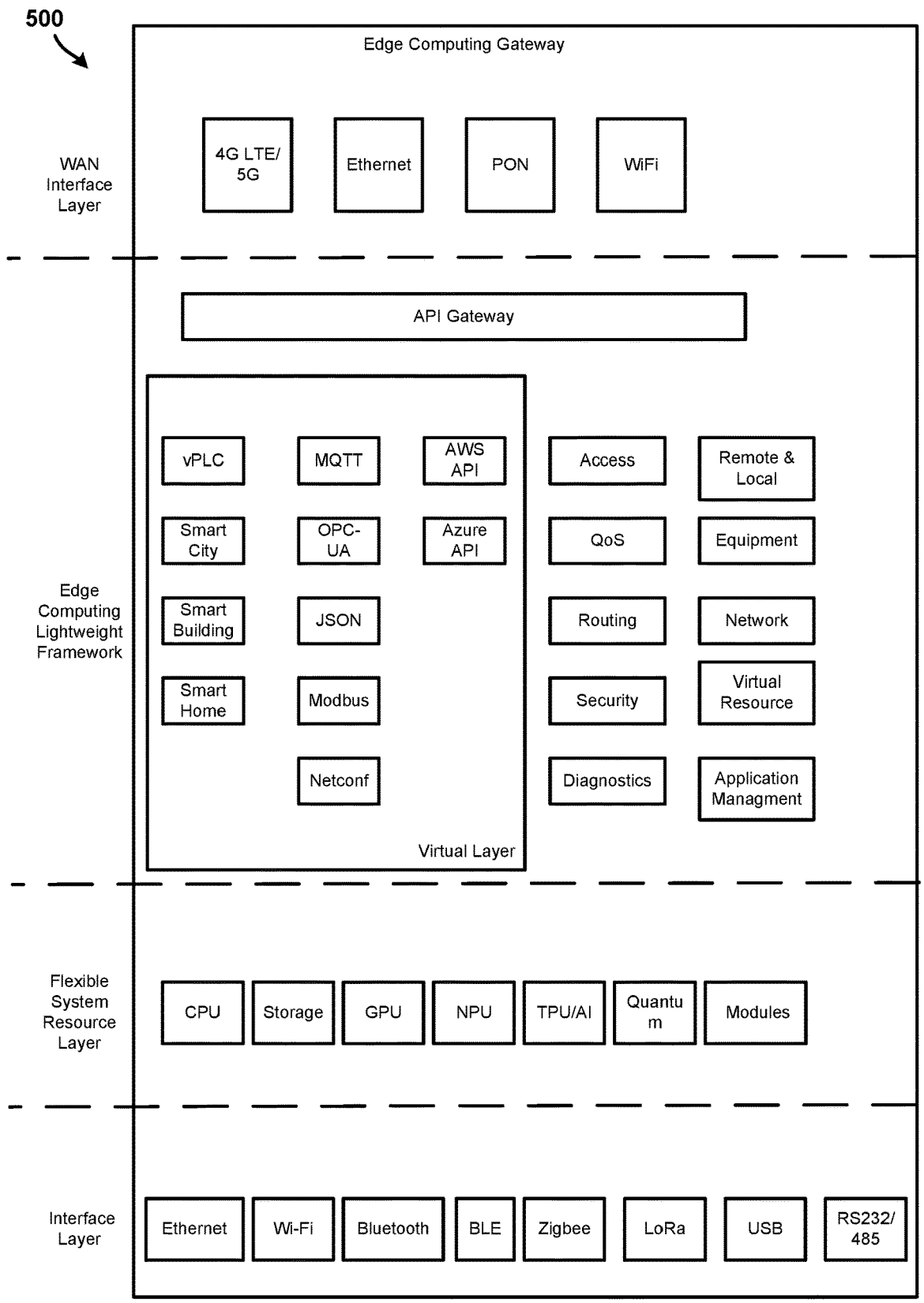
FIG. 5 is a component block diagram illustrating example components that may be included in an edge computing gateway that may be included in an elastic edge computing system and configured to perform various functions in accordance with some embodiments.

FIG. 5 illustrates an edge computing gateway 500 that could be configured in accordance with some embodiments. Edge applications are designed to run at the edge rather than in a remote data center, facilitating quicker response times through lower latency and local computing power instead of relying on cloud services. In end devices, if congestion occurs in an edge node, additional resources at the edge may need to be found to help resolve the congestion, which may result in failing over to a cloud resource. Traditionally, compute resources and wireless capacity at the edge may not be able to be increased on demand using conventional solutions, resulting in either reducing the offered load or increasing queueing at the edge node.

ENs 306 may be resource-constrained devices with minimal flexibility for resolving peak demand requests. The edge node may be required to balance demand and resource consumption. The ECP system may enable edge nodes to redistribute resource consumption with other edge nodes in a heterogeneous edge environment.

End devices are often resource-constrained, which may limit the types of applications and user experiences run on mobile devices. ENs 306 in an ECP system may enable devices to overcome this constraint by using a compute distribution scheme.

In some embodiments, the ECP system 350 may be configured to perform computational offloading for end devices, whether mobile or IoT devices. The ECP system 350 process provides a solution to enhance the capacity of mobile devices by transferring computation to higher resourceful servers located elsewhere.

In some embodiments, the ECP system 350 may include edge computing devices connected to a cloud or upstream service and/or may be a collection of ENs that function without the need for an upstream service. The ECP system 350, whether connected to upstream, local only, or a combination, may include diverse and different edge computing devices. These devices may come from single or multiple vendors and may have varying capabilities when grouped together.

In some embodiments, the ECP system 350 may be configured with orchestration technology that enables both symmetrical and asymmetrical scaling to deliver applications in the most efficient and functional manner within both homogeneous and non-homogeneous edge computing ecosystems. The ECP system 350 may allow for greater possibilities in delivering and managing services at the network's edge compared to conventional solutions.

In some embodiments, the ECP system 350 may be configured to use edge computing gateways 500 that provide computing and storage resources for flexible deployment and operation of multi-ecological services.

Traditional edge architectures may involve the allocation of IaaS resources, management and mutual communication of PaaS, as well as SaaS authentication and deployment. However, in an edge deployment with limited resources, the edge computing gateway 500 may not fully implement the traditional virtualization architecture. Given the number of gateway deployments and the implementation of functions, the management of virtualized resources may be required to be lighter than the edge data center, eliminating unnecessary modules.

Some embodiments may include an edge computing gateway 500, which may be classified as an edge computing device with a Lightweight Virtualization Framework (LVF). By using an LVF, the edge computing gateway 500 may implement and enable numerous applications through an ECP system 350 architecture as a compute distribution method. The edge computing gateway 500 and devices may efficiently implement applications as local containers while executing functions at the network edge.

In some embodiments, the ECP system 350 may be configured to facilitate pooling of resources across connected edge computing gateways 500 and nodes. This pooling capability may extend to edge nodes or a combination of edge nodes and gateways.

In some embodiments, the ECP system 350 may be configured to create a distributed container network, enabling edge nodes or gateways to run individual containers in a method referred to as compute distribution.

Figure 6:
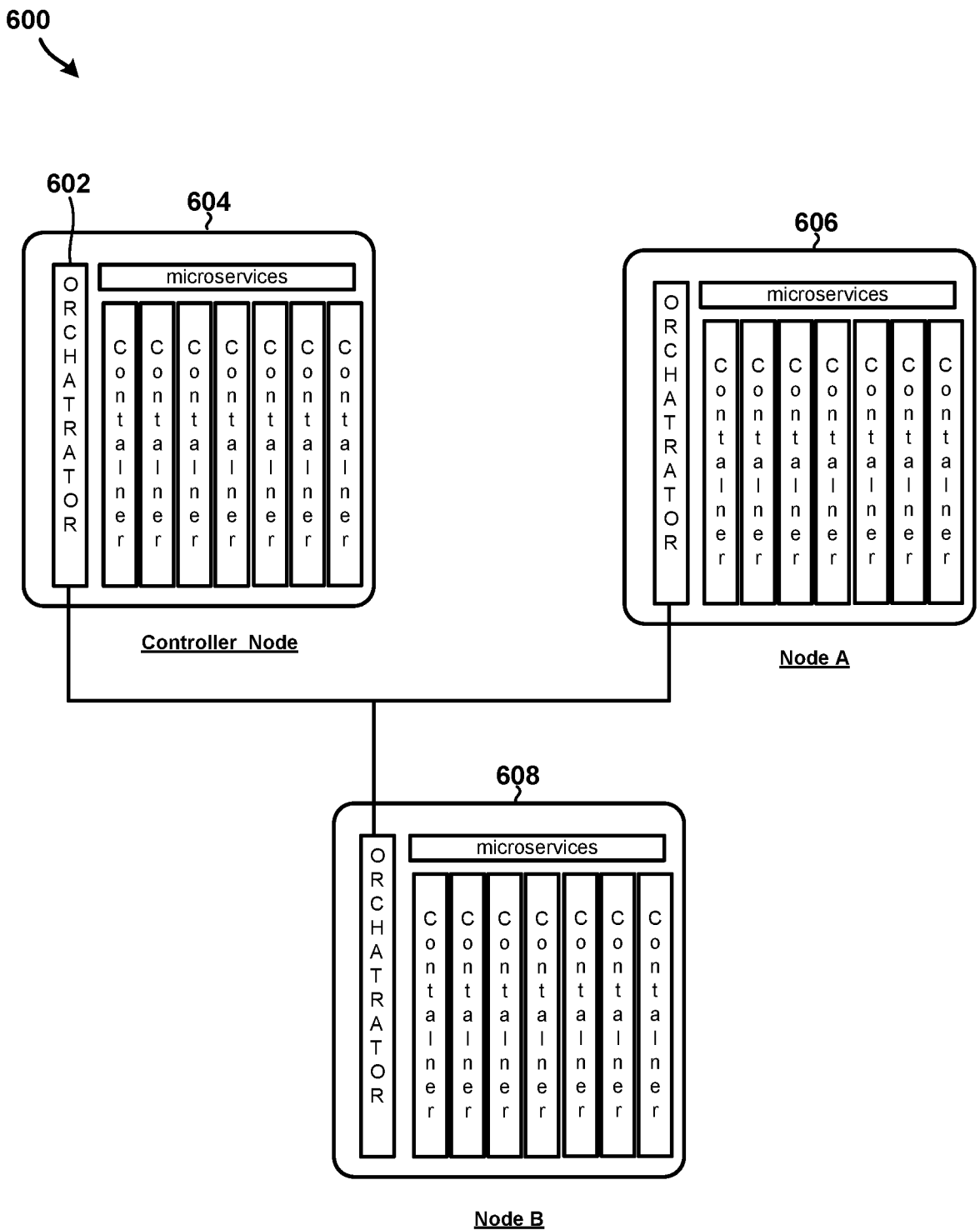
FIG. 6 is a component block diagram illustrating example components that may be included in edge computing devices and a high-level representation of a distributed container network of an elastic edge computing system configured in accordance with some embodiments.

FIG. 6 illustrates a high-level representation of a distributed container network 600 using the ECP system. In this configuration, an Elastic Compute Orchestrator (ECO) 602 is located within the controller node 604 or master edge node or gateway, is responsible for managing the containers running on the network. This ECO 602 may evaluate the available resources on each edge node to determine the most appropriate node for running the container. Additional edge nodes 606, 608 may also include orchestrator capabilities and operate as mirror edge compute orchestrators on one or multiple other nodes. This configuration may provide high availability characteristics for the edge compute ecosystem, allowing secondary orchestrators to take over in the event of a primary orchestrator failure.

Certain applications may require data persistence to prevent issues when restarting or transferring to another node. As shown in FIG. 6, the container environment may access storage capabilities across various edge nodes. This configuration may allow for the delivery of microservices within the elastic compute network, optimizing resource allocation and improving overall system performance. The location of a microservice within the network may be determined by the resources available and required by the application. When an edge node is added or removed from the network, a new container may be initiated on the appropriate edge node for running the application.

Figure 7:
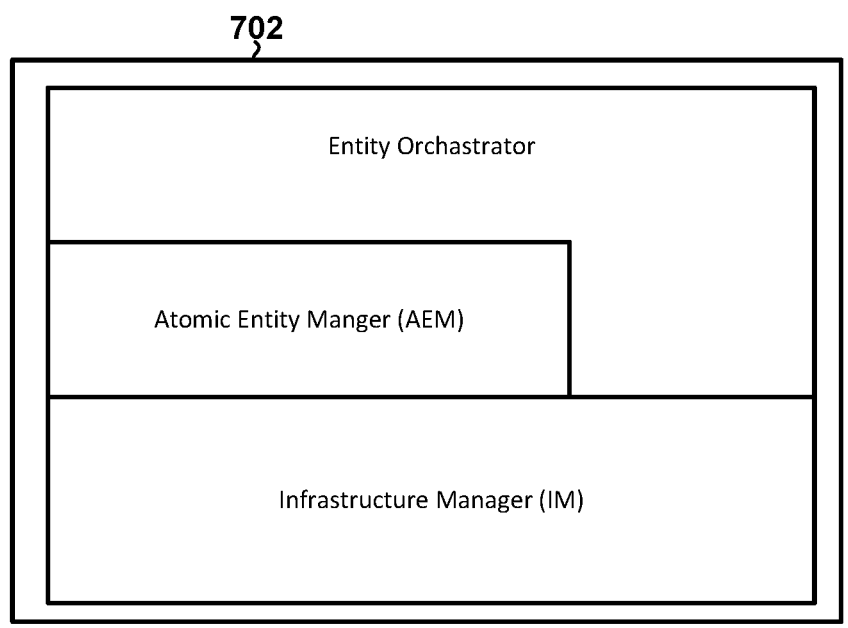
FIG. 7 is a component block diagram illustrating example components of an elastic computing orchestrator (ECO) that may be configured to perform various functions in accordance with some embodiments.

FIG. 7 illustrates a high-level diagram of an elastic computing orchestrator 702 that may be configured to allow for the automation of management and coordination tasks for services and components running on the elastic compute network, facilitating localization of services within the edge node. The elastic computing orchestrator 702 may be configured to perform operations to operate in any of a number of important roles, including: 1) controlling and managing storage, compute, and networking resources; 2) provisioning services by running, suspending, reallocating, and terminating applications and other operations; 3) load balancing resources on the EN A 306 and the ECP system 350; 4) ensuring high availability of network resources; and 5) managing the monitoring of all resources on the EN A 306 and the associated ECP system 350. These functions, operations, or roles may improve or optimize resource utilization and improve overall system performance, enabling efficient and adaptable edge computing ecosystems.

In some embodiments, the ECP system 350 may be a modular system that controls and scales applications both horizontally and vertically within the network hierarchy. This modular approach may enable dynamic scaling based on the existing resource pool from current edge nodes, the addition of more edge nodes, or by leveraging cloud architectures, where the edge node(s) actively extend a cloud service to perform local functions.

In some embodiments, the ECP system 350 may be configured to scale horizontally, whether initially installed as a standalone system or as part of an edge computing network. In a standalone implementation, an edge node may connect to other edge nodes via point-to-point wireless connections, wireless mesh networks, wired LAN connections, or a combination of both wireless and wired LAN connections. Adding edge nodes to the elastic edge network may allow each node to expand its capabilities within the local edge computing network by sharing computing capacity and/or module capabilities with other nodes.

Edge computing applications and related network functions may adopt various network configurations and edge node capabilities to support virtual machine and container resources. ENs 306 may exist in multiple locations across any network or architecture. In some embodiments, the ECP system 350 may be configured to implement a new computing architecture that enables more agile and cost-effective networks for edge computing. It may allow the edge network, using wired and wireless connectivity, to dynamically adapt and provide the connectivity services that best serve the application. In some embodiments, the ECP system 350 may be configured to implement a network architecture that allow the edge network to dynamically reconfigure itself.

In traditional network devices, such as routers or switches, both the control and data planes are contained within the device. In some embodiments, the ECP system 350 may be configured to transform this structure, offering enhanced flexibility and adaptability for modern networks. In some embodiments, the ECP system 350 may be configured to adopt key attributes of Software-Defined Networking (SDN) to create a more efficient and flexible network architecture. SDN separates the network into three distinct layers—application, control, and data. In some embodiments, the ECP system 350 may be configured to incorporate horizontal and vertical scaling using a variety of edge nodes. It may also include end devices as part of the overall edge ecosystem. By separating these layers and integrating them with edge computing, the ECP system 350 may offer enhanced adaptability and resource allocation in modern networks.

The application layer may host various applications, including network, cloud orchestration, or business applications. These applications may reside on one or several edge devices, end devices, edge nodes, remote cloud servers, etc.

The control layer may include the controller, which may translate application layer requirements and dynamically adjust to network changes by reallocating or adjusting resources within the edge computing ecosystem.

The infrastructure layer may include the actual network hardware, corresponding to layer 2 of the OSI model. This layer may encompass edge nodes, end devices, cloud services, power sources, and wired or wireless backhaul and node network connections.

In some embodiments, the ECP system 350 may be configured to utilize containers for delivering applications, which may offer the advantage of separating applications from the underlying infrastructure (making them infrastructure-agnostic). Containers may employ virtual environments that allow service providers, enterprises, or utilities to deploy, replicate, move, and back up processes and workloads more efficiently than using virtual machines (VMs) alone. In this regard, containers may be viewed as individual instances of an application.

Generally, edge applications are designed to run at the edge of the network, rather than in remote data centers, resulting in faster response times due to lower latency and local computing power. In some embodiments, the ECP system 350 may be configured to enable the dynamic reallocation of containers or edge applications between edge nodes and end devices as part of the network service delivery and optimization process.

In some embodiments, the ECP system 350 may be configured to place heavy or robust computing functions close to the end device(s) location, which may allow for dynamic delivery of application functions that account for real-time network environment changes.

In some embodiments, the ECP system 350 may be configured to extend the cloud to the network edge. Extending the cloud to the network edge may not be a replacement for cloud computing, which may still be used by the ECP system 350 to perform heavier data manipulations in some embodiments. However, rather than relying on remote processes, the ENs may transfer many functions that are logically relevant for local execution. This extension of the cloud to the edge may create a virtual environment in which ENs may be part of a mobile edge computing environment. This may further enhance network performance and flexibility.

In some embodiments, the ECP system 350 may be configured to extend the cloud to ENs such that the ENs are local but controlled by upstream cloud server management and operations. The ECP system 350 may also be configured to allow edge nodes to function, not only as local private cloud services, but also to include end devices as part of the cloud service. By operating as a private local cloud, ENs may incorporate more devices into the overall local cloud computing environment, leverage network independence, and function with or without upstream cloud services. As more end devices (e.g., IoT devices, etc.) join the private local cloud, the system may be required to scale application support accordingly. The use of containers in elastic edge computing may facilitate this scalability.

In some embodiments, the ECP system 350 may be configured to allow for automation to manage numerous edge nodes and devices, remote provisioning of infrastructure for distant locations, remote upgrades with software compatibility throughout the entire infrastructure, and resiliency to run applications without interruption during network disruptions or device failures.

In some embodiments, the ECP system 350 may be configured to have one EN provide the WAN connection for the ECP system 350.

In some embodiments, the ECP system 350 may be configured to allow for multiple WAN connections.

In some embodiments the EN providing WAN connectivity for the ECP system 350 may have multiple WAN connections.

In some embodiments, the ECP system 350 may be configured to allow more than one EN to have a WAN connection for the ECP system 350.

Figure 8:
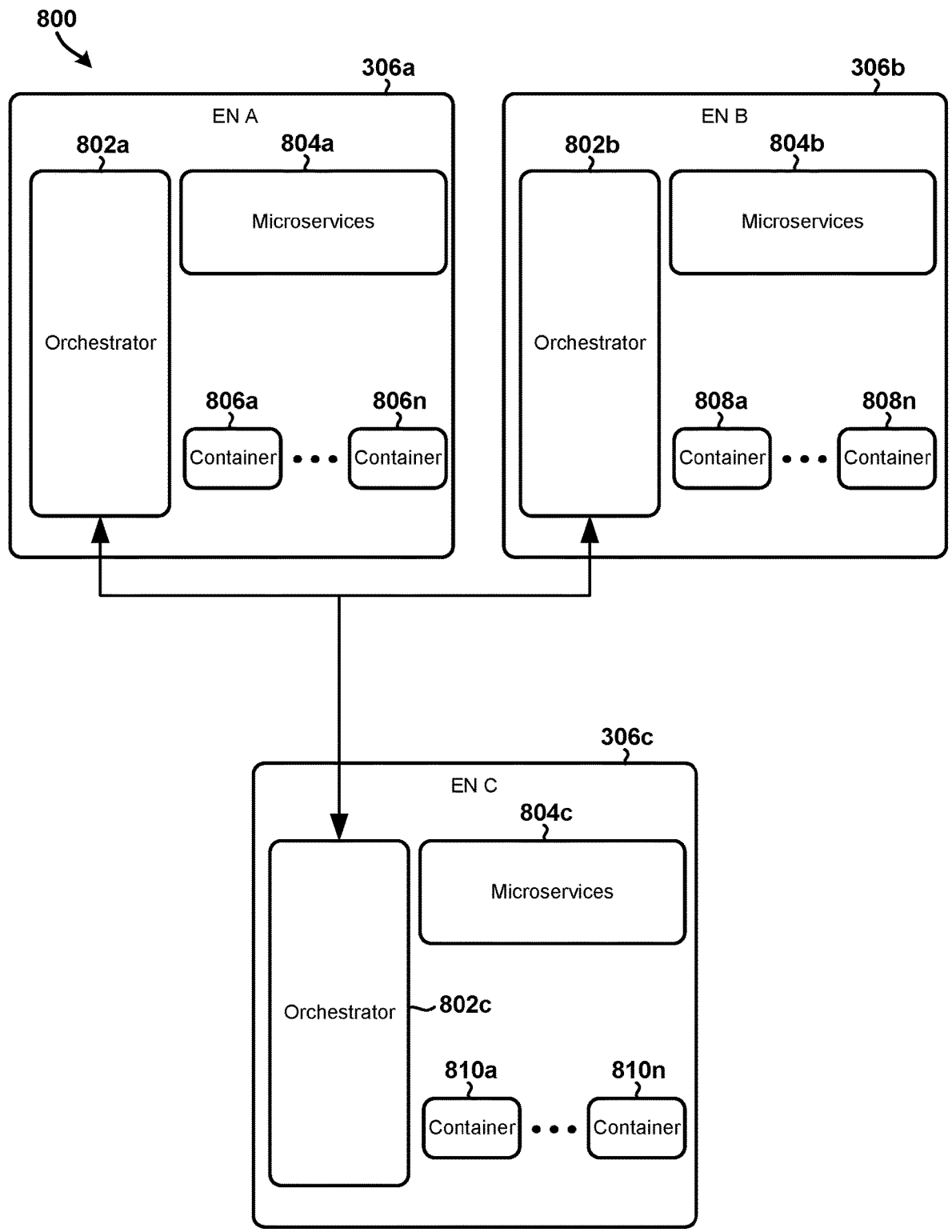
FIG. 8 is a system block diagram illustrating an example elastic edge computing system suitable for delivering microservices in a container environment at the edge of a network in accordance with some embodiments.

FIG. 8 illustrates an example system 800 suitable for delivering microservices in a container environment at the edge of a network in accordance with some embodiments. In the example illustrated in FIG. 8, the system 800 includes a plurality of ENs 306*a*-306*c* that each include an orchestrator 802*a*-802*c* component, a microservices 804*a*-804*c* component and a plurality of containers 806*a*-810*n*. The system 800 may intelligently determine and select the microservices 804*a*-804*c* components and/or containers 806*a*-810*n* to use to operate, execute, or run each microservice or application based on the resource requirements of the micro service/application, the availability of the resources (e.g., ENs, EN resources, etc.) in the system, and/or the availability of the required resources. Each time a new EN 306 is added or removed from the system 800 (e.g., as part of the scaling operations, etc.), the system 800 may create a new container 806*a*-810*n* on an appropriate EN 306 to run the microservice or application.

In some embodiments, an Elastic Compute Orchestrator (ECO) 802*a* may be configured to co-exist with another orchestrator (e.g., Kubernetes, etc.), to collaborate with another orchestrator, or to function independently. The ECO 802*a* may also be configured to ensure adherence to specific rules and policies for network, node, and application performance.

In some embodiments, the ECO 802*a* may be configured to oversee or assist in end-to-end connectivity for associated edge nodes and devices, ensuring performance requirements and avoiding service disruptions due to node, wired link, wireless link, or other component degradation. It may also adjust the network group or collective when additional nodes, links, or components are added to improve performance and resiliency.

That is, in some embodiments, the ECO 802*a* may be configured to adjust or help adjust the network group(s) or collective when there is a complete, partial or anticipated degradation of any of the node(s), wired link(s), wireless link(s) and other component(s) that are being used for the creation or delivery of the service(s). The ECO 802*a* may adjust or help adjust the network group(s) or collective when additional node(s), wired link(s), wireless link(s) and other component(s) that are being used for the creation or delivery of the service(s) are added to a group(s) or collective to improved performance and or resiliency. There may be a separate orchestrator or each group or groups. The orchestrators 802*a*-802*c* may continually monitor and update network devices, edge nodes and end devices, to align with the intended state.

Multiple orchestrators 802*a*-802*c* may exist, with one orchestrator having higher authority. In some embodiments, the ECP system 350 may be configured so that no single edge node holds complete knowledge and data about every edge node or device in the group(s). This may eliminate the need to spread information about the group when changes occur. Each edge node or device may be configured to only save information about the direction it received data from and sends data accordingly. Data may be passed from node to node, with packets getting individual, dynamically created routes, fostering collective intelligence within the group(s).

Figure 9:
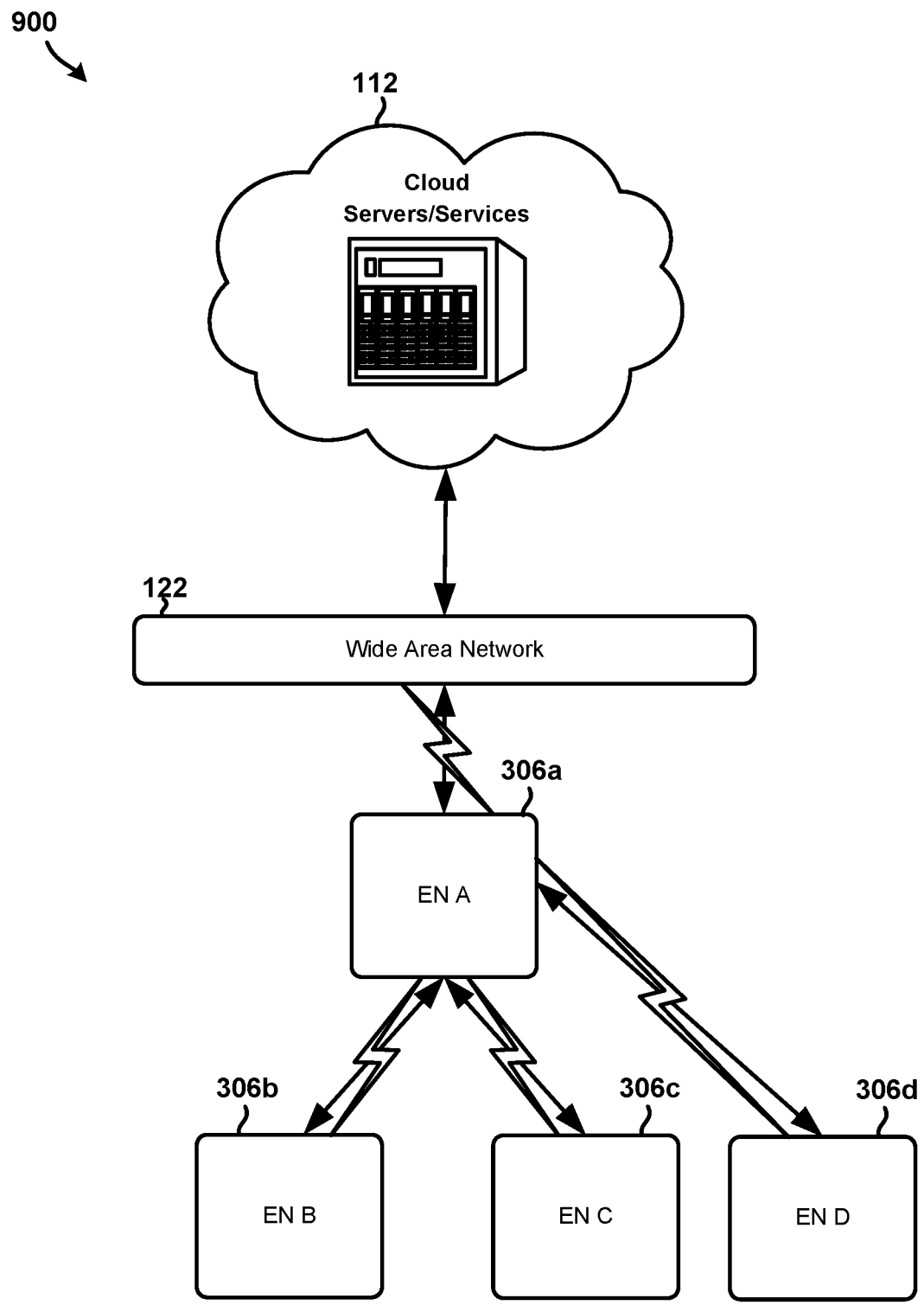
FIG. 9 is a component block diagram illustrating an example elastic edge computing system in accordance with some embodiments.

FIG. 9 is system block diagram that illustrates that a new EN D 306*d* may be added to the local ECP system 350. It should be understood that a wired or wireless connection may replace any of the wired or wireless connections disclosed in this application.

For network connectivity, conventional systems often rely on predetermined, static configurations, which may lead to suboptimal performance in dynamic environments. In some embodiments, the edge nodes may be configured to efficiently detect, evaluate, and connect to available networks or establish new networks when necessary.

In some embodiments, the edge node (EN D 306*d*) may be configured to join the network or local ECP system 350 as a self-aware entity. For example, the edge node may include built-in intelligence and capabilities to autonomously recognize its presence, role, and/or responsibilities within the local ECP system 350. After joining the local ECP system 350, the self-aware edge node may self-configured itself and automatically identify its own resources, capabilities, and limitations, groups, etc. and communicate this information to other nodes and devices within the network. This self-awareness may allow the edge node to actively participate in the various system processes, such as resource allocation, task distribution, and load balancing. It may also allow the edge node to adapt to changes in the system, such as the addition or removal of other nodes or devices, variations in network traffic, or shifting application requirements. The self-aware edge node may dynamically adjust its behavior and resource usage to improve or optimize its performance and ensure seamless integration with the rest of the network components. Such autonomy and adaptability may contribute to the ECP system 350 becoming more resilient, efficient, and scalable.

Figure 10:
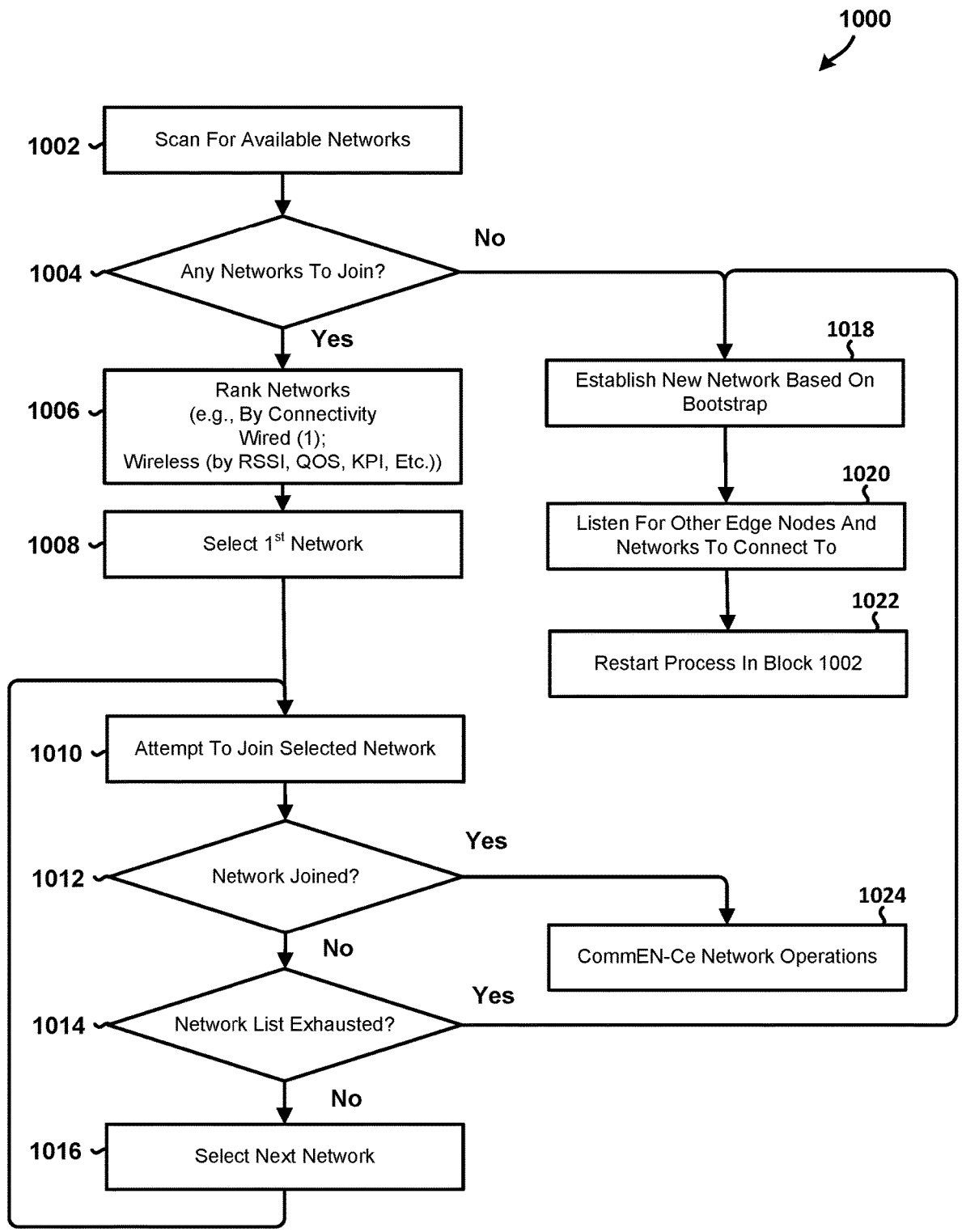
FIG. 10 is a process flow diagram illustrating a method of actively scanning for networks, intelligently ranking them, attempting connections, and establishing new networks as necessary in accordance with some embodiments.

FIG. 10 is a process flow diagram illustrating a method 1000 in which EN D 306*d* from FIG. 9 joins a network. Method 1000 may be performed by one or more processors in an edge node, which may be included as part of the ECP system 350. The edge node's location, hierarchy, and/or grouping may occur after it connects to a network. The network to which the edge node connects may be a different network than the initial network to which the edge node connected.

In block 1002, the processor may scan for available networks. For example, unlike conventional systems that may require manual configuration to connect to a specific network, the processor in the edge node may automatically scan for available networks in block 1002. This active detection of networks may remain informed of changes in network configuration and may respond to changes in network availability. In block 1004, the processor may determine whether there are any networks available to join based on the results of the scanning.

In response to determining that there are networks available to join (i.e., determination block 1004="Yes"), in block 1006 the processor may rank the available networks. In some embodiments, the processor may rank the networks based on their connectivity type and strength. In some embodiments, the processor may evaluate the detected networks and prioritize wired connections, which typically offer more stability and speed compared to wireless connections. In some embodiments, the processor may rank wireless networks based on their Received Signal Strength Indicator (RSSI), Quality of Service (QoS), Key Performance Indicators (KPI) or other measurement such as to ensure that the edge node connects to the best available network, etc. In some embodiments, in block 1006 the processor may generate an ordered list of ranked available networks.

In block 1008, the processor may select the first (or highest-ranked) network in the ordered list of ranked available networks. In block 1010, the processor may attempt to join the highest-ranked network in the ordered list of ranked available networks. If the connection is successful, the edge node may commence its network operations in block 1024 for optimal performance based on the current available networks (i.e., the highest-ranked available network to which it may connect). If the connection attempt is unsuccessful, the processor may iteratively attempt to connect to the next highest-ranked network in blocks 1010-1014 until a connection is established or the list of available networks is exhausted.

In response to determining that there are not networks available to join (i.e., determination block 1004="No"), in block 1018 the processor may create a new network based on a bootstrap configuration. This may allow the edge node to commence operations even in the absence of suitable networks to join. In block 1020, the processor may listen for other edge nodes and networks to connect to (e.g., to maintain an active search for potential improvements to its connectivity, etc.). In block 1022, the processor may restart the operations of method 1000 in block 1002. By actively scanning for networks, intelligently ranking the available networks, attempting connections, and establishing new networks as necessary, the various embodiment may ensure that edge nodes may operate in dynamic environments and/or may allow edge nodes to improve performance and connectivity, enhance the overall functioning of the edge computing network.

Figure 11:
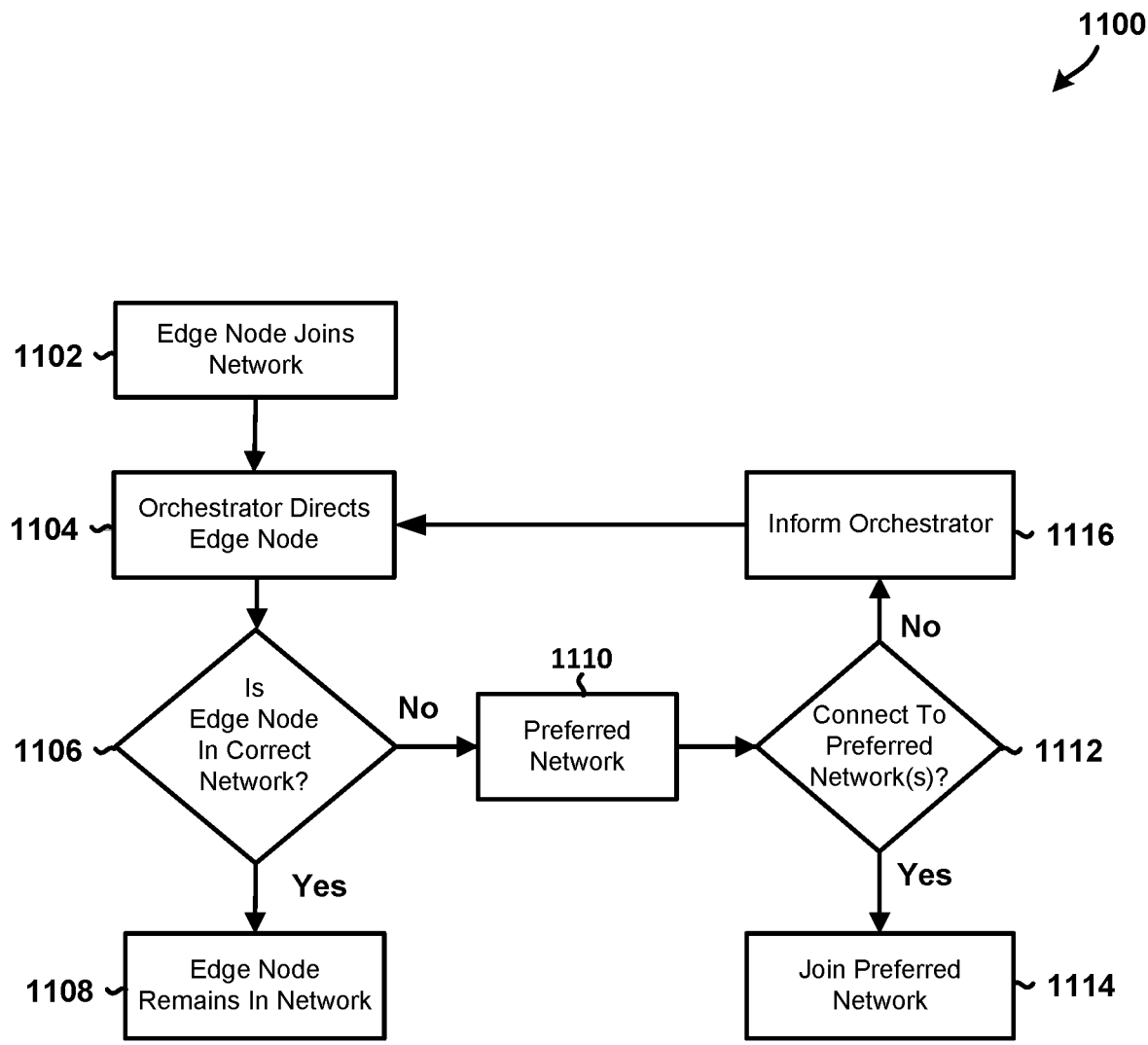
FIG. 11 is a process flow diagram illustrating a method that may be performed by an edge node for joining and managing nodes in an elastic computing system in accordance with some embodiments.

FIG. 11 is a process flow diagram illustrating method 1100 of joining a network in accordance with some embodiments. Method 1100 may be performed by one or more processors in an edge node, which may be included as part of the ECP system 350. Method 1100 may be performed to allow an edge node to join and manage its network connection under the guidance of an elastic compute orchestrator (ECO). The ECO may assess the edge node's current network, identify the preferred network, and direct the edge node to join or remain in the appropriate network. The ECO may continuously monitor and manage the edge node's network status and performance to ensure optimal operation and compliance with network requirements.

The processor may perform any or all of the operations in blocks 1102-1114 of method 1100 when the network joined, whether initial or later, changes from the network the edge node needs to be connected to. After connecting, the edge node may be assigned to one or more groups in which other edge nodes share a common function and/or resources. That is, each group may be logical arrangement for the edge node in which other edge nodes share a common function and share resources. The associated group(s) may change based on network, application, or resource requirements.

Figure 12:
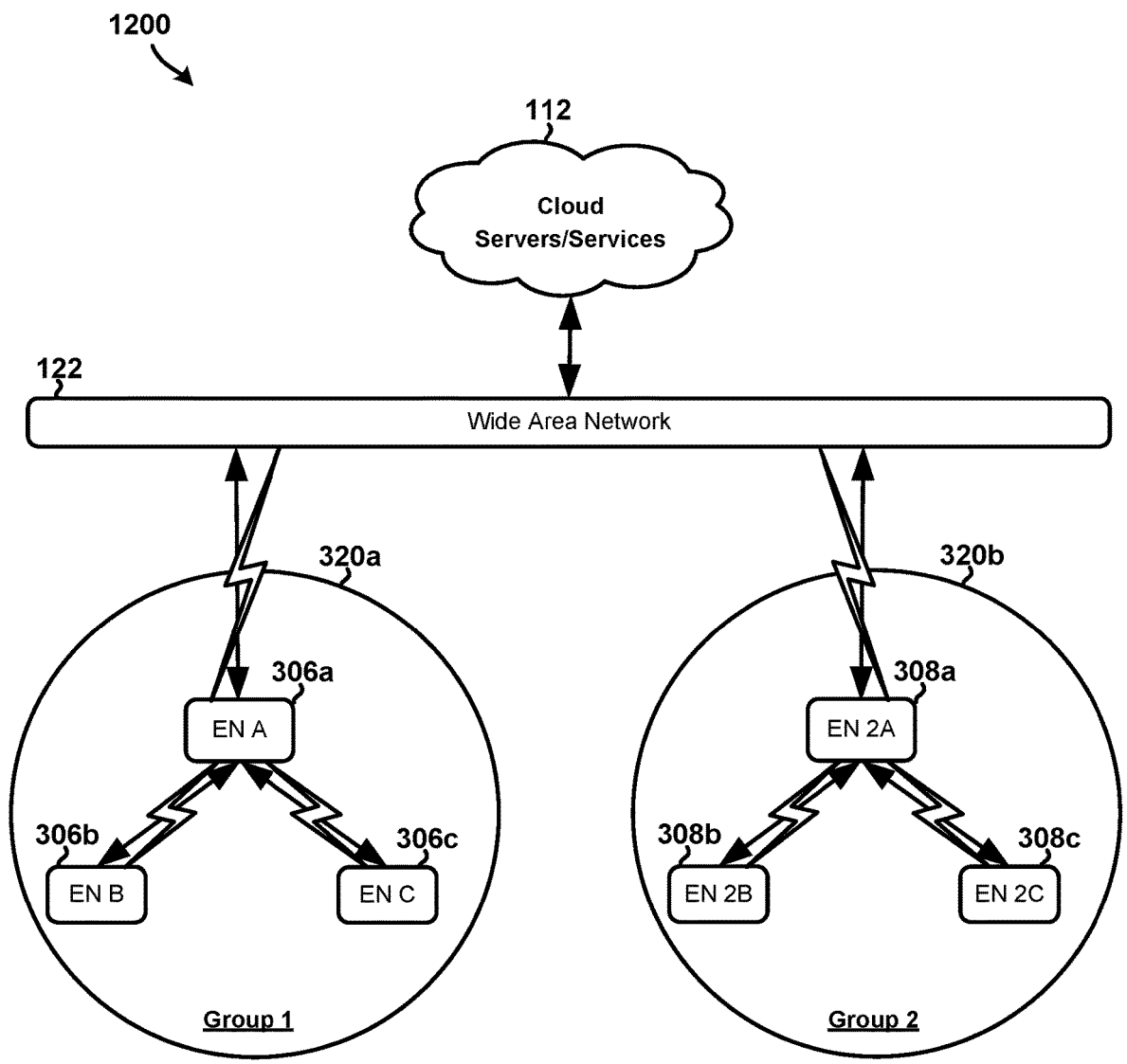
FIGS. 12 and 13 are component block diagrams that illustrate edge nodes organized into groups and included in an elastic edge computing system in accordance with some embodiments.

FIG. 12 illustrates an example in which ENs 306, 308 are organized into two groups 320*a*, 320*b*. In particular, ENs 306*a*-306*c* are members of Group 1 320*a* and ENs 308*a*-308*c* are members of Group 2 320*b*. The two groups 320*a*, 320*b* are isolated from one another. As such, ENs 306*a*-306*c* are in their own isolated private LAN (Group 1 320*a*) and ENs 308*a*-308*c* are a different isolated private LAN (Group 2 320*b*). Group differences may be based on assignment policies for preferred interaction to meet business objectives or other criteria. For example, the system may group similar devices together or group devices that have similar power sources or resiliency requirements. The edge nodes EN 2A, EN 2B, and EN 2C are part of the elastic edge compute network. However, edge nodes EN 2A, EN 2B, and EN 2C are part of a different collective, group, than that of EN A, EN B, and EN C. The grouping differences may be based on a group assignment policy for the preferred interaction of edge nodes to usually meet a business objective. The system may also group similar devices together or group devices that have similar power sources or resiliency requirements, etc.

Figure 13:
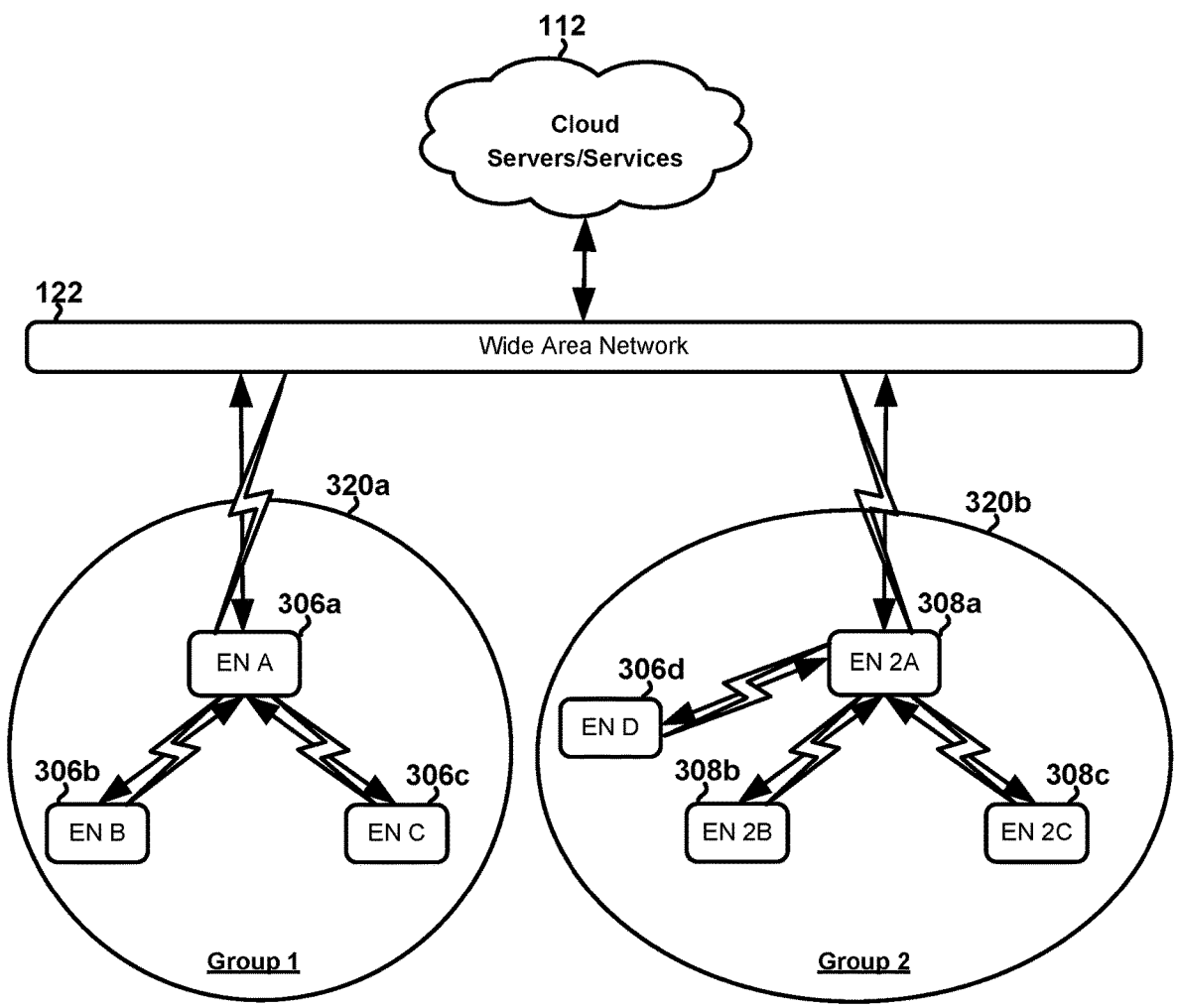

FIG. 13 illustrates an example in which EN D 306*d* is better supported by EN 2A 308*a* from group 2 instead of group 1 due to resource, backhaul, or radio environmental factors. This scenario illustrated in FIG. 13 may allow edge nodes to self-organize. The group assignment may be based on connectivity, EN C 306*c* capabilities, or other factors or characteristics of the devices. For example, all edge nodes in a group may be of a particular model or manufacturer where an EN that is different could negatively impact the performance of the group. Alternatively, a particular model or manufacturer of an EN may perform better by being assigned to an alternative group that may better support its capabilities.

Figure 14:
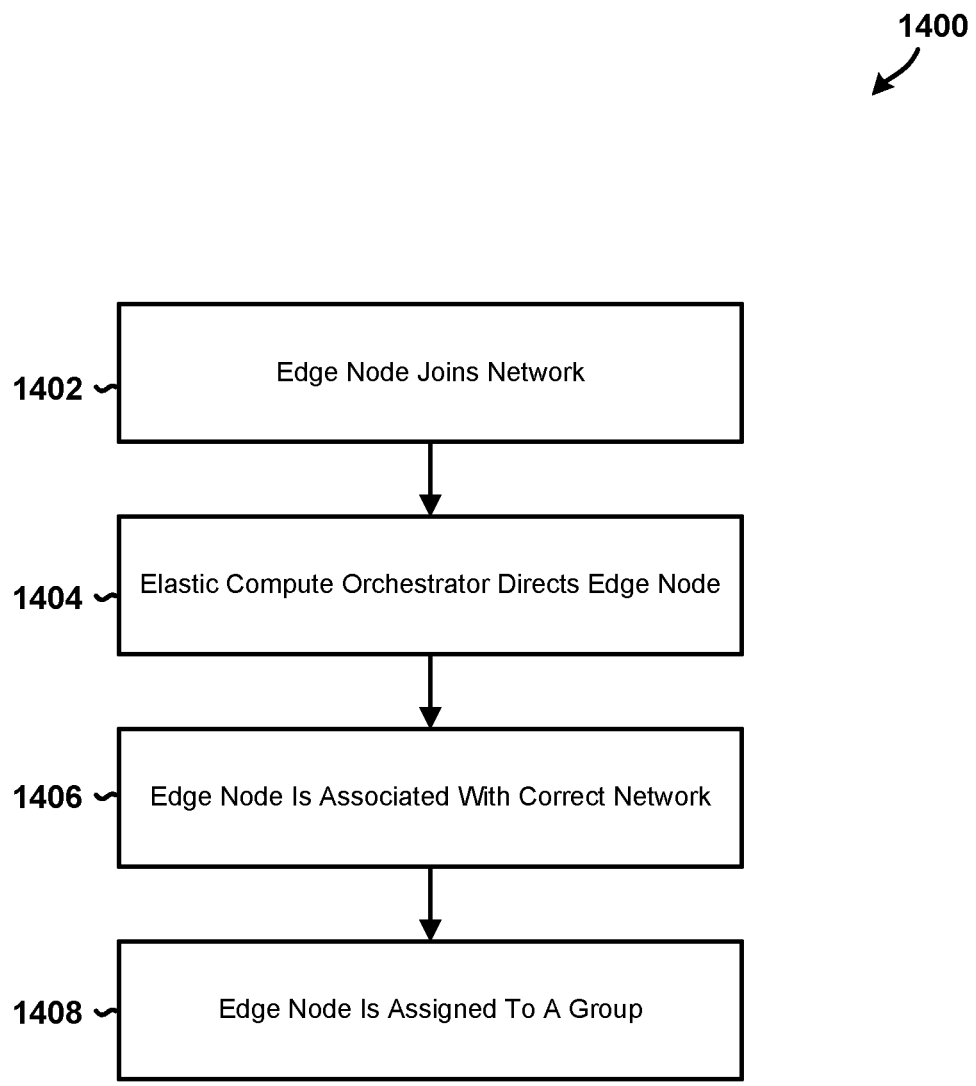
FIG. 14 is a process flow diagram illustrating a method of adding an edge node to a network and assigning the edge node to one or more groups in accordance with some embodiments.

FIG. 14 illustrates method 1400 for assigning an edge node to a group. Method 1400 may be performed by one or more processors in an edge node, which may be included as part of the ECP system 350. In block 1402, the edge node joins the network. In block 1404, the elastic compute orchestrator directs the edge node. In block 1406, the edge node is associated with the correct network. In block 1408, the edge node is assigned to a group.

Figure 15:
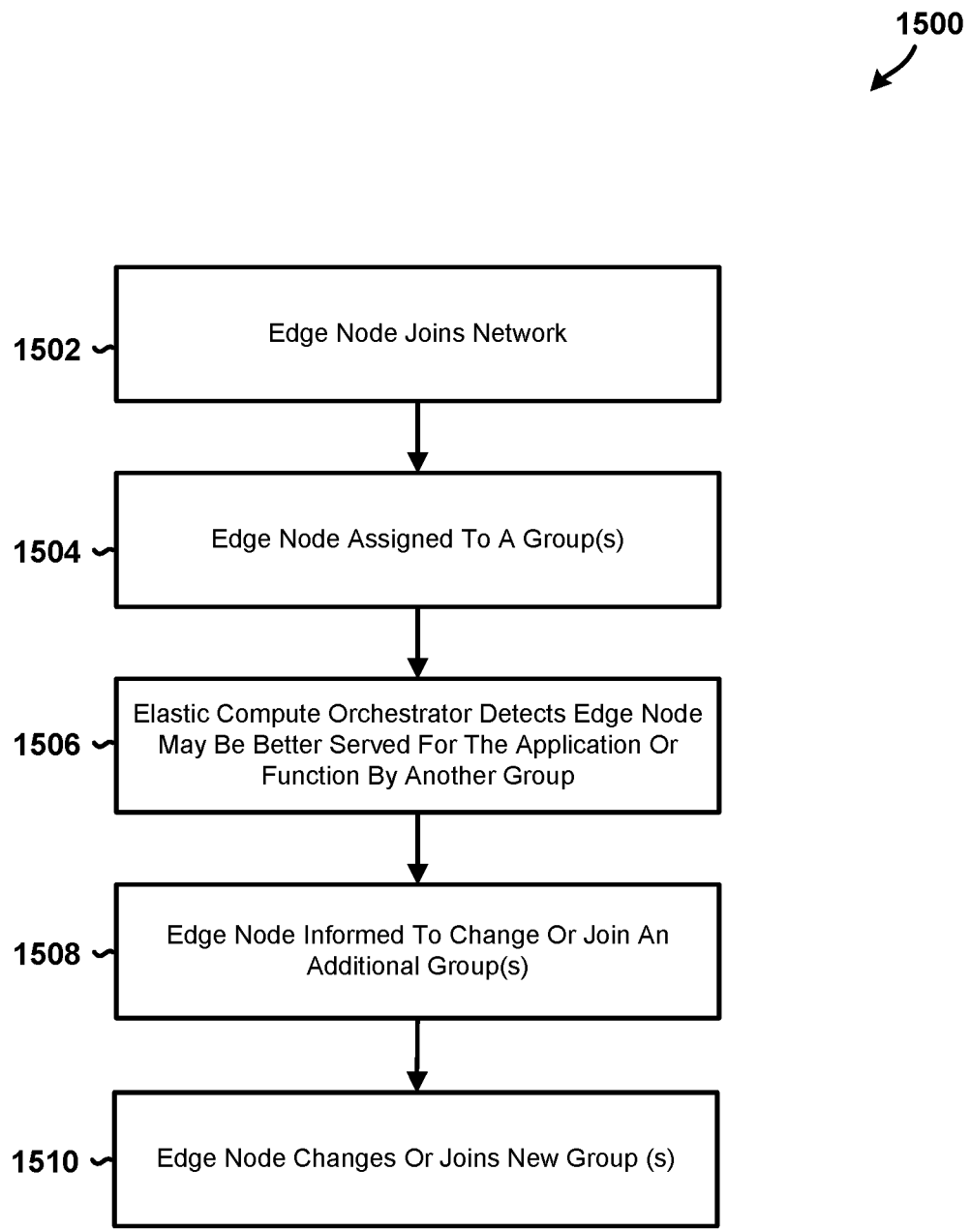
FIG. 15 is a process flow diagram illustrating an edge node network reassignment method for reassigning edge nodes to new groups in accordance with some embodiments.

FIG. 15 illustrates method 1500 of adding or reassigning an edge node to another group (add and reassignment). Method 1500 may be performed by one or more processors in an edge node, which may be included as part of the ECP system 350. In block 1502, the edge node may join a network. In block 1504, the edge node may be assigned to one or more groups. In block 1506, the edge node may, via an elastic compute orchestrator, detect that the edge node may be better served for the application or function by another group. In block 1508, the edge node may be informed to change or join an additional group(s). In block 1510, the edge node may change or join one or more new groups. An edge node may belong to multiple groups and communicate with other edge nodes in separate, diverse, distinct, or different groups if needed for reallocating end devices or applications due to hardware or other failures.

Figure 16:
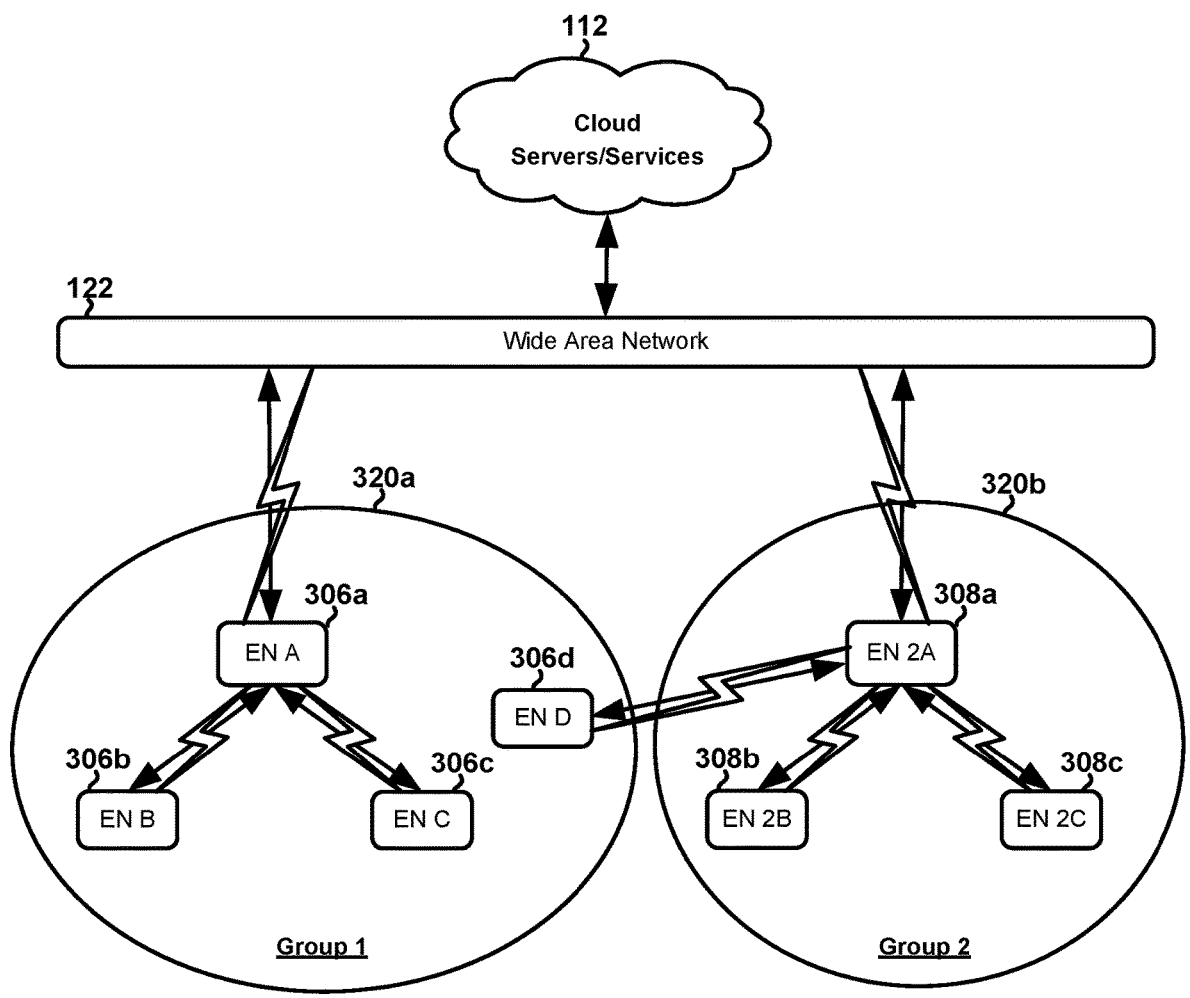
FIG. 16 is a component block diagram illustrating an example elastic edge computing system in accordance with some embodiments.

FIG. 16 illustrates an example in which EN D 306*d*, while associated with group 1, may be able to access or use resources associated with group 2. For example, EN D 306*d* may be better supported by EN 2A 308*a* from group 2 for resources, backhaul, or radio environmental factors. Because the ENs may maintain associations with multiple groups while leveraging resources from different groups, EN D 306d may remain associated with group 1 (e.g., due to grouping/collective requirements, etc.) and still utilize resources from group 2. ENs 306 may also be reassigned to different networks depending on the ECP system 350 requirements.

Figure 17:
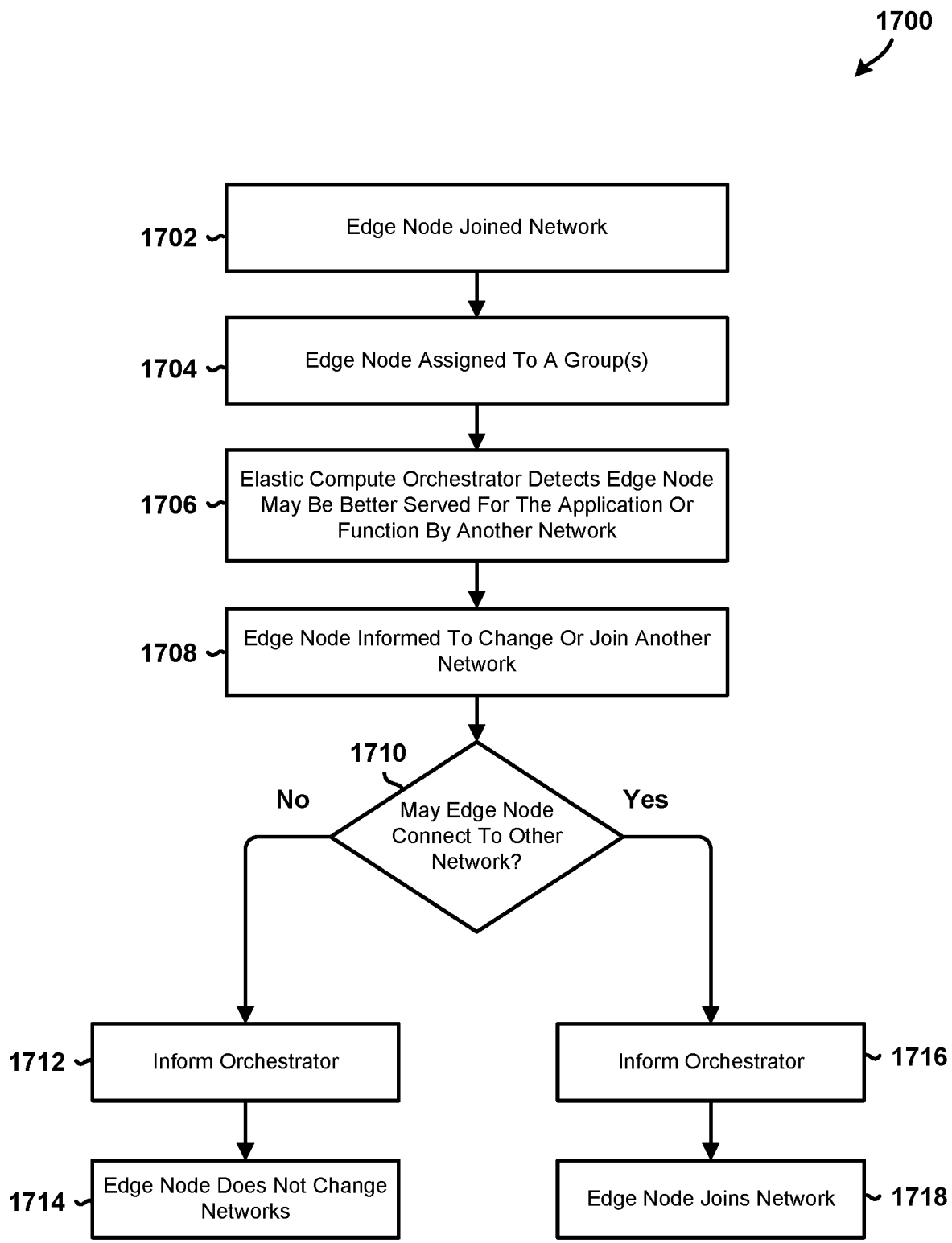
FIG. 17 is a process flow diagram illustrating a method of edge node network reassignment in accordance with some embodiments.

FIG. 17 illustrates a method 1700 of reassigning an edge node to another network in accordance with some embodiments. Method 1700 may be performed by one or more processors in an edge node, which may be included as part of the ECP system 350. Method 1700 may be performed to allow an edge node to reassign its network connection based on the guidance from the ECO. The ECO may continuously monitor the edge node's network performance and application/function requirements to determine whether a network change is necessary. If a change is needed, the edge node may attempt to connect to the new network, inform the ECO of the outcome, and update its network status accordingly. The ECO may manage the edge node's network status and performance throughout the process to ensure optimal operation and network compliance.

In block 1702, the processor may detect that edge node joined network. In block 1704, the processor may determine that edge node was assigned to a group(s). In block 1706, the processor may, via an ECO, determine that edge node may be better served for the application or function by another network. In block 1708, the processor may inform the edge node to change or join another network. In block 1708, the processor may determine whether edge node connect to other network. If no, the processor may inform the ECO in block 1712 and instruct the edge device to not change networks in block 1714. If yes, the processor may inform the ECO in block 1716 and allow the edge device to join the network in block 1718.

Figure 18:
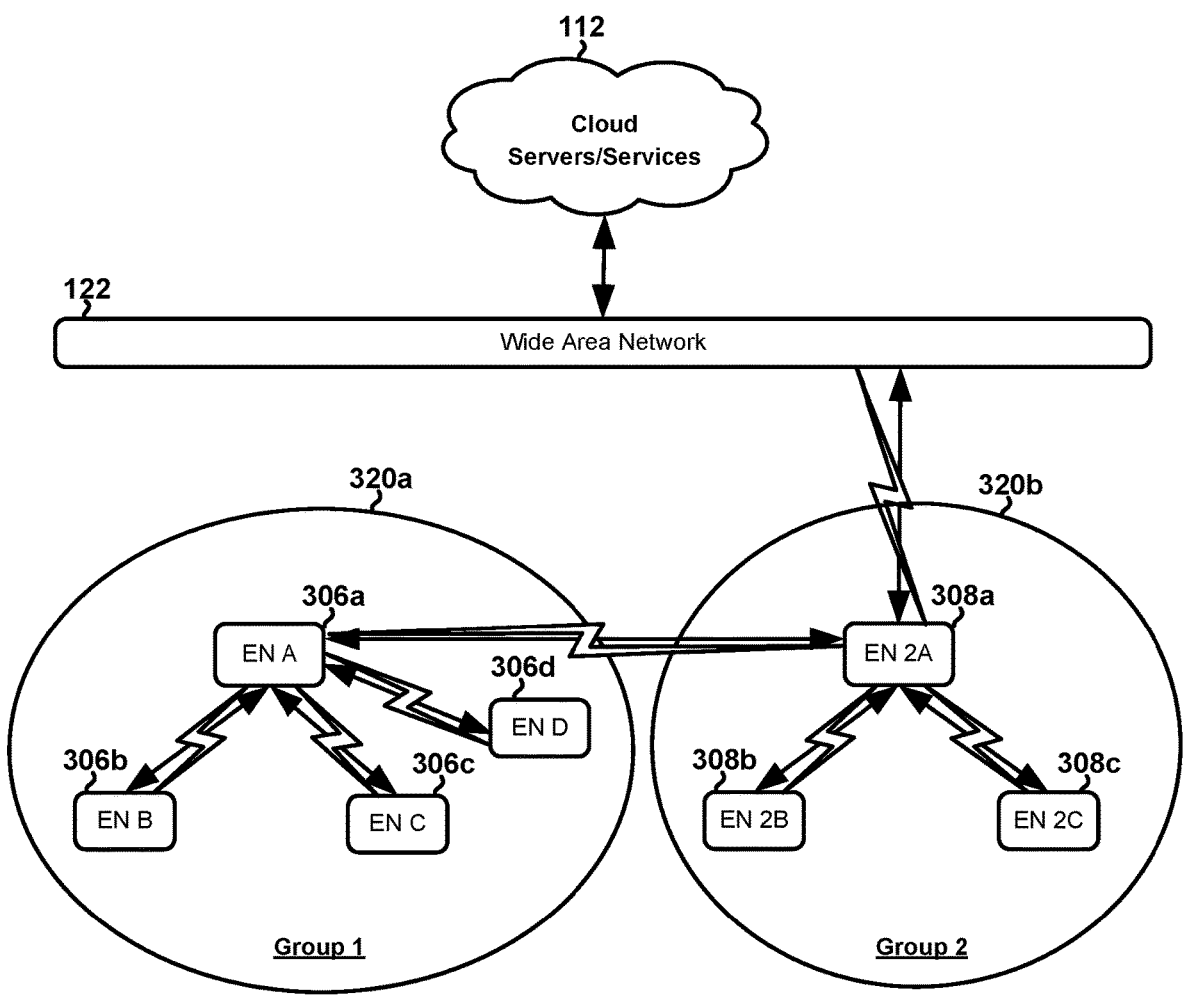
FIG. 18 is a component block diagram illustrating an example elastic edge computing system in accordance with some embodiments.

FIG. 18 illustrates an example in which a problem with the backhaul for EN A 306a that can be a link failure, QoS, KPI or some other factor. The backhaul connection for EN A 306a in FIG. 18 problem causes the network to dynamically reassign all members of group 1 to group 2, maintaining the same grouping while utilizing EN 2A 308a for backhaul connectivity.

Figure 19:
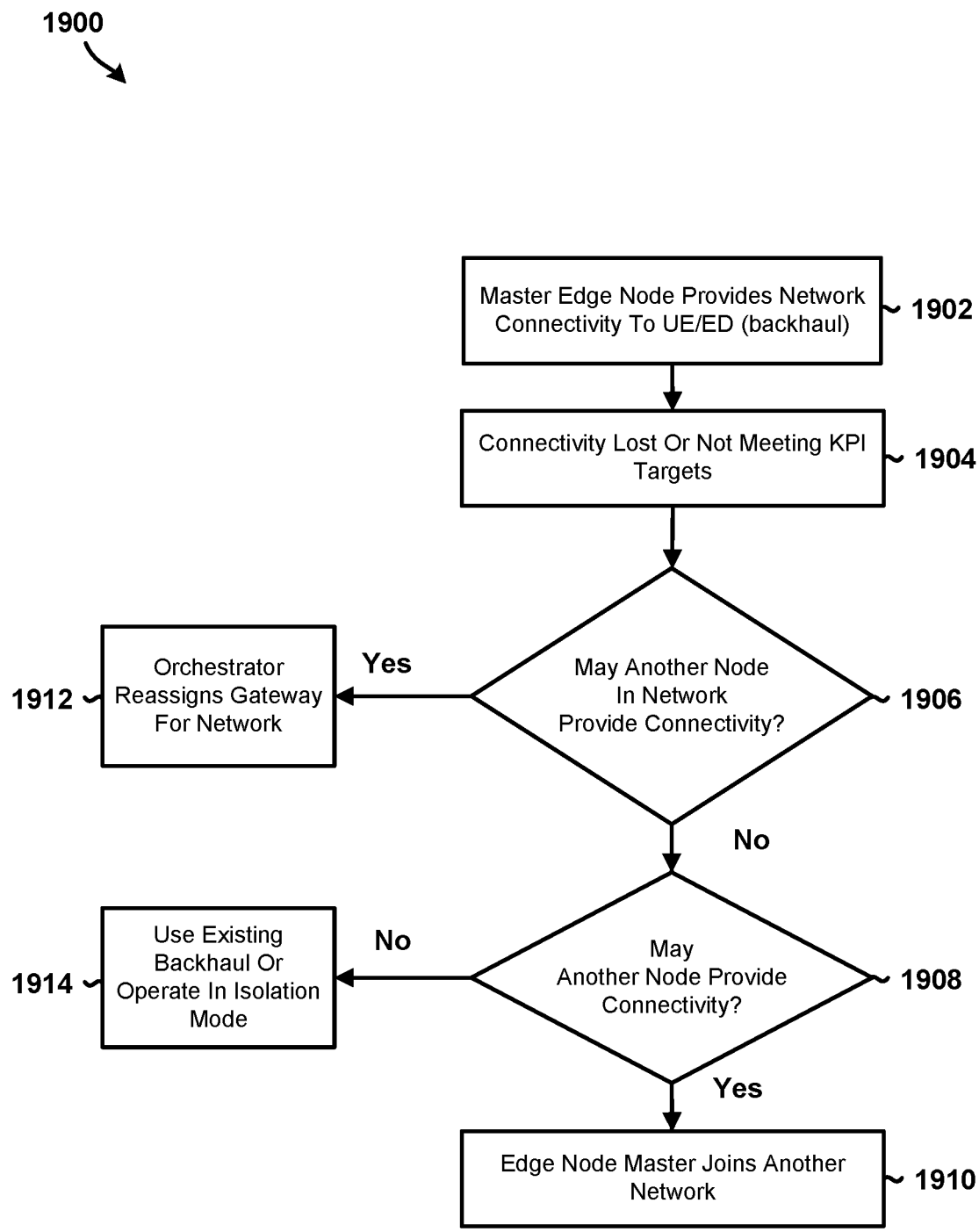
FIG. 19 is a process flow diagram illustrating a method of master edge node network connectivity reassignment in accordance with some embodiments.

FIG. 19 illustrates a method 1900 of rerouting connectivity to dynamically reassign groups in accordance with some embodiments. Method 1900 may be performed by one or more processors in an edge node, which may be included as part of the ECP system 350. Method 1900 may be performed to allow a master edge node (e.g., EN A 306a, etc.) to reassign its network connectivity based on the guidance of the ECO. The ECO may continuously monitor the master edge node's network performance and KPI targets to determine if a network change is necessary. The ECO may evaluate alternative connectivity options, either within the current network or in other networks, and may guide the master edge node through the process of reassigning its connectivity or operating in isolation mode if no alternative options are available. The ECO may manage the master edge node's network status and performance throughout the process to ensure optimal operation and network compliance.

In block 1902, the processor may determine the master edge node that is providing network connectivity (backhaul). In block 1904, the processor may determine that the connectivity is lost or not meeting KPI targets. In block 1906, the processor may determine whether another node in the network provides connectivity. If yes, the ECO may reassign the gateway for the network in block 1912. If no, the processor may determine whether another node may be used to provide connectivity in block 1908. If yes, the master edge node may join another network in block 1910. If no, the master edge node may use the existing backhaul or operate in isolation mode in block 1914.

Figure 20:
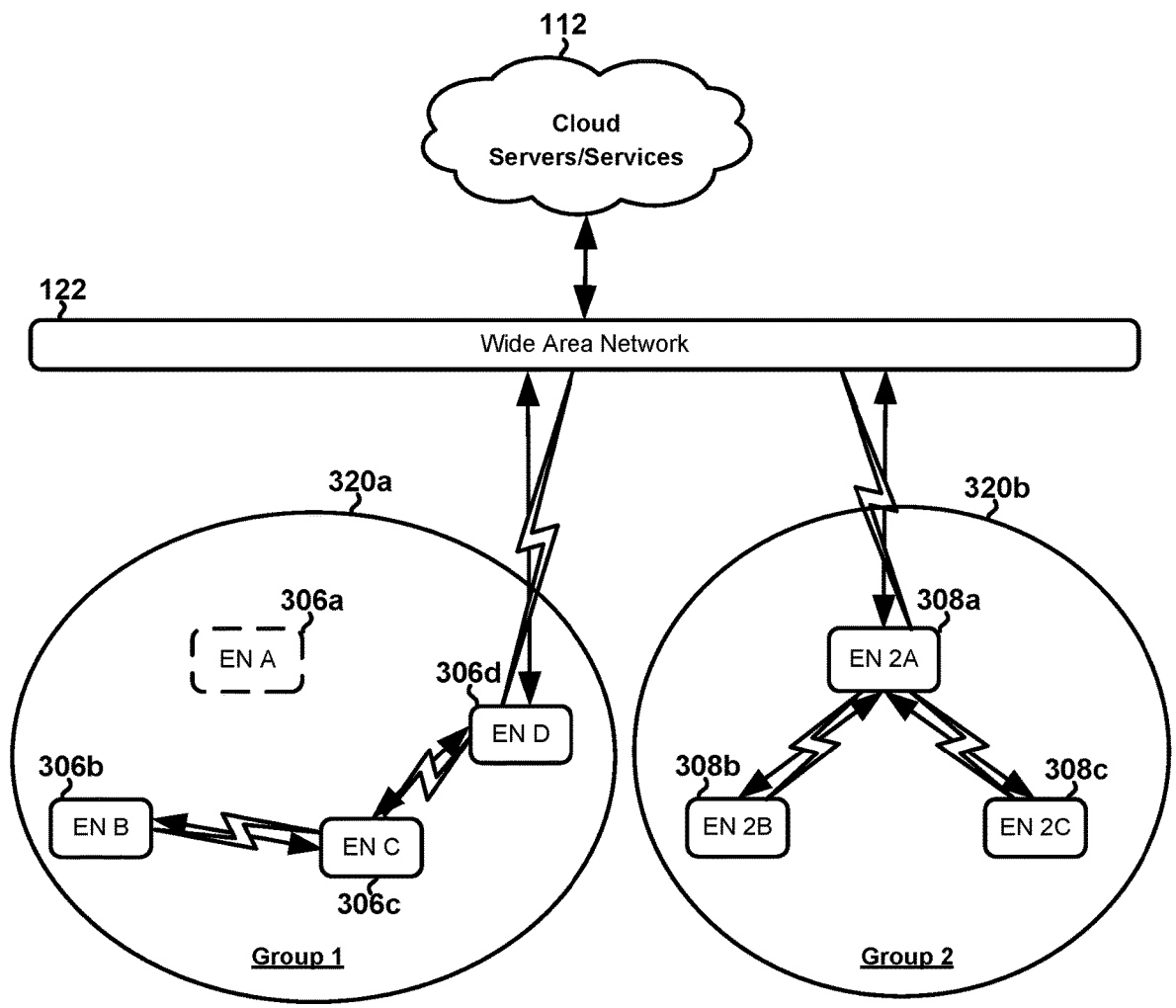
FIG. 20 is a component block diagram illustrating an example elastic edge computing system in accordance with some embodiments.

FIG. 20 illustrates a scenario in which when EN D 306d provides the backhaul for group 1 320a. In FIG. 18, EN A 306a provides the backhaul for group 1 320a. FIG. 20 represents a scenario where EN A 306a becomes disabled due to a hardware issue, firmware upgrade, or other reasons, another edge node (e.g., EN D 306d) may take over the backhaul capability and local group orchestration responsibilities. In this scenario when EN D 306d provides the backhaul for Group 1 320a EN B 306b obtains its connectivity to EN D 306d through EN C 306c.

Figure 21:
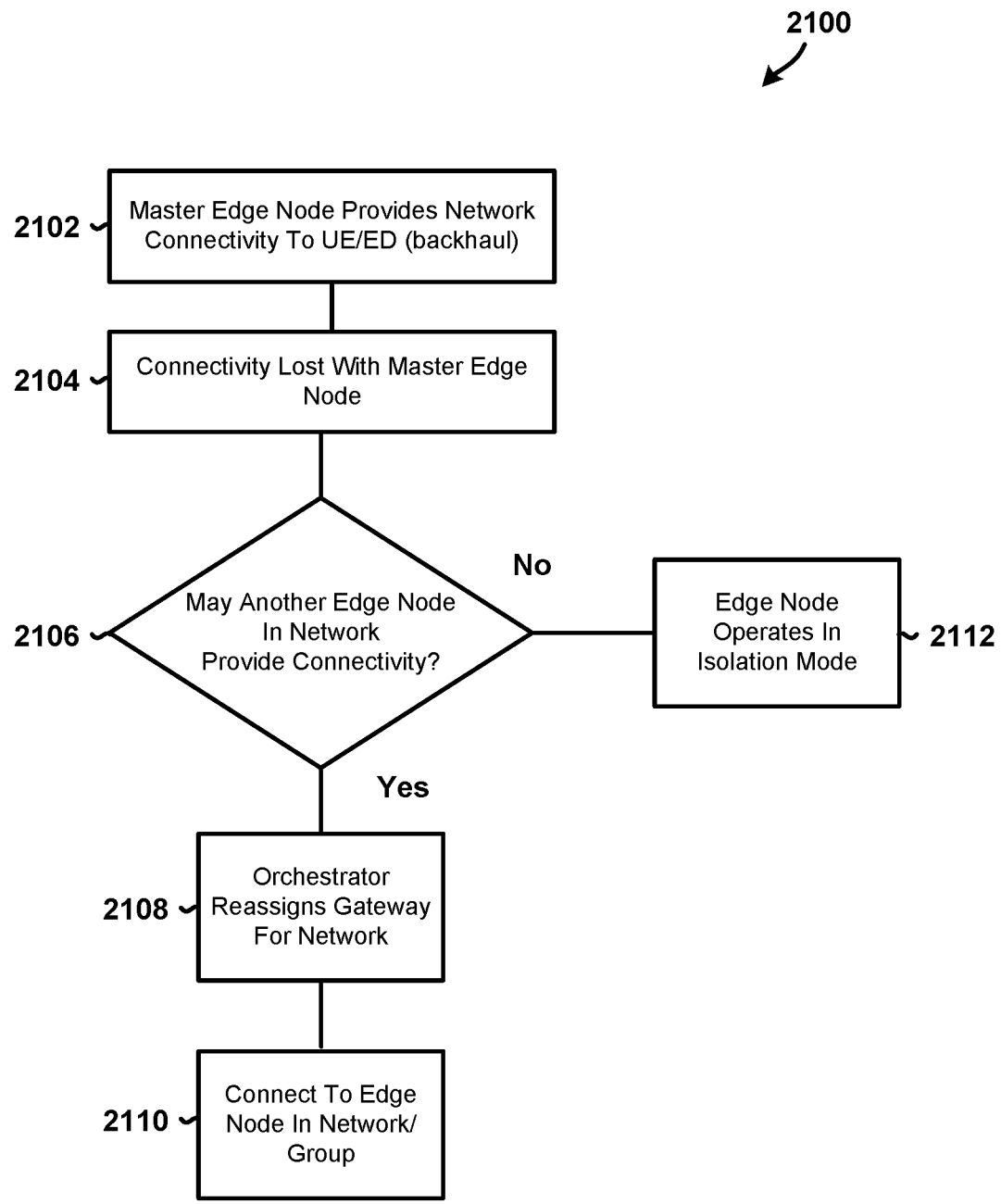
FIG. 21 is a process flow diagram illustrating a method of master edge node connectivity loss recovery for rerouting connectivity within the same group in accordance with some embodiments.

FIG. 21 illustrates a method 2100 of rerouting connectivity within the same group in accordance with some embodiments. Method 2100 may be performed by one or more processors in an edge node, which may be included as part of the ECP system 350. Method 2100 may be performed to allow recovery from a master edge node's network connectivity loss by reassigning the gateway for the network to an alternative edge node, if available. The ECO may continuously monitor the master edge node's network performance and take action when network connectivity is lost. If another edge node in the network can provide connectivity, the ECO may reassign the gateway and connect affected edge nodes in the network or group to the new gateway. If no alternative connectivity is available, the affected edge nodes may operate in isolation mode until network connectivity is restored. Throughout the process, the ECO may manage the master edge node's and alternative edge node's network status and performance to ensure optimal operation and network compliance.

In block 2102, the processor may determine that the master edge node is providing network connectivity (backhaul). In block 2104, the processor may determine that connectivity is lost with the master edge node. In block 2106, the processor may determine whether another edge node in the network may be used to provide connectivity. If no, the processor may cause one or more edge nodes to operate in isolation mode in block 2112. That is, edge nodes that lost connectivity with the master edge node may operate in isolation mode until network connectivity is restored. If yes, the ECO may reassign the gateway for the network in block 2108 and connect to the edge node in the network/group in block 2110.

The master edge node provides network connectivity (backhaul). The ECO may monitor the master edge node's network performance, detect that the network connectivity is lost with the master edge node, and determines whether another edge node in the network is able to provide connectivity. If so, the ECO may reassign the gateway for the network to the alternative edge node, connect the affected edge nodes in the network or group to the new gateway, and update the affected edge nodes' network configurations as necessary. If the ECO determines that no other edge node in the network is able to provide connectivity, the master edge node continues its operation in the current network and edge nodes that lost connectivity with the master edge node operate in isolation mode until network connectivity is restored.

Figure 22:
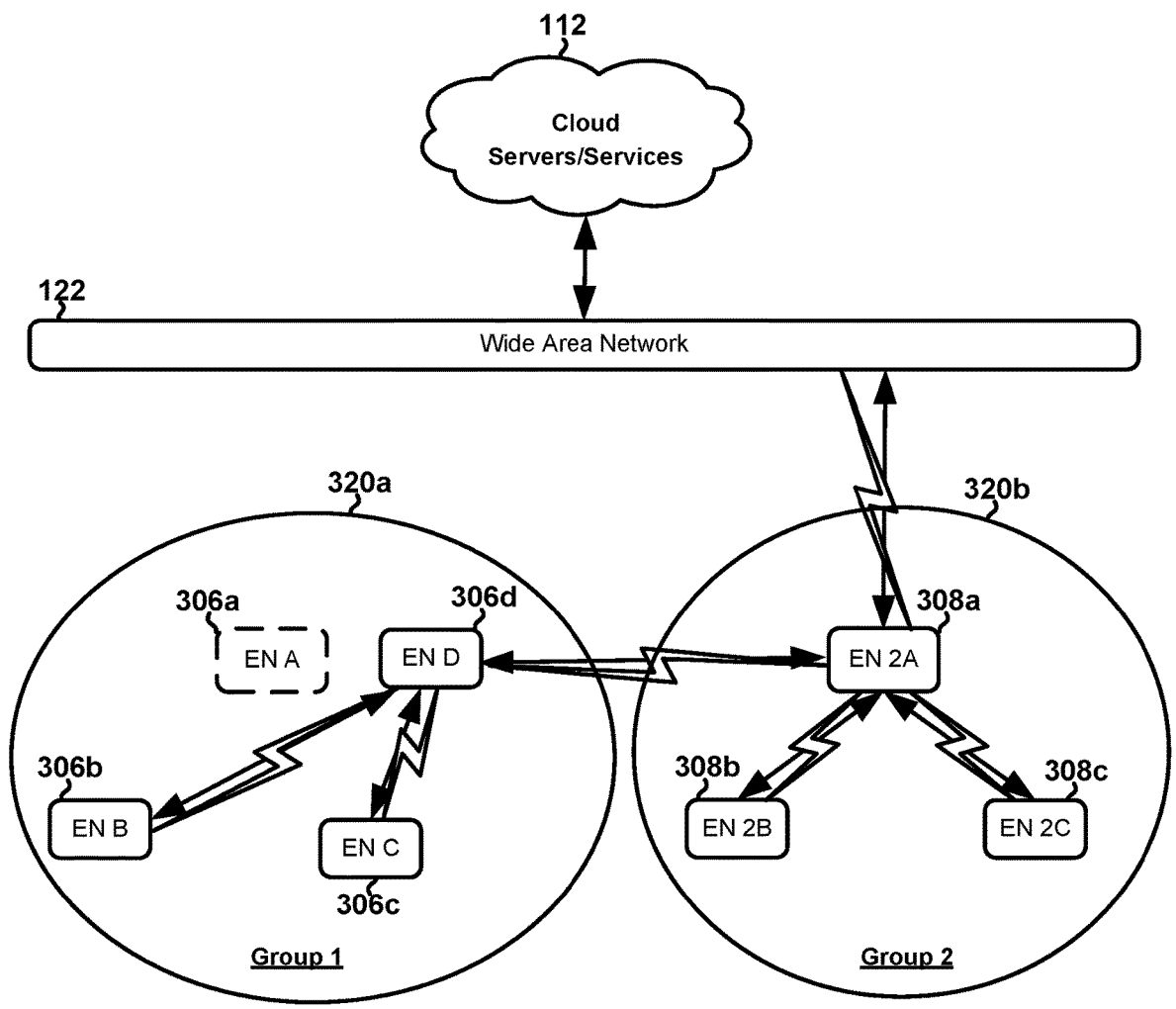
FIGS. 22-25 are component block diagrams illustrating example elastic edge computing systems configured in accordance with various embodiments.
Figure 23:
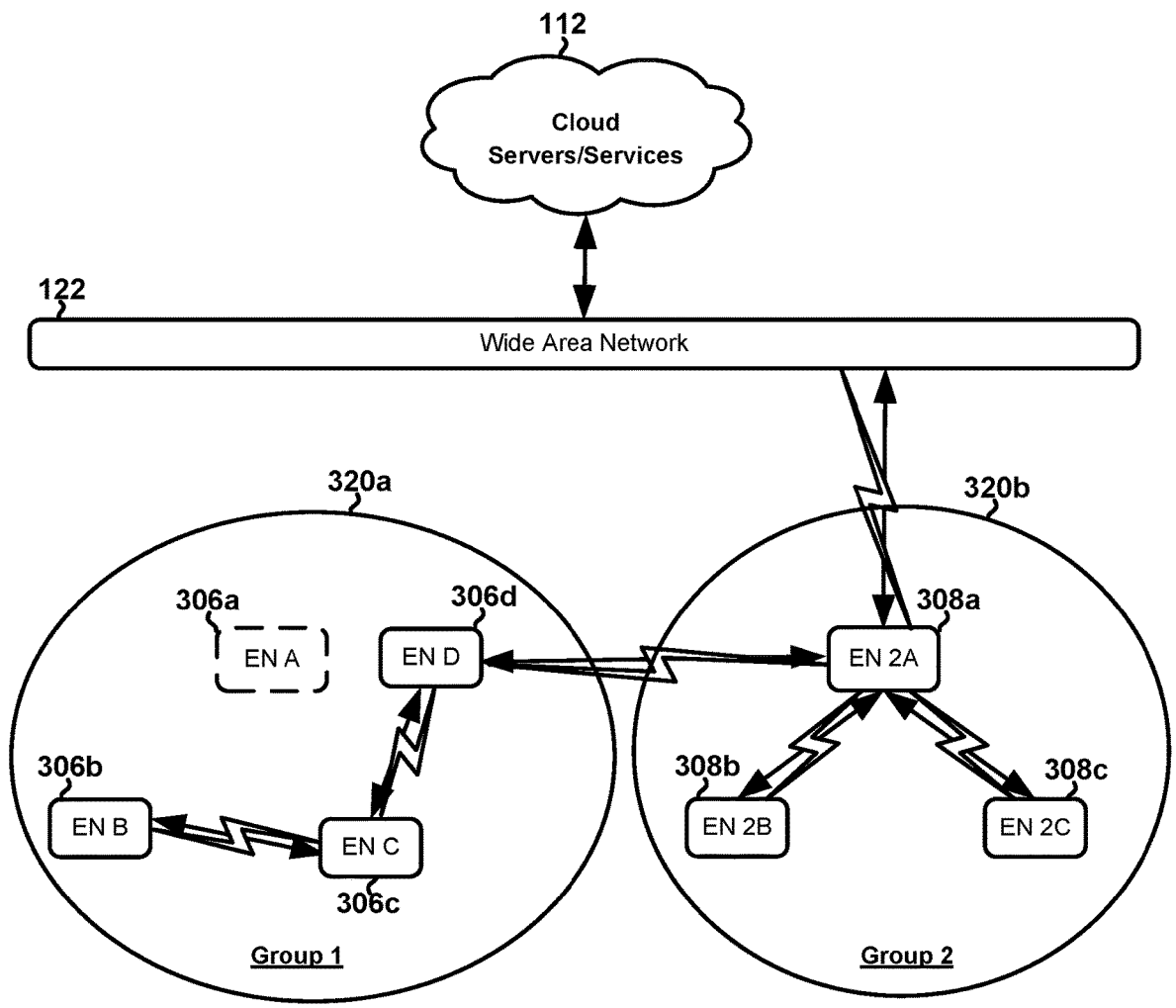

FIGS. 22 and 23 illustrate that when EN D 306d takes over the backhaul capability and local group orchestration through EN 2A 308a, another EN 306 in group 1 may provide backhaul and local group orchestration. In some embodiments, the ECP system 350 may be configured to offer richer features than peer-to-peer services, allowing edge nodes to communicate with other edge nodes, even if they are not directly connected. In the case of multi-hop backhaul and connectivity rerouting to another network, the connectivity method used by EN B 306b to reach EN D 306d may differ from that in FIG. 22.

Figure 24:
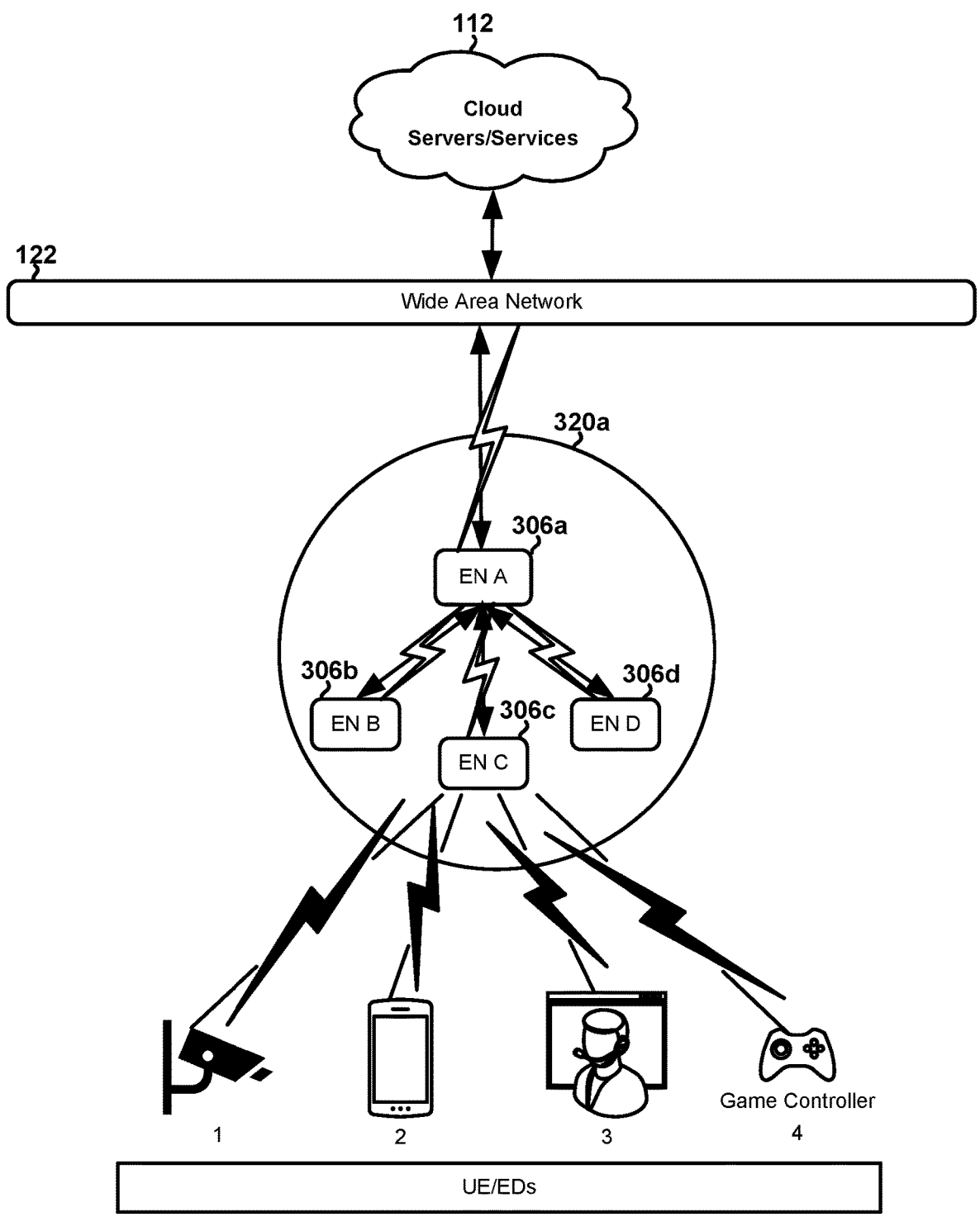

FIG. 24 illustrates a situation in which EN C 306c has multiple end devices and is part of a network that includes EN A 306a, EN B 306b, and EN D 306d. In this example, all edge nodes belong to the same group or network. In ECP system 350, end devices are integrated into the network topology, allowing them to utilize their computing capabilities for service delivery and creation. By incorporating end devices into the ECP system 350 hierarchy, the end devices may connect to one or more edge nodes for service delivery and creation, share resources with edge nodes or other end devices, or both.

Figure 25:
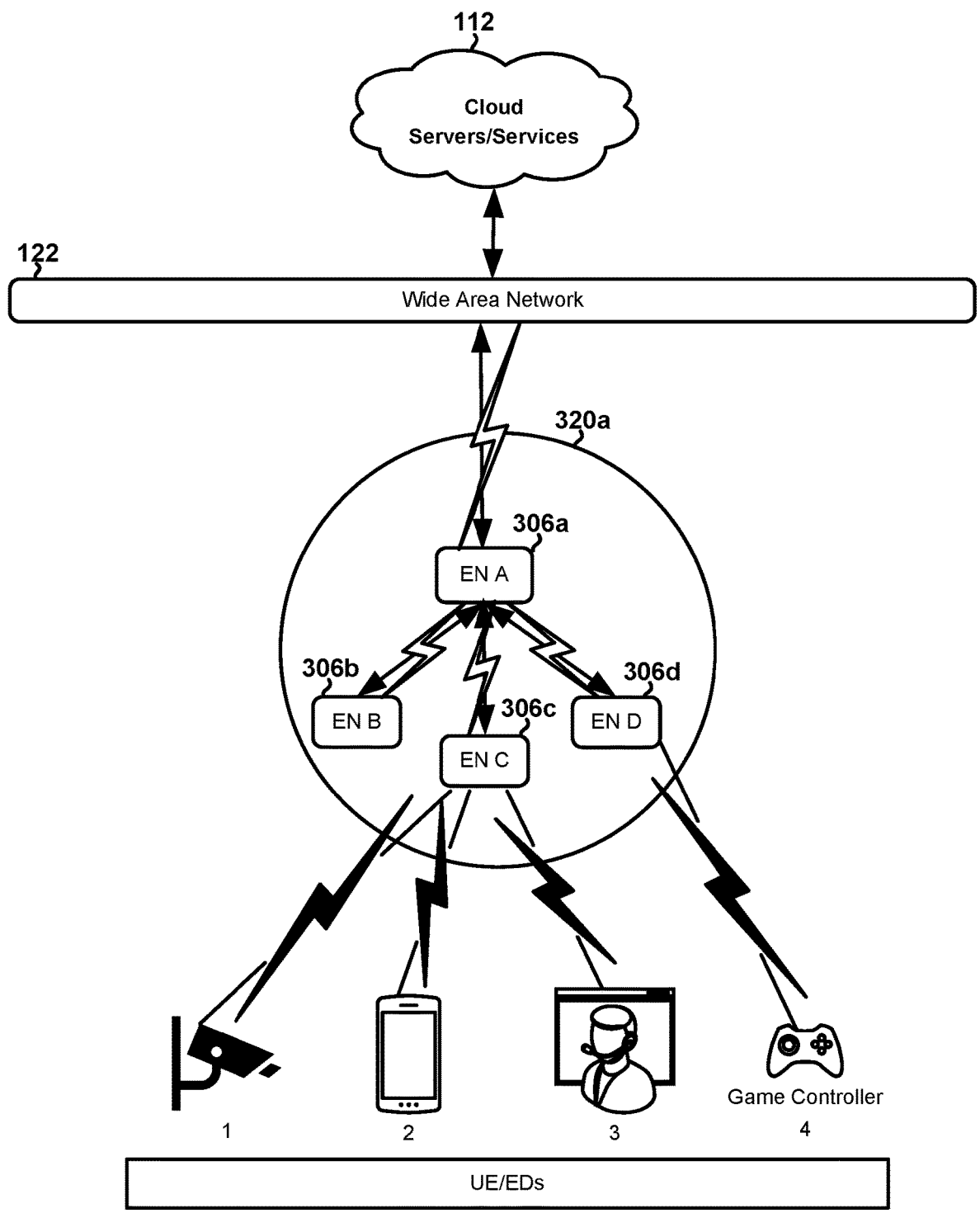

FIG. 25 illustrates an example of an end device (4) that may be better served for receiving or creating the application service using another edge node. Initially connected to EN C 306c, end device (4) is instructed to move to EN D 306d to better meet resource requirements for the service.

Figure 26:
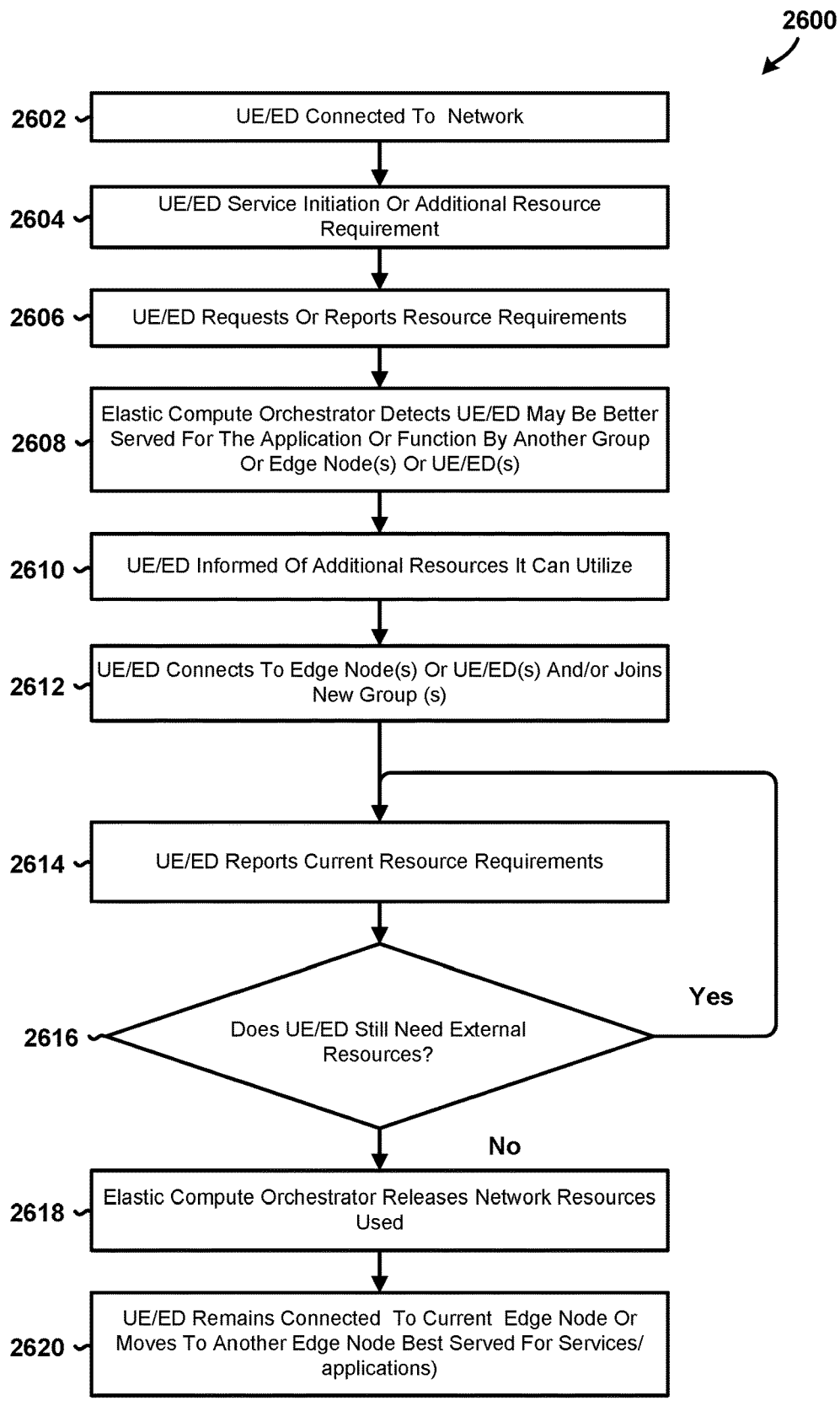
FIG. 26 is a process flow diagram illustrating a resource allocation and optimization method in accordance with some embodiments.

FIG. 26 illustrates a method 2600 of utilizing resources from another edge node (or user device, user equipment, etc.) in accordance with some embodiments. Method 2600 may be performed by one or more processors in an edge node, which may be included as part of the ECP system 350. Method 2600 may be performed to provide UE (or UD, etc.) resource allocation and optimization by continuously monitoring and adjusting resources based on the UE's requirements. The ECO may determine whether the UE could benefit from additional resources or a different edge node or group. If the ECO detects that the UE may be better served by other resources, it may inform the UE, which may then connect to the recommended resources and report its current requirements. The ECO may continue monitoring the UE's resource requirements and releases network resources when they are no longer needed. This ensures that the UE remains connected to the most suitable edge node and utilizes the optimal resources for its services and applications.

In block 2602, the UE (or ED) is connected to the network. In block 2604, the processor detects UE service initiation or additional resource requirement. In block 2606, the processor determines that UE requests or reports resource requirements. In block 2608, the processor, via the ECO, may determine UE may be better served for the application or function by another group or edge node(s) or UE. In block 2610, the processor determines that UE informed of additional resources it can utilize. In block 2612, the processor determines that UE connects to edge node(s) or UE(s) and/or joins new group (s). In block 2614, UE may report current resource requirements. In block 2616, the processor determines whether UE still needs external resources. If so, the UE reports current resource requirements again in block 2614. The ECO may assign the UE to another EN or free resources from the existing EN it is connected or have the UE use less than optimized resources or have UE use less than optimized resources until additional resources become available for use. If no, the ECO may release network resources used in block 2618 and the UE remains connected to current edge node or moves to another edge node best served for services/applications in block 2620.

The examples described with reference to FIG. 25 and FIG. 26 may also include the UE or an end device (ED) utilizing another edge node's resources, even if it is not physically connected but logically connected. The utilization of another edge node's resources may be done dynamically to handle peak surges in resource requirements.

The examples described in FIG. 25 and FIG. 26 may also apply to an end device utilizing other end devices' resources, allowing for dynamic resource allocation to handle peak surges in resource requirements. Further, dynamic reassignment of end devices may also occur for resiliency and quality of service (QoS) requirements.

In the ECP system 350, when an edge node experiences a failure rendering it nonfunctional for a short or long period, end devices may be immediately moved to other functional edge nodes to maintain service continuity. For example, in FIG. 24, EN C 306c experiences a failure.

Figure 27:
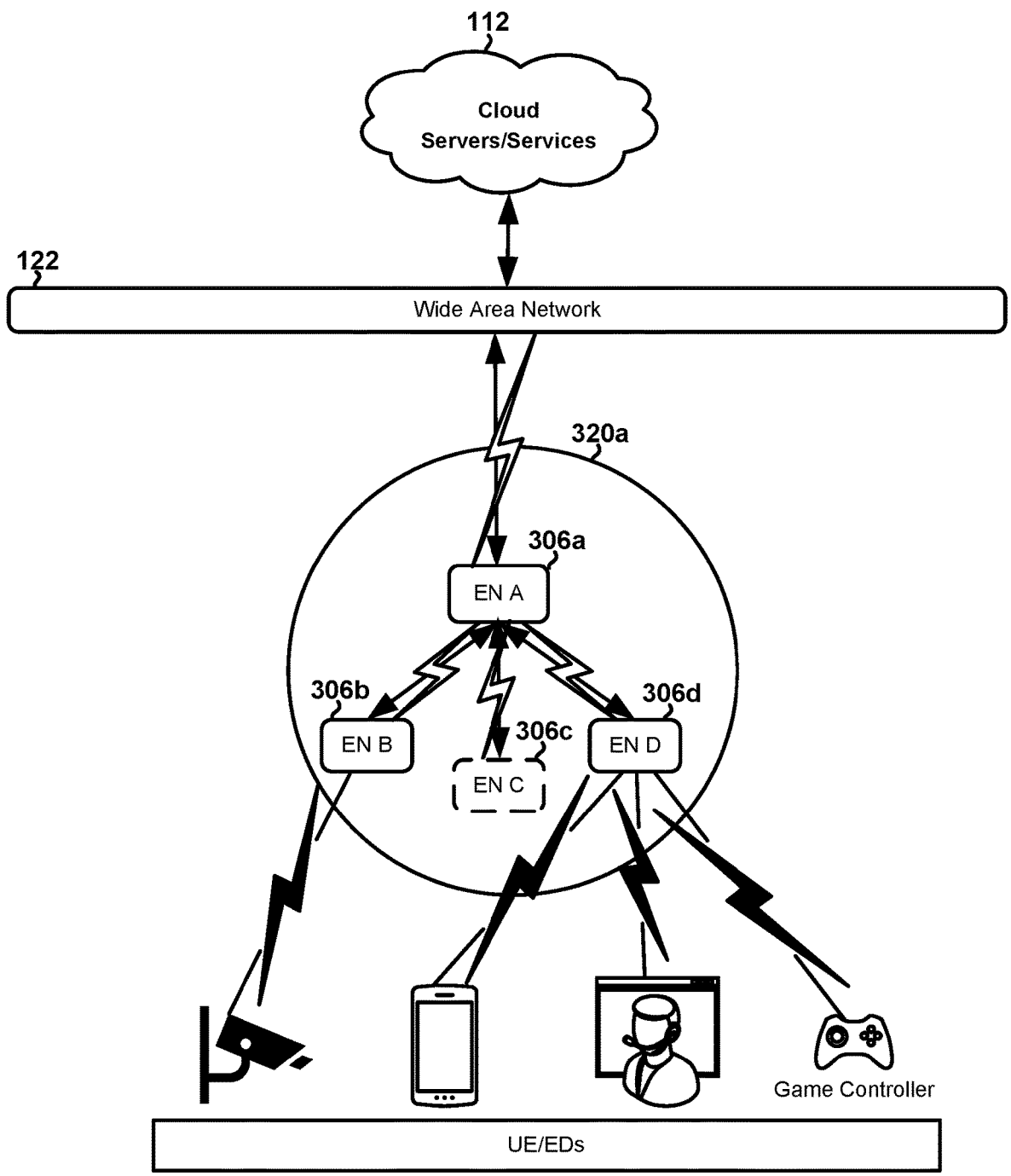
FIG. 27 is a component block diagram illustrating an example elastic edge computing system in accordance with some embodiments.

FIG. 27 illustrates an example in which the ECP system 350 causes the end devices to be moved to EN B 306b and EN D 306d. The end devices moved from EN C 306c to either EN B 306b or EN D 306d have previously reported their preferred communication and alternative communication options.

Figure 28:
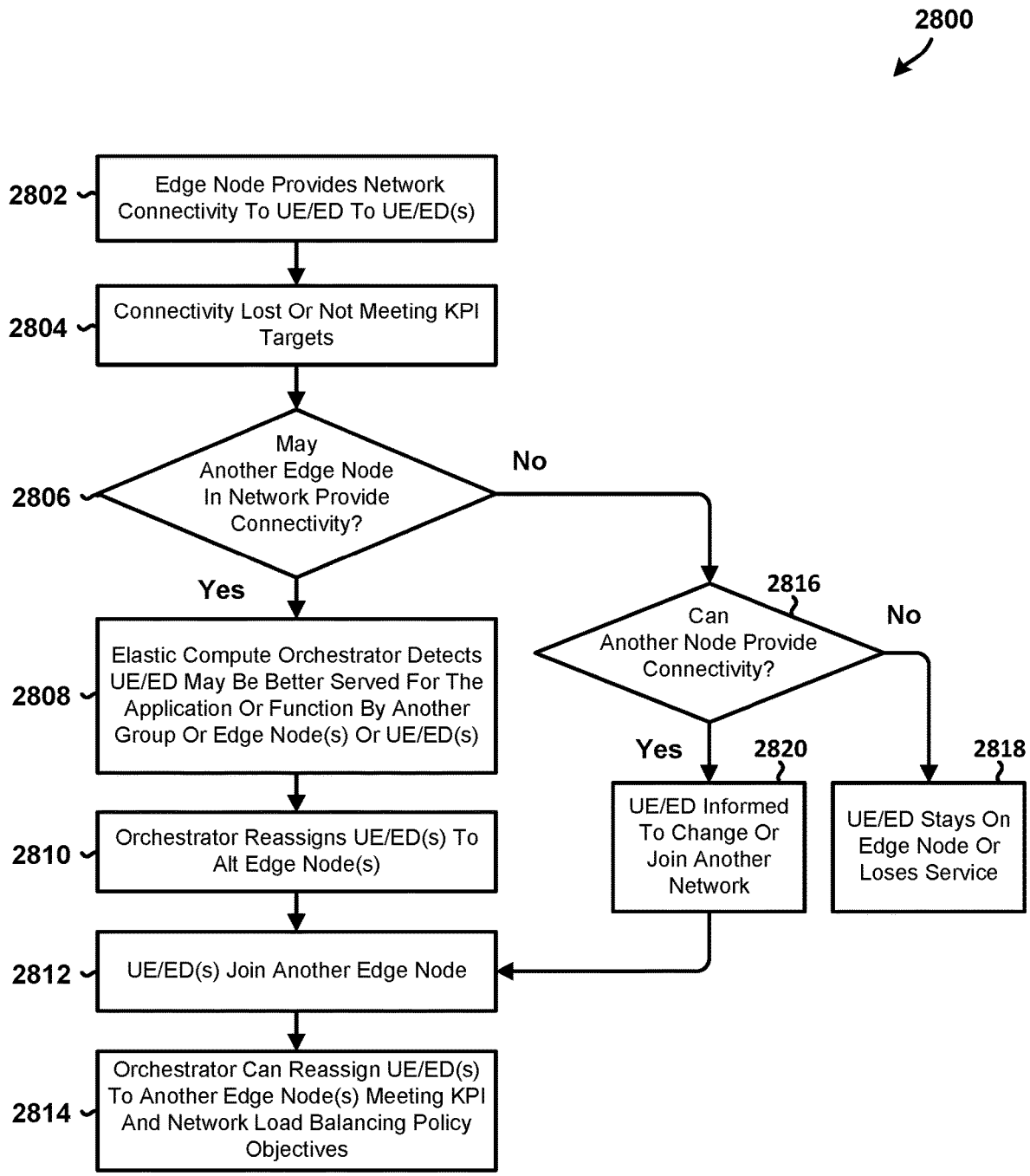
FIG. 28 is a process flow diagram illustrating a method of edge node connectivity loss and end device reassignment in accordance with some embodiments.

FIG. 28 illustrates a method 2800 of dynamically migrating end devices for service continuity, either with other edge nodes in the same network or group or with another network, in accordance with some embodiments. Method 2800 may be performed by one or more processors in an edge node, which may be included as part of the ECP system 350. In overview, when EN C 306c comes back online, the end devices that were moved to EN B 306b and EN D 306d may be moved back to EN C 306c. Said another way, method 2800 may be performed to manage connections when an edge node providing network connectivity experiences a loss or fails to meet KPI targets, and then comes back online. The ECO may determine whether another edge node is able to provide connectivity to the affected UE/ED(s). If the ECO identifies a suitable alternative, may reassign the UE/ED(s) to the new edge node(s) and continues monitoring the connections to ensure they meet KPI and network load balancing policy objectives. If no suitable alternatives are available, the UE/ED either stays on the current edge node or loses service, depending on the situation.

In block 2802, the processor may determine edge node providing network connectivity to UE. In block 2804, the processor may determine that the connectivity lost or not meeting KPI targets. In block 2806, the processor may determine whether another edge node in network is able to provide connectivity. If so, in block 2808, the ECO may detect UE may be better served for the application or function by edge node(s) or UE(s) in the same group or in another group. In block 2810, the orchestrator may reassign UE(s) to alt edge node(s). In block 2812, the UE(s) may join another edge node. In block 2814, the orchestrator may reassign UE(s) to another edge node(s) meeting KPI and network load balancing policy objectives. If the processor determines whether another edge node in network is able to provide connectivity may determine whether another node provide connectivity in block 2816. If no, the UE stays on edge node or loses service in block 2818. If yes, the UE may be informed to change or join another network in block 2820.

ECP system 350 may also be configured to allow automated discovery and establishment of groups and services that may be delivered. It may associate edge nodes and devices by groups using an automated discovery process. As part of this process, groups are logical associations of edge nodes, which may be pods in Kubernetes (k8/k3s) or another similar method of delivering an environment for applications or functions to operate.

When a device or EN C 306 comes online or seeks to become part of a network, its role may be pre-configured or not. The edge node may obtain connectivity with the network either through wireless or wired connections. In traditional data center deployments, groups are formed manually based on parameters such as room, row, rack, or sub-rack to which the physical or logical nodes are associated. This manual formation of groups may be predictable and well-understood.

In ECP system 350, groups may be formed dynamically based on various parameters, including TAG, logical edge node location, physical edge node location (latitude, longitude, altitude), subnet, application, classification, and age. The TAG may be a unique identifier, such as a DHCP TAG, or any physical or electronic method of identifying an edge node or end device within the ECP system 350 or ecosystem. The classification may be those currently used for LLDP/CDP classification or any other method, while the age may refer to the time an edge node or end device has been active and connected to the ecosystem. In all cases, edge nodes and end devices may provide credentials to gain access to the network. The edge node's location is either provided by the edge node itself or identified based on the edge node it is attempting to join the group with.

ECP system 350 may also be configured to allow N-dimensional correlation for edge nodes and end devices, automatically forming them into logical groups. This auto-formation of edge nodes and end devices into logical groups may allow for higher resiliency through the association of common criteria during group formation. Auto groups may consist of only edge nodes, only end devices, or a combination of both. The groups formed automatically may include overlapping groupings.

Depending on the specific criteria used for group formation, an edge node or end device may be a member of multiple groups or be associated with multiple groups. This association with multiple groups may allow for dynamic reallocation of group memberships when an edge node or end device moves from one geographic location to another, where connectivity with all previous group memberships may no longer be valid. In addition, there may be explicit parts of a group or association that require distinct levels of resiliency.

ECP system 350 may allow for dynamic grouping of edge nodes and end devices, enabling systems like Kubernetes or container processes to group containers effectively. Containers may be grouped within edge nodes, between edge nodes, within end devices, between end devices, or between both edge nodes and end devices. By dynamically allocating container groups using a hierarchy like Helm, containers may be deployed into known groups, allowing for seamless integration of new edge nodes and end devices.

Figure 29:
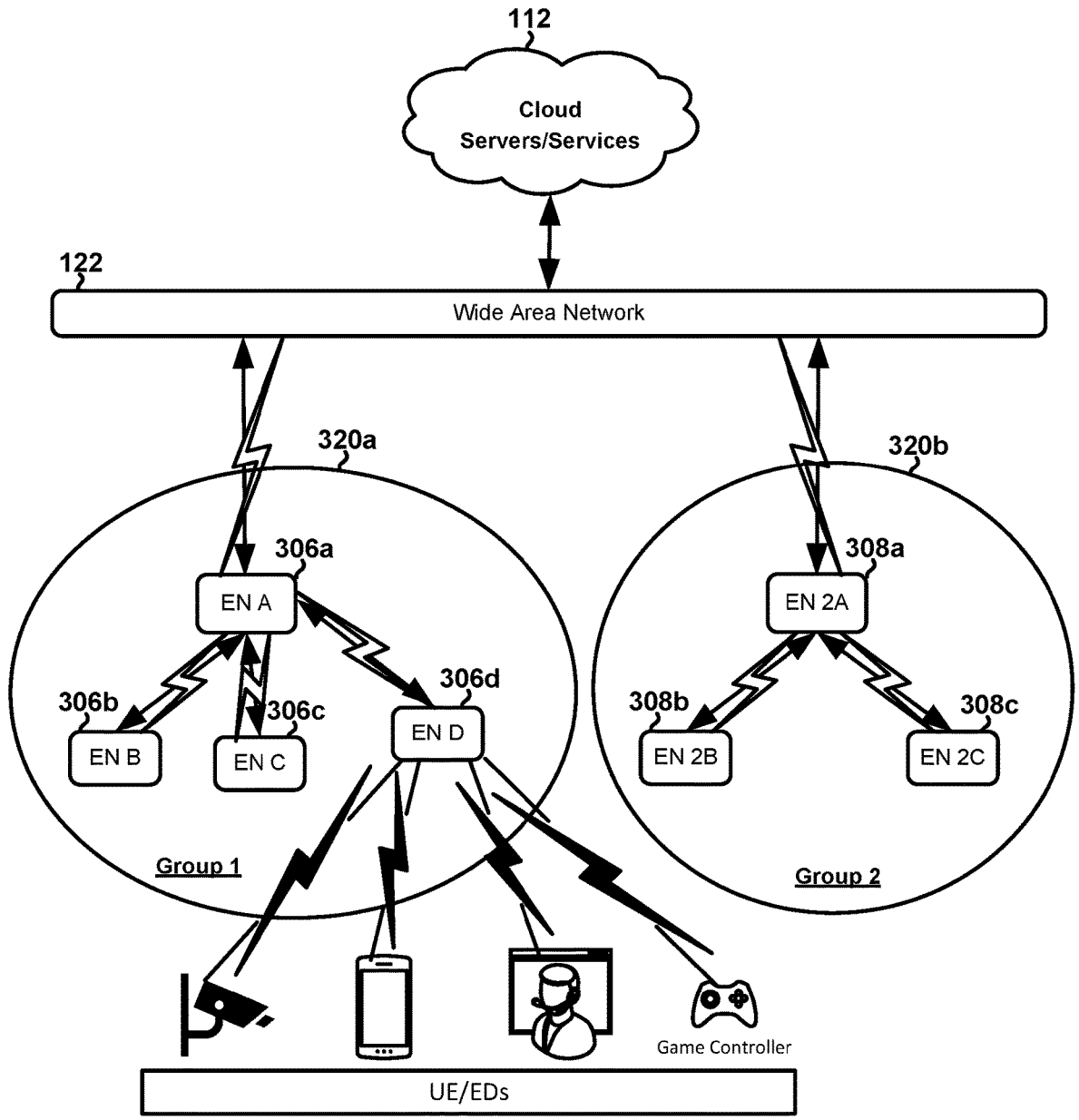
FIGS. 29-40 are component block diagrams illustrating example elastic edge computing systems configured in accordance with various embodiments.

FIG. 29 illustrates an example of network resiliency in an ECP system 350. For example, in FIG. 29, there are two groups of edge nodes: Group 1 320a and Group 2 320b. Group 1 320a may include ENs 306a-d while Group 2 320b, a related but logically separated network, may include ENs 308a-c.

In a scenario where EN D 306d experiences a failure that renders it nonfunctional temporarily or permanently, end devices connected to it would be immediately moved to other edge nodes within Group 1, such as EN C 306c.

End devices may be moved to different edge nodes based on their connectivity, initial network assignment, group memberships, and resource requirements.

Figure 30:
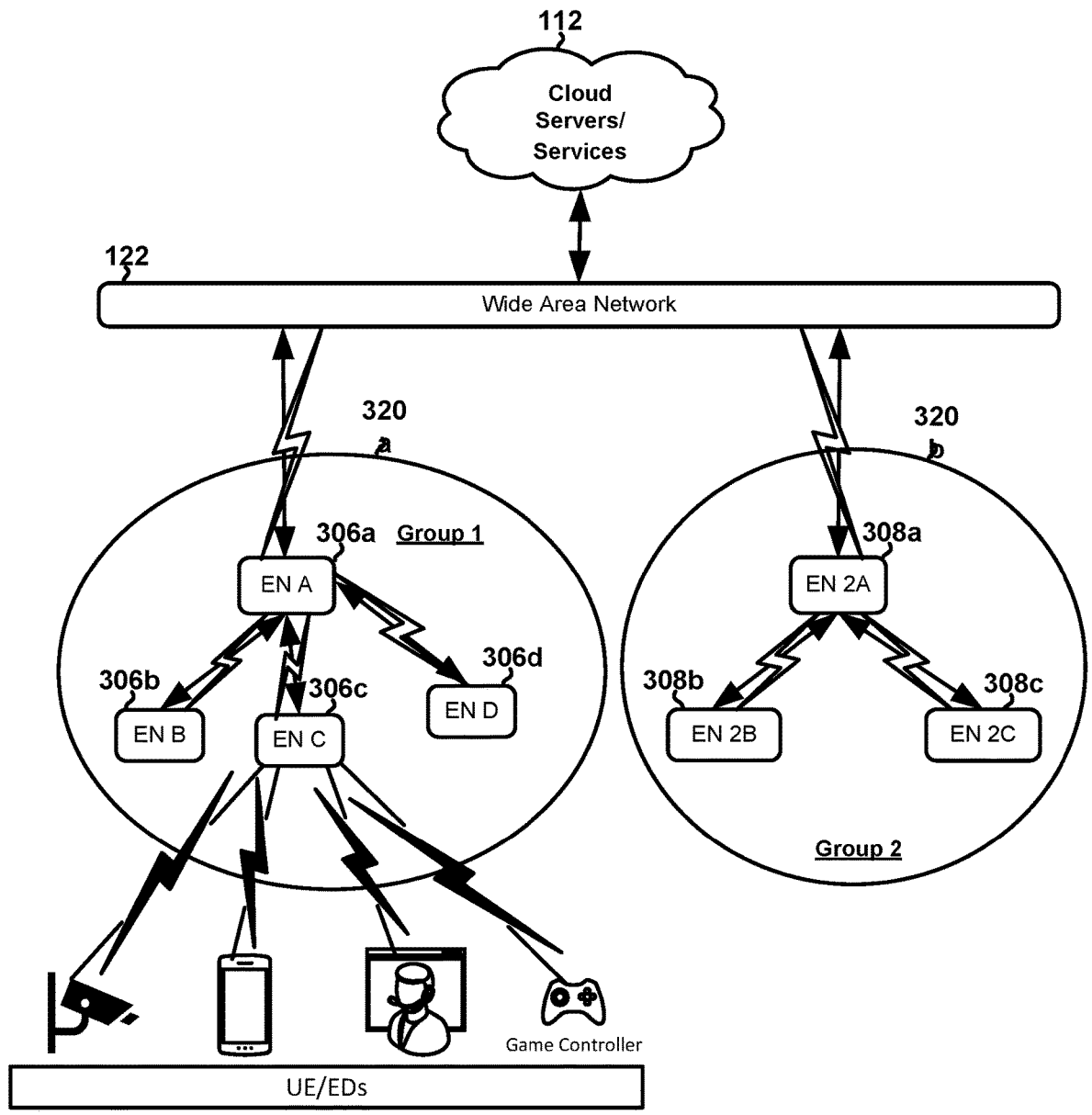

FIG. 30 illustrates an example in which one end device from Group 1 is moved to EN 2B 308b in Group 2 (e.g., because it may be best served by that node, etc.). During a failure, end devices from Group 1 may be allowed to use other available edge nodes in separate groups for resiliency purposes. End devices may report their preferred edge nodes for communication and alternative communication options to facilitate this dynamic movement during network failures.

FIG. 30 illustrates end devices being moved from EN D 306d to Edge Nodes 1C and 2B across multiple groups. Employing different groups or collectives may enhance resiliency or functionality by clustering similar edge nodes together. These similar edge nodes may have the same manufacturer, model, and configuration or possess LLDP or CDP functionality. Groupings may be overlapping, hierarchical, and non-hierarchical, allowing an edge node to associate with multiple groups based on the intended function of the group, such as service delivery or resiliency improvement.

Figure 31:
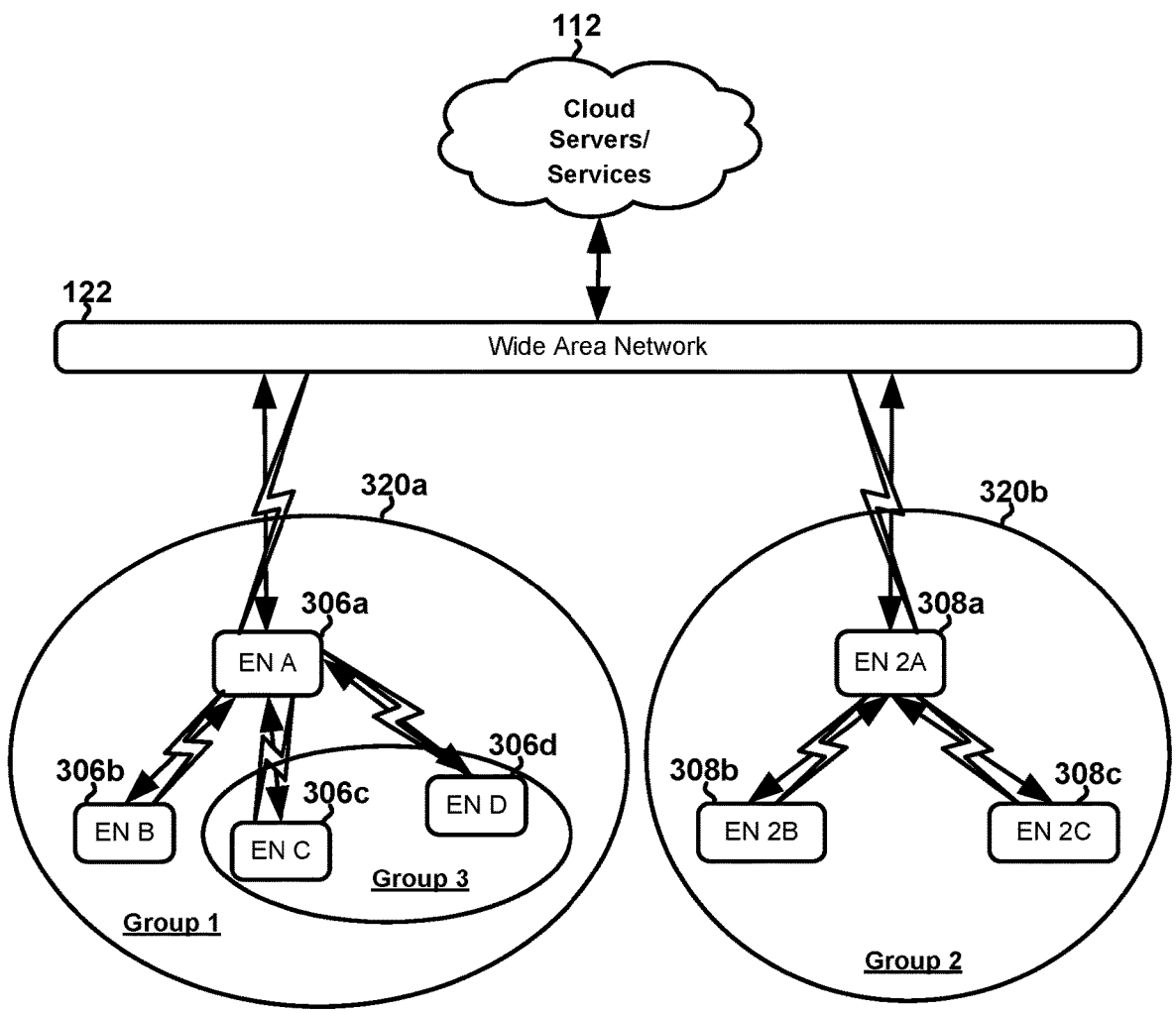
Figure 32:
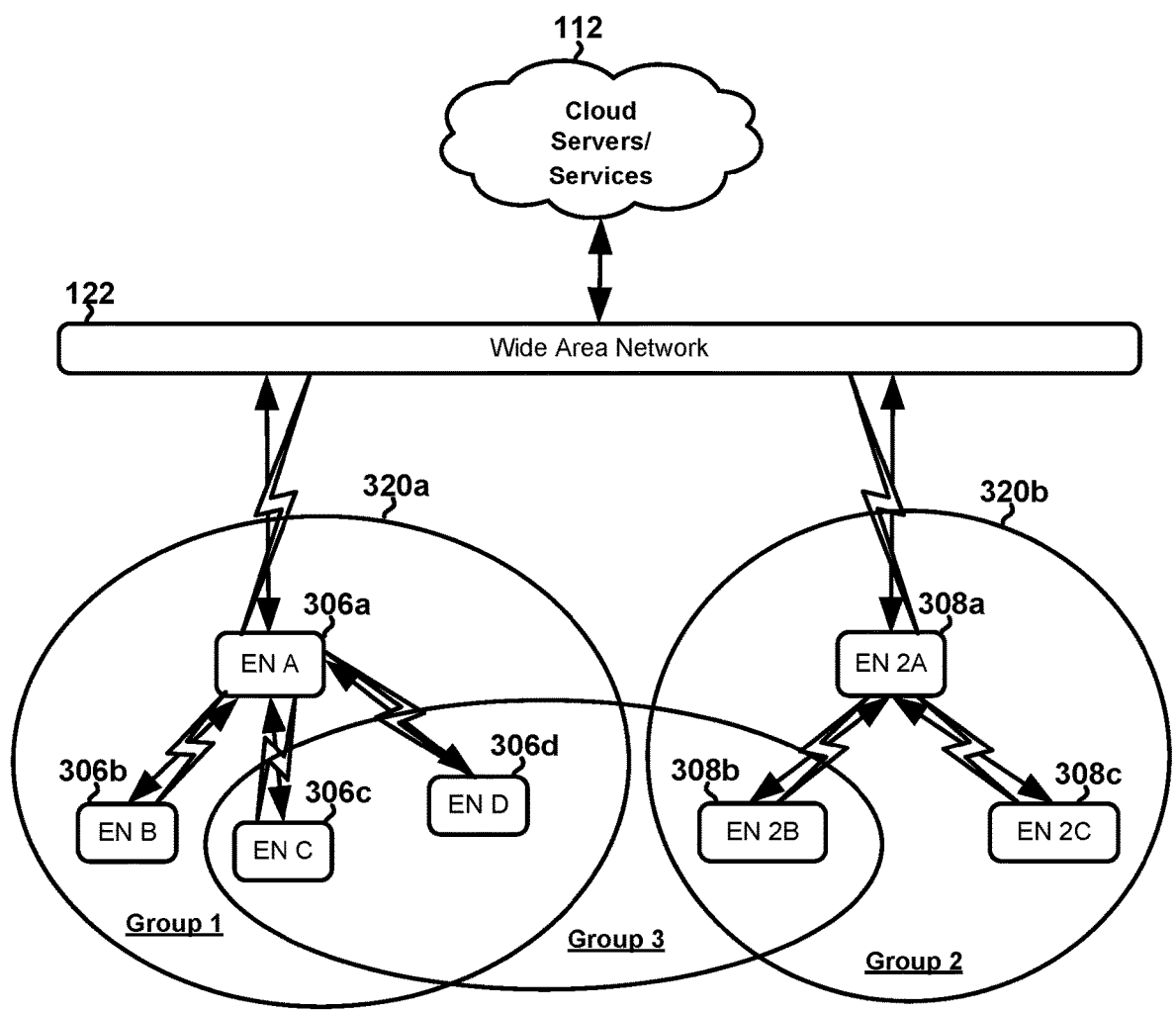
Figure 33:
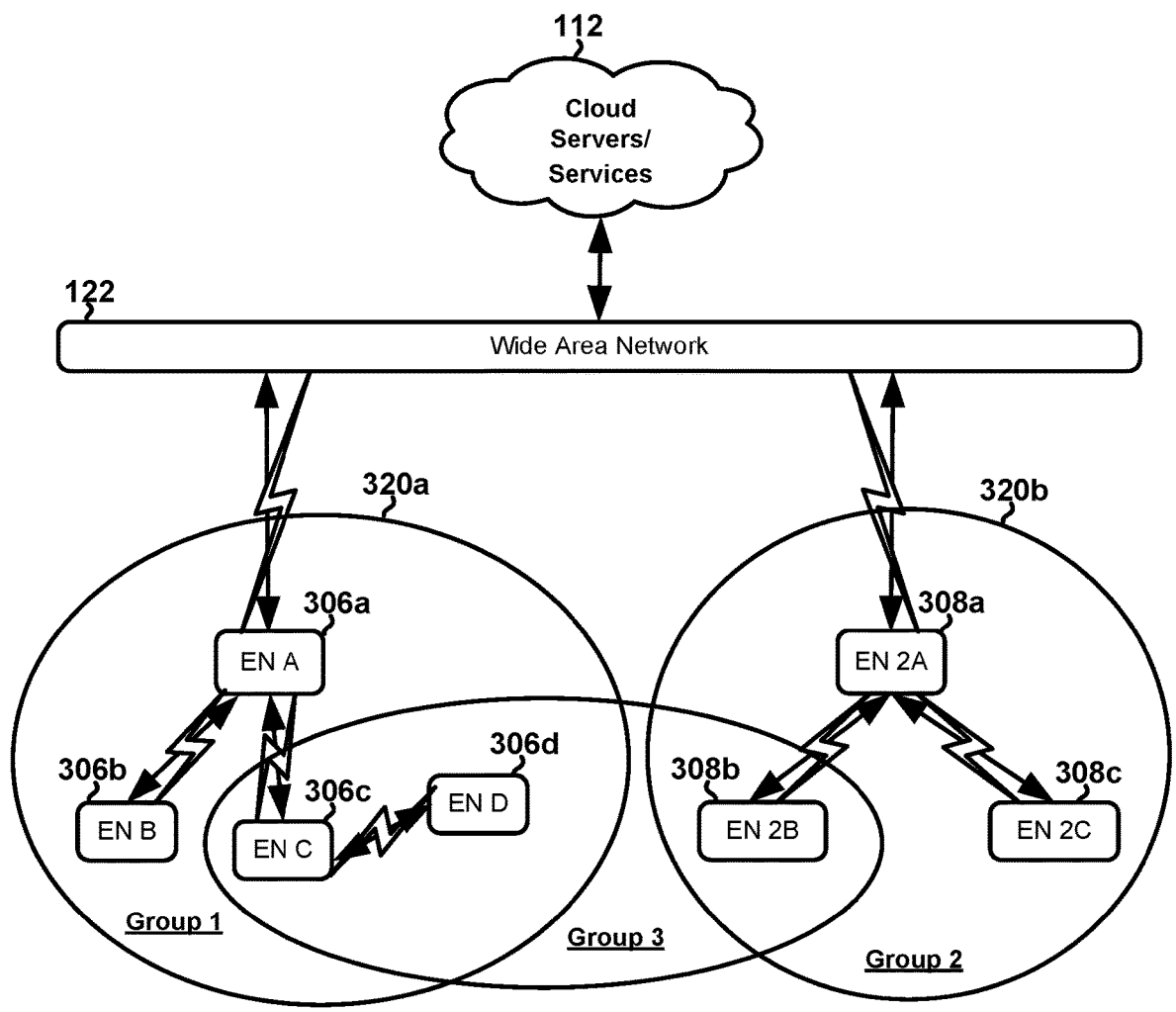

FIGS. 31-33 illustrate various overlapping group configurations. FIG. 31 illustrates an overlapping group, group 3, within Group 1 of 320a. FIG. 32 illustrates overlapping groups where another sub-grouping, group 3, is able to have ENs that are part of two other groups. In FIG. 32, EN C 306c and EN D 306d are part of groups 1 and 3, while EN 2B 308b is part of groups 2 and 3. FIG. 33 illustrates a scenario with overlapping groups in which EN D 306d connects to EN C 306c for backhaul connectivity.

Figure 34:
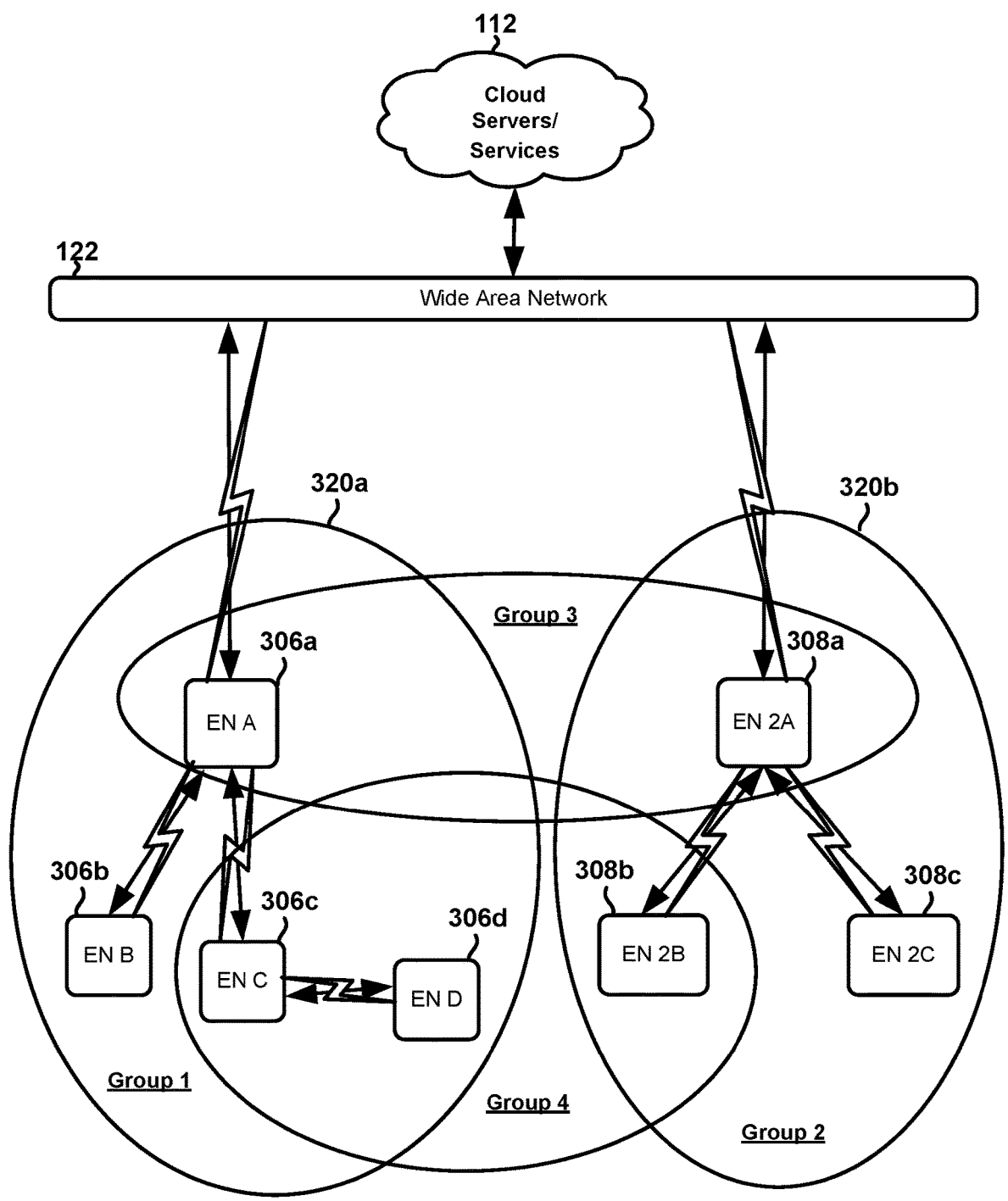

FIG. 34 illustrates a multi-layer grouping with an additional hierarchical group, Group 3, which may enhance the resiliency of the collective for persistence reasons.

Groupings in FIGS. 9-34 may be associated with Kubernetes k8/k3s or other container systems. Typically, network slicing in a network architecture is vertical, as exemplified by Group 1 and Group 2 in FIG. 34. Group 3 and Group 4 in FIG. 34 illustrate horizontal grouping of Edge Nodes (ENs).

In some embodiments, the ECP system 350 may be configured to allow for network slicing to be vertical, horizontal, diagonal, or any combination thereof to perform the required functions with the necessary edge nodes and end devices.

Figure 35:
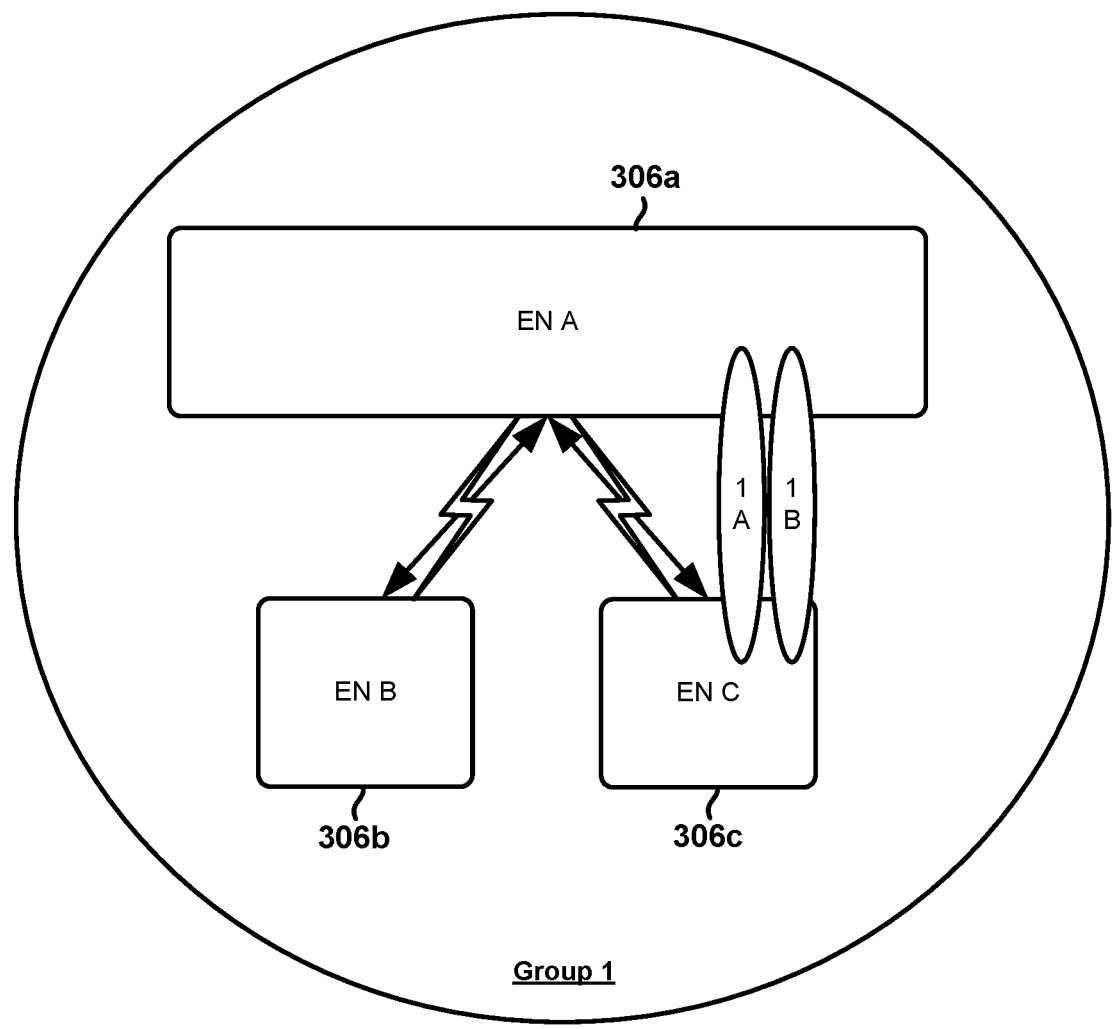

FIG. 35 illustrates vertical sub-grouping (slicing) in Group 1 from FIG. 34. In particular, FIG. 35 illustrates that there may be several subgroups or slices indicating resource allocations using a vertical hierarchical method. In this example, Slices 1A and 1B utilize some or all resources between EN A 306a and EN C 306c, while EN B 306b has access to all available resources within Group 1.

Figure 36:
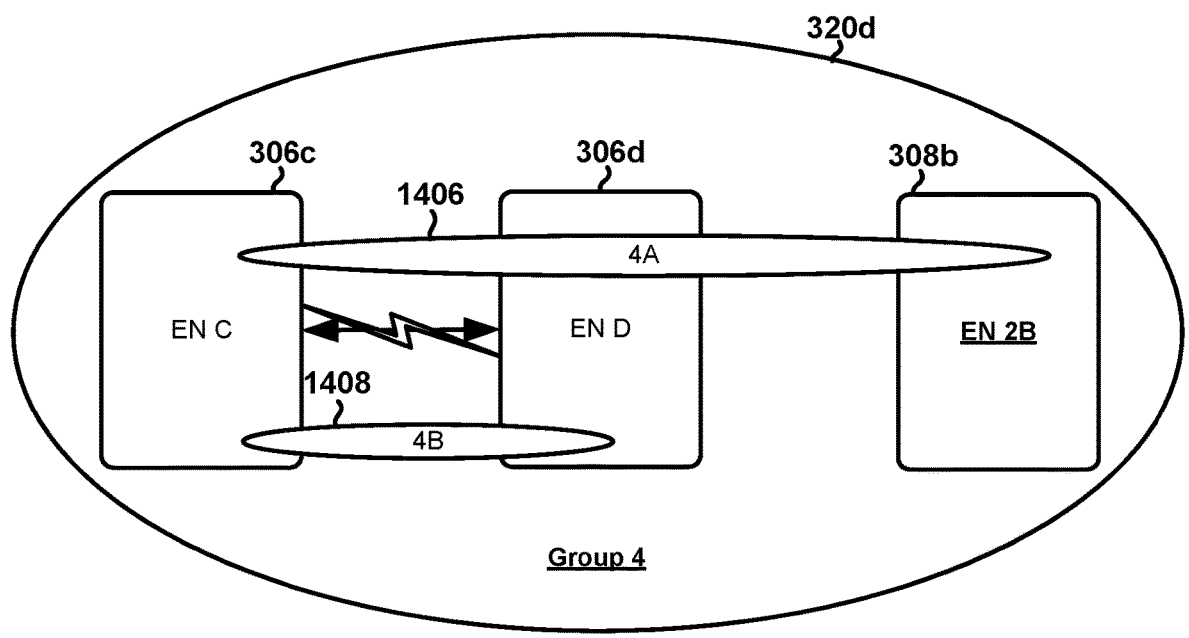

FIG. 36 illustrates horizontal sub-grouping. In this example, Slice 4A includes all the nodes within Group 4, but Slice 4B utilizes only some of the edge nodes and not all of the available resources in Group 4. Slice 4B has access to only some of the resources in 320d from ENs 306c, 306d.

Figure 37:
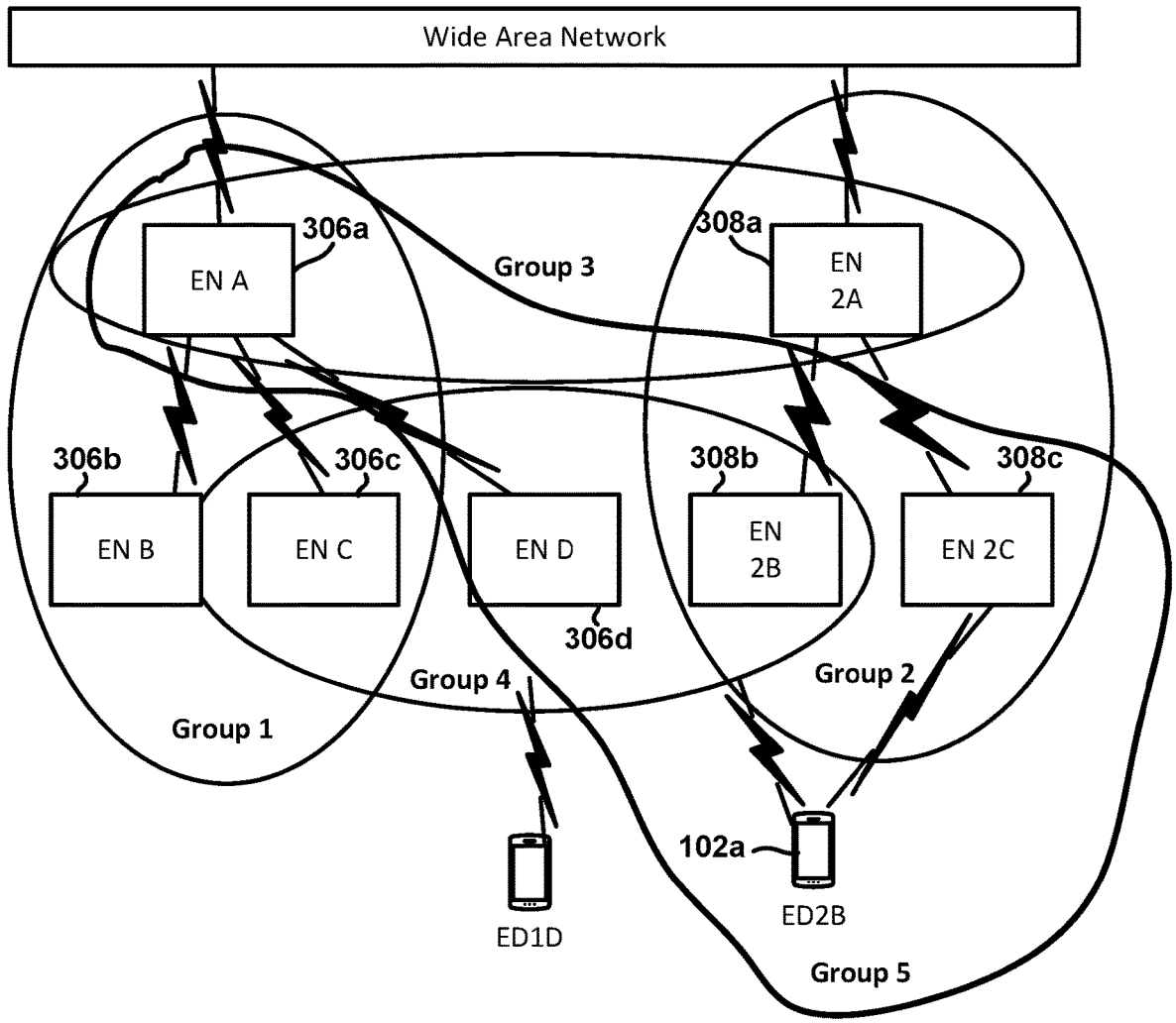

FIG. 37 introduces an additional group, Group 5, which represents diagonal grouping or slicing. Group 5 accesses resources in Groups 1, 2, 3, and 4, as well as end device ED2B 102a.

FIGS. 9-37 illustrate an ECP system 350 orchestration for optimizing EN C 306 capabilities, primarily for connectivity and resiliency. However, delivering a specific service or function through an application is another aspect of ECP system 350 orchestration. Applications may be local instances or containers like Docker, Kubernetes k8/k3s, or other methods for delivering an environment for the application or function to operate.

Figure 38:
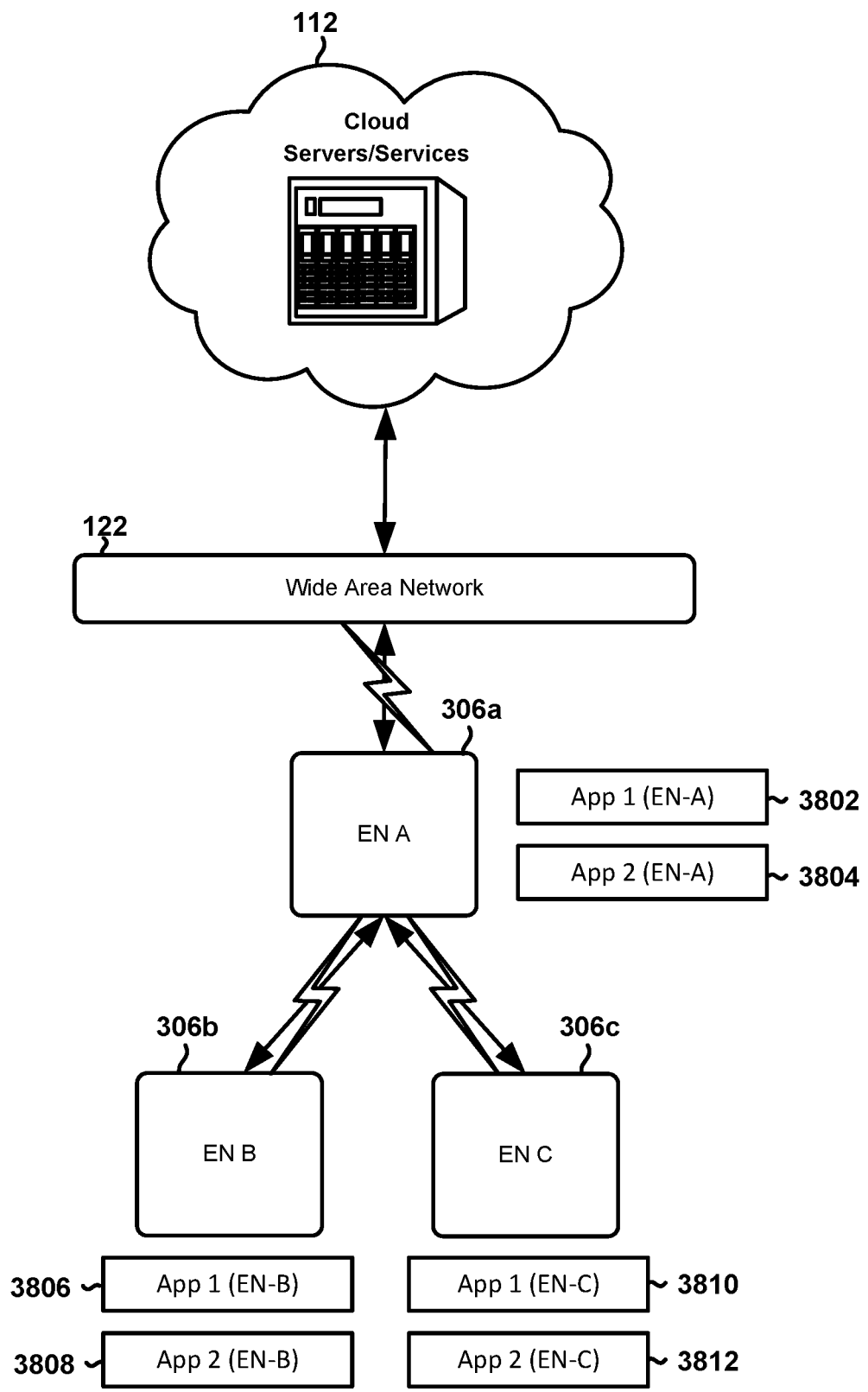

FIG. 38 portrays a scenario with three interconnected edge nodes, where EN A 306a provides WAN connectivity to the group. In this case, there is no orchestration except for establishing connectivity between nodes, which may be hierarchical, meshed, or a combination of both. Each edge node runs its applications and manages connectivity independently of the others. In the example illustrated in FIG. 38, the EN A 306a has two applications 3802, 3804, EN B 306b has two applications 3806, 3808, and EN C 306c has two applications 3810, 3812.

Figure 39:
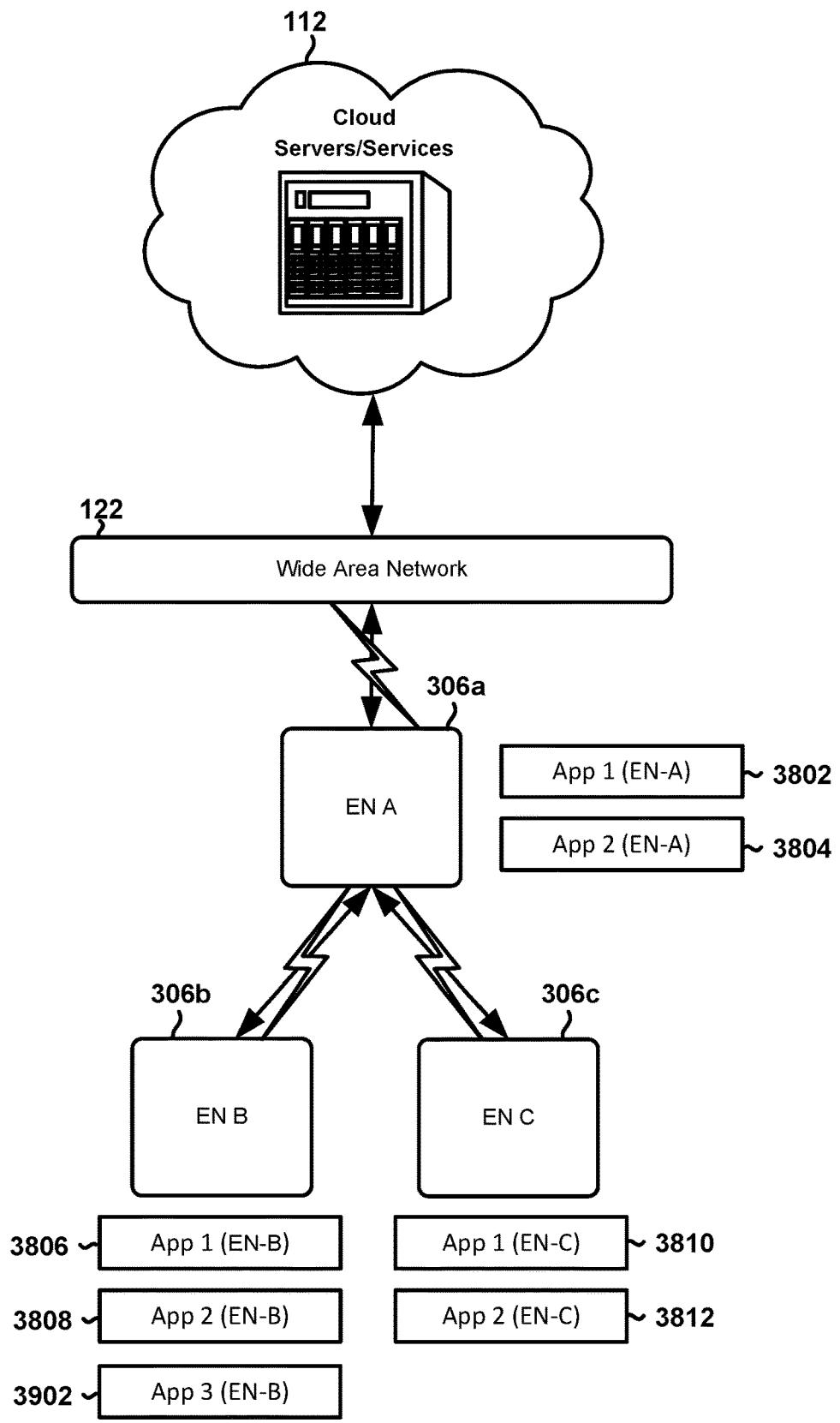

FIG. 39 illustrates application orchestration in which another application starts on EN B 306b, but its resources are exhausted due to the locally running applications. EN B 306b may not be able to offload or shed any applications, resulting in performance degradation for existing APP 1 3806 and APP 2 3808 due to the inclusion of App 3 3902. However, with ECP system 350, the orchestrator is aware of the current resources within the collective network. When App 3 3902 is requested to start, the current resources on EN B 306b are insufficient to run the new application alongside the other applications and the orchestrator determines if the application can be best run using another EN in the network.

Figure 40:
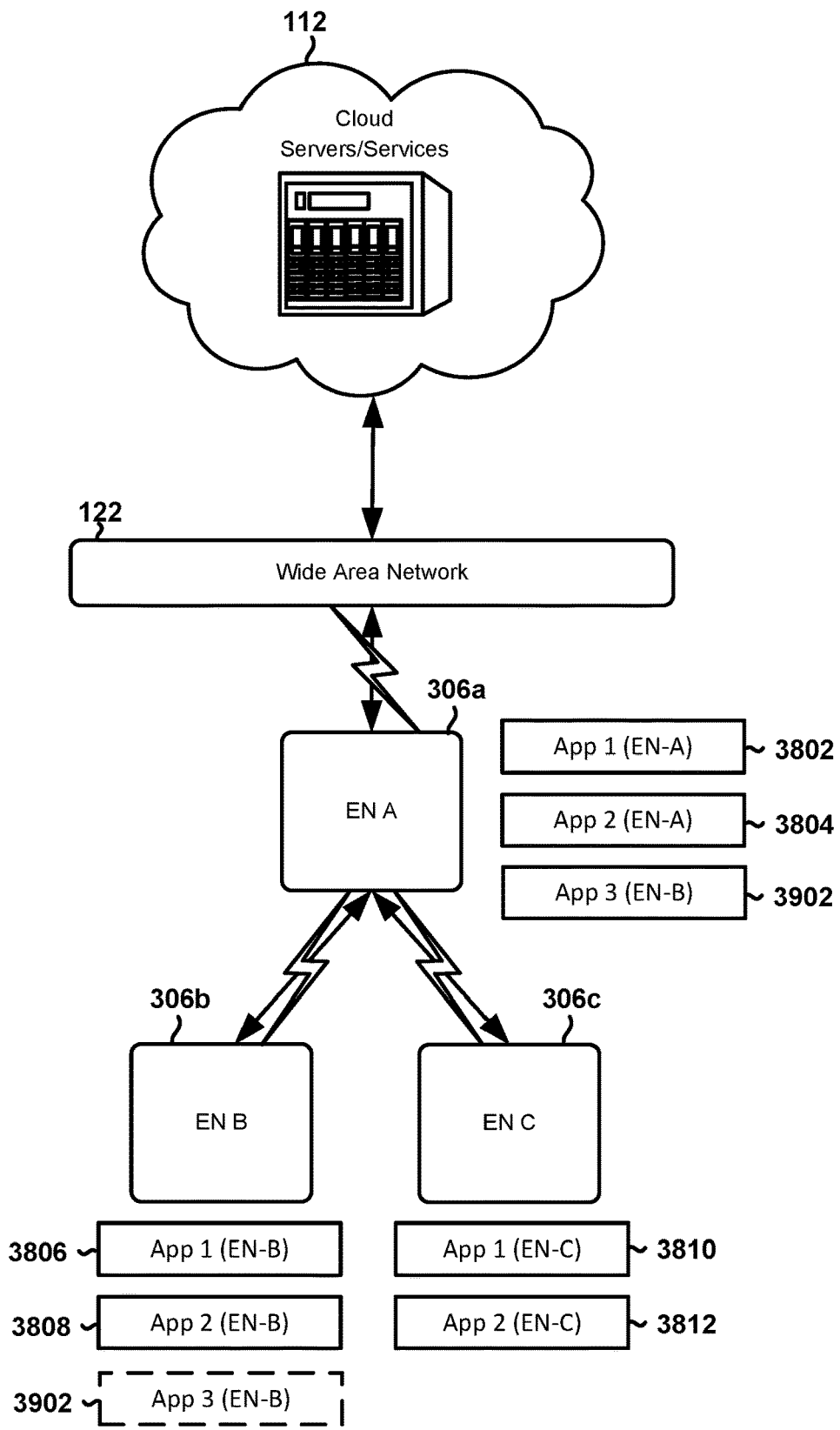

FIG. 40 illustrates application movement in the ECP system 350 where App 3 3902 is moved from EN B 306b to EN A 306a.

Figure 41:
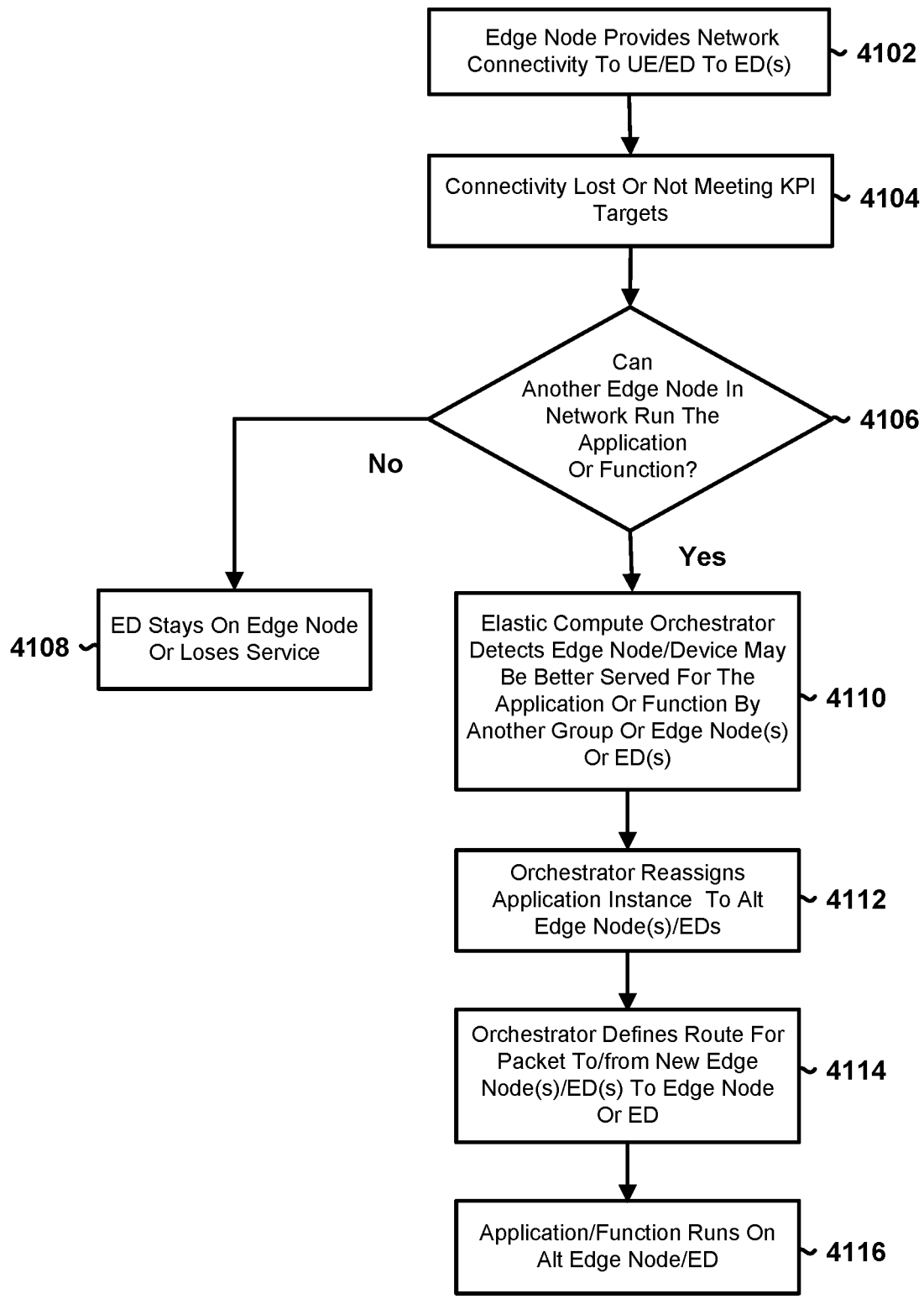
FIG. 41 is a process flow diagram illustrating a method of edge node connectivity loss and application reassignment in accordance with some embodiments.

FIG. 41 illustrates a method 4100 of reassigning an application or function from one Edge Node/End Device to another in accordance with some embodiments. Method 4100 may be performed by one or more processors in an edge node, which may be included as part of the ECP system 350. In this scenario, App 3 3902 is assigned to run on EN A 306a because it has sufficient resources to run its existing applications B1 3806 and B2 3808, along with the new App 3 3902. If an end device is connected to EN B 306b, it may remain connected while the application runs on EN A 306a. Connectivity to the application running on EN A 306a may be facilitated through the ECO.

Method 4100 may include managing application reassignment when the edge node providing network connectivity to ED(s) experiences a loss or fails to meet KPI targets. The ECO may determine whether another edge node in the network may run the affected application or function. If the ECO identifies a suitable alternative, it may reassign the application instance to the new edge node(s) or ED(s) and defines a route for packet communication between the new and original edge node(s) or ED(s). If no suitable alternatives are available, the ED may either stay on the current edge node or lose service, depending on the situation.

In block 4102, the edge node may commence providing network connectivity to ED(s). In block 4104, the processor may determine the connectivity between the edge node and ED(s) is lost or not meeting KPI targets for existing UE/EDs connected. In block 4104, the processor may determine whether another edge node in the network is able to run the application or function. If no, the ED may stay on the edge node or lose service in block 4108. If yes, in block 4110 the ECO may detect an edge node/device that may be better served for the application or function by another group or edge node(s) or ed(s). In block 4112, the ECO may reassign the application instance to alt edge node(s)/Eds. In block 4114, the ECO may define a route for the packet to/from new edge node(s)/ed(s) to the edge node or ED. In block 4116, the application/function may run on the alt edge node/ED.

Figure 42:
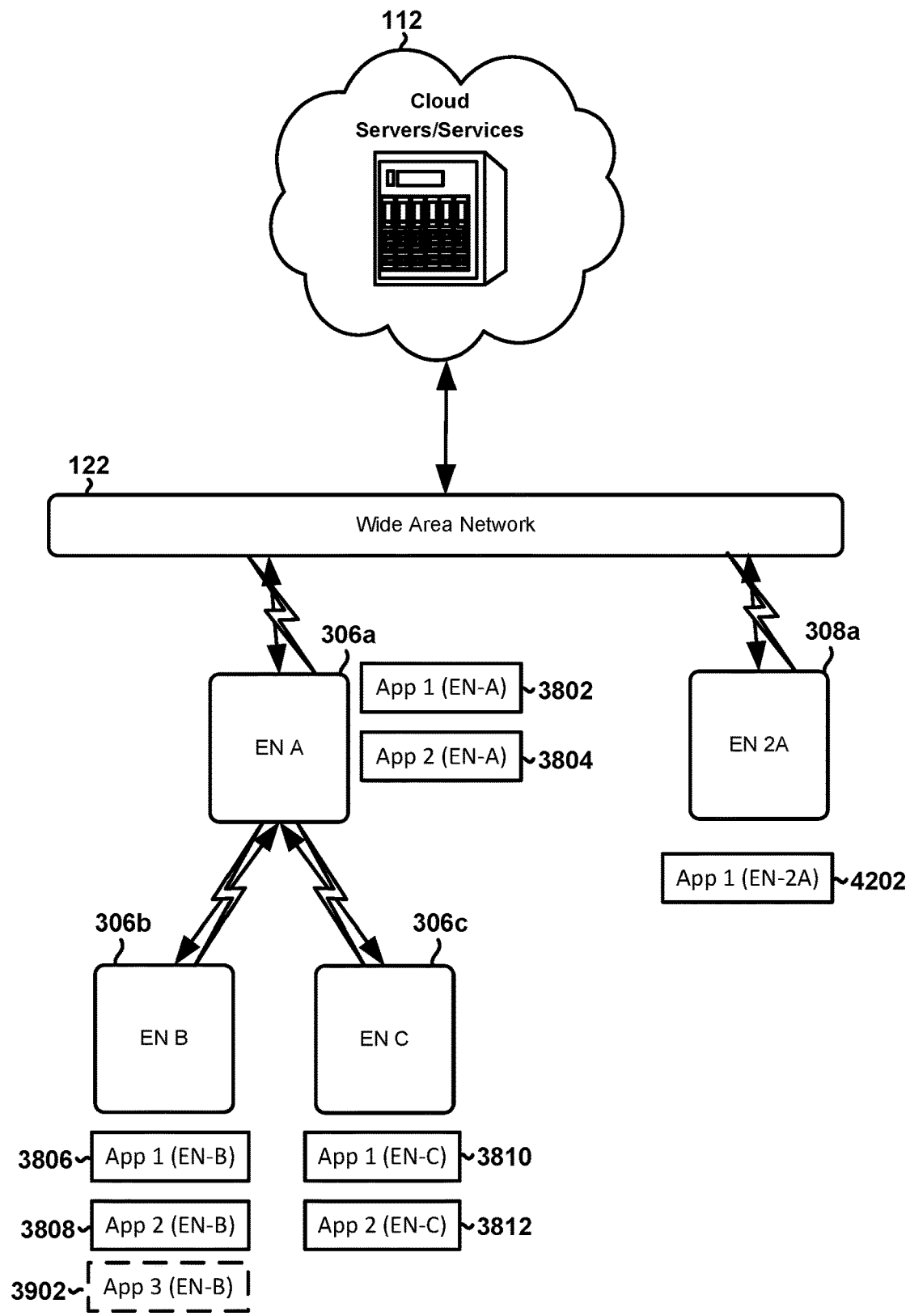
FIGS. 42 and 43 are component block diagrams illustrating example elastic edge computing systems configured in accordance with various embodiments.

FIG. 42 introduces another EN 2A 308a, which is part of another edge computing node cluster or group. With ECP system 350, when App 3 3902 needs to start or run on EN B 306b, resources may be insufficient to run App 3 3902 alongside other applications on EN B 306b. In this example, the ECP system 350 network includes the network shown in FIG. 42.

Figure 43:
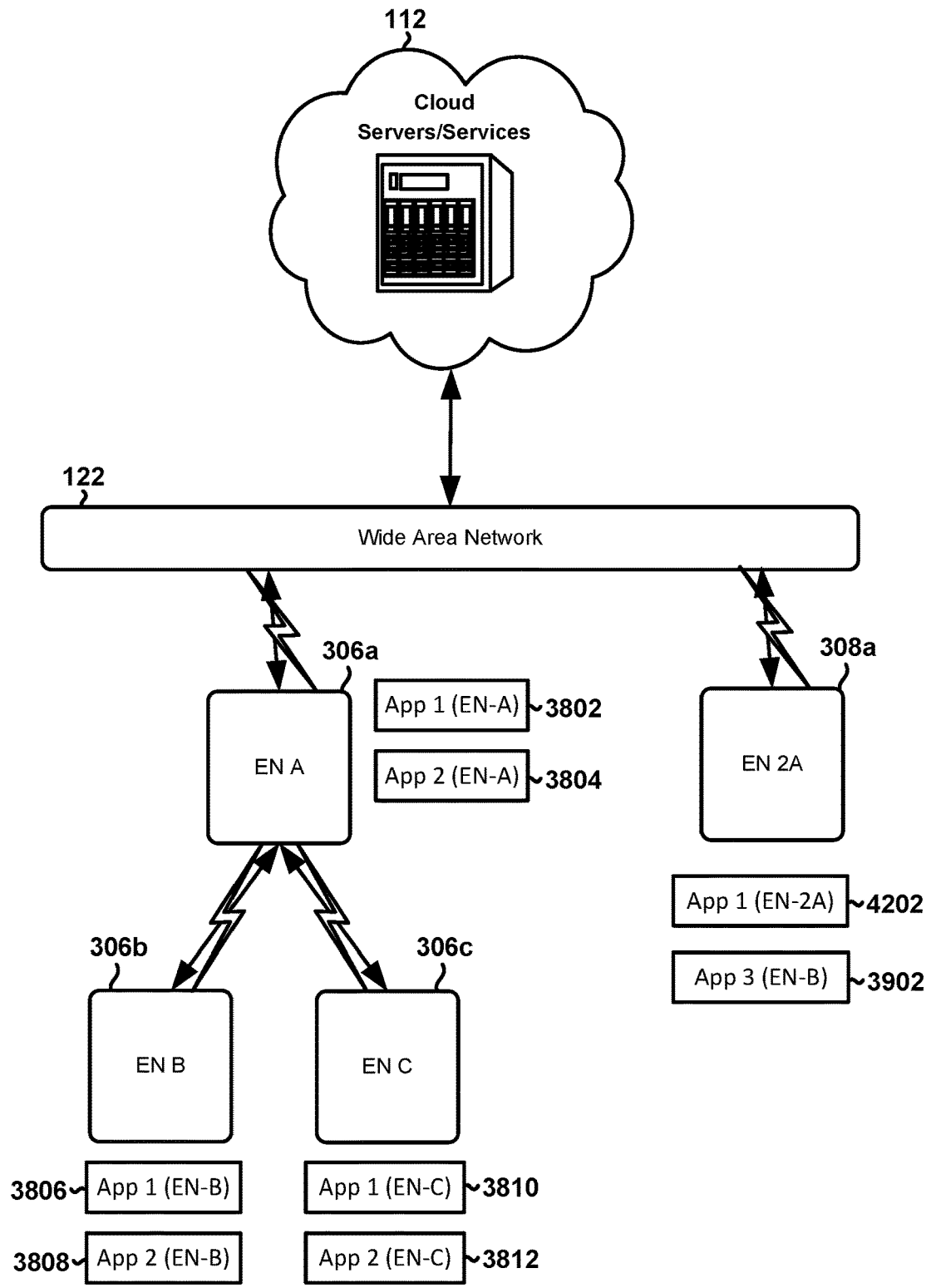

In FIG. 43, App 3 3902 is assigned to run on EN 2A 308a because it has sufficient resources to run its existing applications and the new Application B3. If an end device is connected to EN B 306b, it may remain connected to EN B 306b while the application runs on EN 2A 308a. Connectivity to the application running on EN 2A 308a is facilitated through the ECO. Alternatively, if the end device may achieve connectivity with EN 2A 308a, the ECO may redirect the end device to use EN 2A 308a directly.

In FIG. 43, App 3 3902 is moved to another group with a different backhaul, EN 2A 308a. Previously, the reallocation of applications or assets was primarily done in a horizontal domain. However, there are situations where applications need to be reallocated in a vertical domain, either moving the application to the edge node for reduced latency or delivering and receiving information closer to the device using the application function. The ECP system 350 may scale vertically based on the applications that need to be run, enabling applications to be run in both north and southbound directions depending on available resources.

ENs 306 may act as either a standalone or collective extension of an upstream cloud service for local content processing or enable an end device to perform specific functions in a downstream direction. The ability to move the application in vertical directions may allow for improved performance of the service being delivered.

Figure 44:
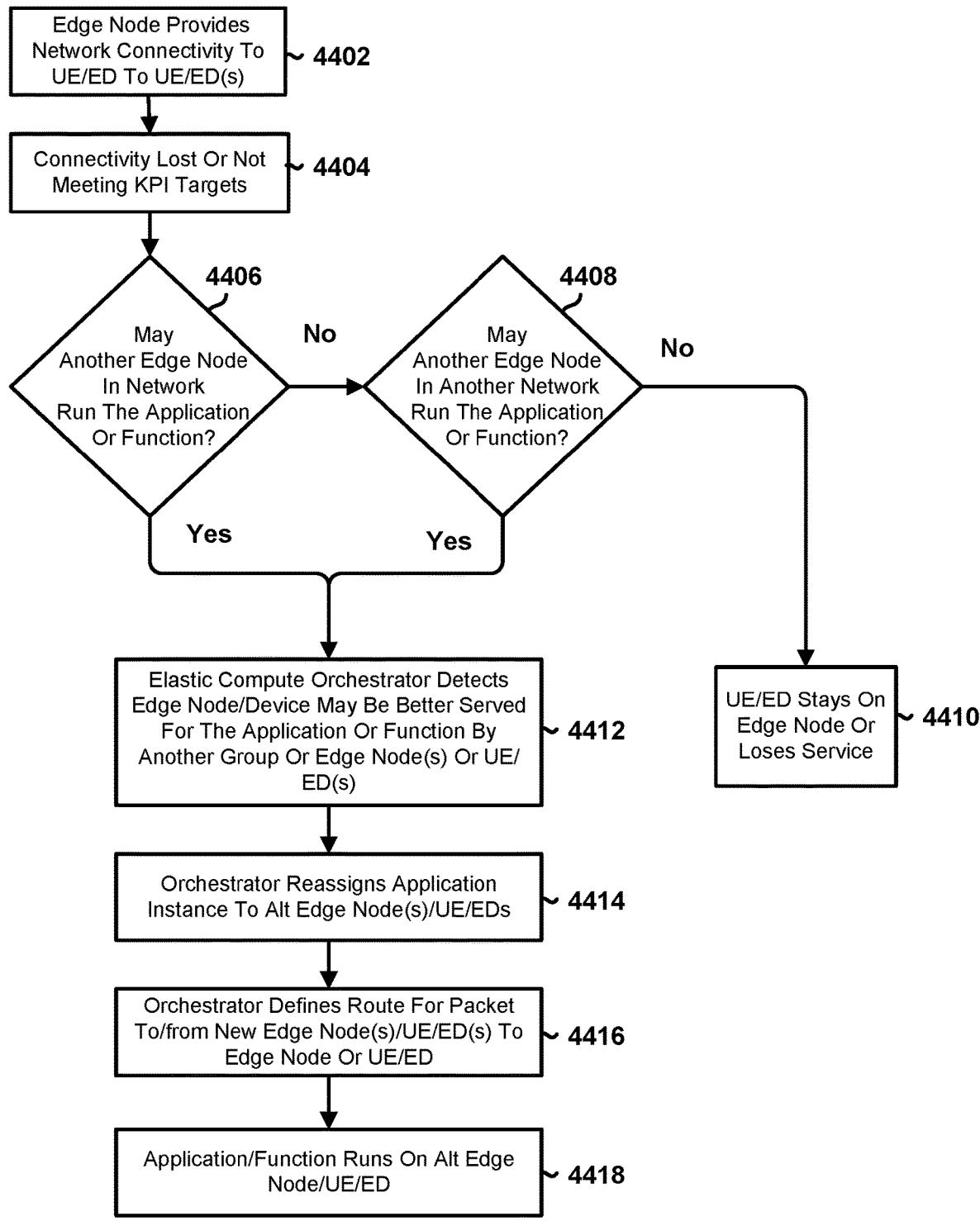
FIG. 44 is a process flow diagram illustrating a method of edge node connectivity loss and cross-network application reassignment in accordance with some embodiments.

FIG. 44 illustrates a method 4400 of reassigning the application between different networks or different groups, either within the same network or across different networks, in accordance with some embodiments. Method 4400 may be performed by one or more processors in an edge node, which may be included as part of the ECP system 350. Method 4400 may be performed to manage application reassignment when the edge node providing network connectivity to UE/ED(s) experiences a loss or fails to meet KPI targets (and also considers the possibility of using edge nodes from other networks). The ECO may determine whether another edge node in the same network or a different network is able to run the affected application or function. If the ECO identifies a suitable alternative, it may reassign the application instance to the new edge node(s) or UE/ED(s) and define a route for packet communication between the new and original edge node(s) or UE/ED(s). If no suitable alternatives are available, the UE/ED may either stay on the current edge node or lose service, depending on the situation.

FIG. 44 is another example of internetwork application redirection. When all edge nodes and their applications are running in EN 306a-c (edge nodes EN A, EN B, and EN C), the combined throughput for connectivity to the wide area network or internet/cloud may be increasing. When the threshold for backhaul traffic exceeds a certain level, such as 70%, the ECO may move applications to be run and processed elsewhere. The decision to reallocate between groups or collectives may be made for various reasons, including stable power, reliable backhaul, or other factors.

In block 4402, the edge node provides network connectivity to UE/ED(s), and the UE/ED(s) may communicate with the ECO. In block 4404, the connectivity between the edge node and UE/ED(s) is lost or not meeting KPI targets. In block 4406, the ECO may determine whether another edge node in the network is able to run the application or function. If no, in block 4408, the ECO may determine whether another edge node in another network is able run the application or function. If no, in block 4410 the UE/ED stays on the current edge node or loses service.

If ECO determines that another edge node in the network or in another network is able to run the application or function, in block 4412 the ECO may determine that the edge node may be better served for the application or function by another group, edge node(s), or UE/ED(s) from the same or a different network. In block 4414, the ECO may reassign the application instance to alternate edge node(s) or UE/ED(s). In block 4416, the ECO may define a route for packets to/from the new edge node(s) or UE/ED(s) to the edge node or UE/ED. In block 4418, the application or function may run on the alternate edge node or UE/ED from the same or a different network.

Figure 45:
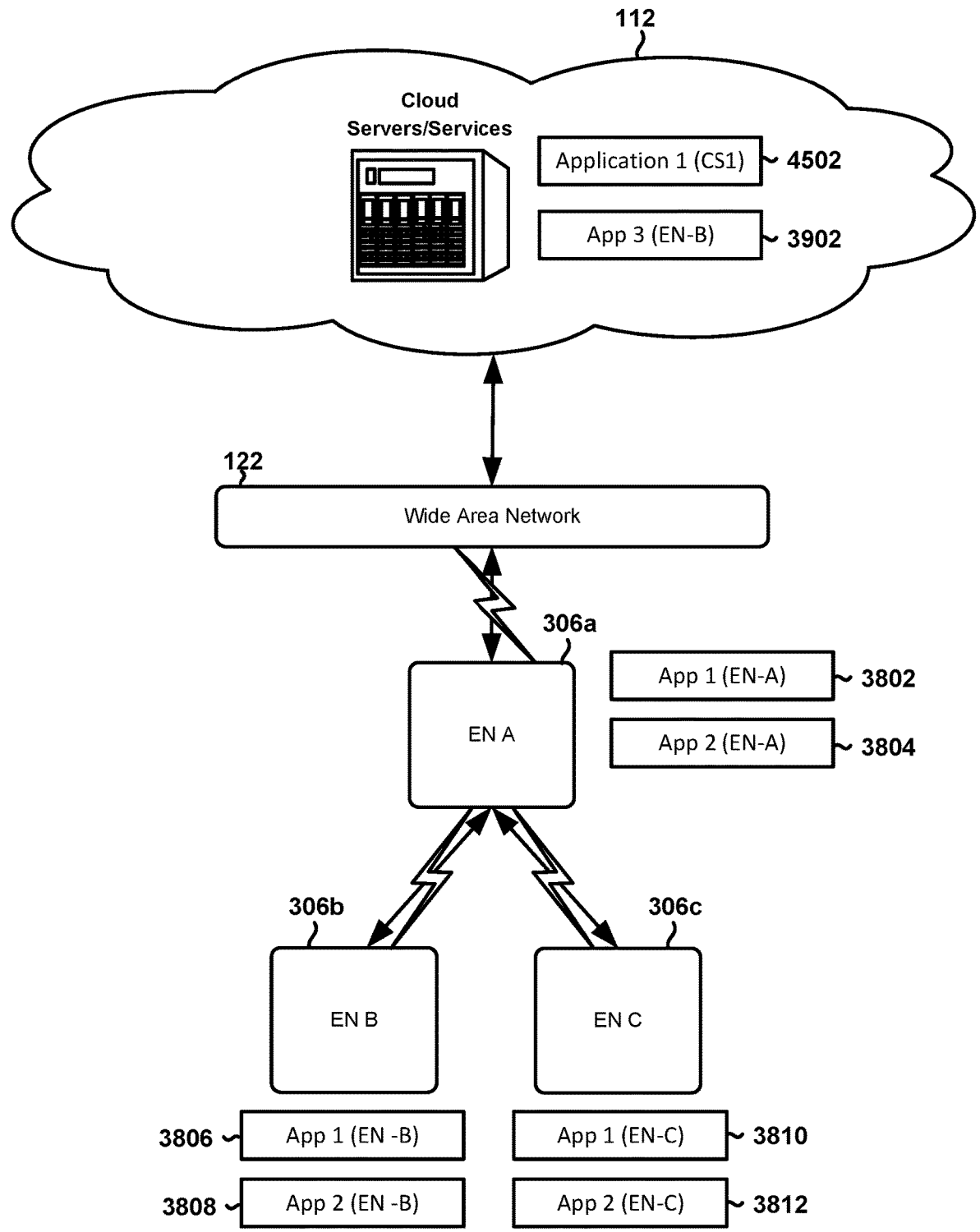
FIG. 45 is a component block diagram illustrating an example of elastic edge computing systems configured in accordance with various embodiments.

FIG. 45 illustrates an example using the situations in FIG. 39 or FIG. 40, in which Application 3 (EN-B) 3902 is moved vertically further from the edge and into a cloud domain. The ECO may help move the application from EN B 306b or EN A 306a to the cloud server for execution to resolve resource-related issues needed to run the application properly.

Figure 46:
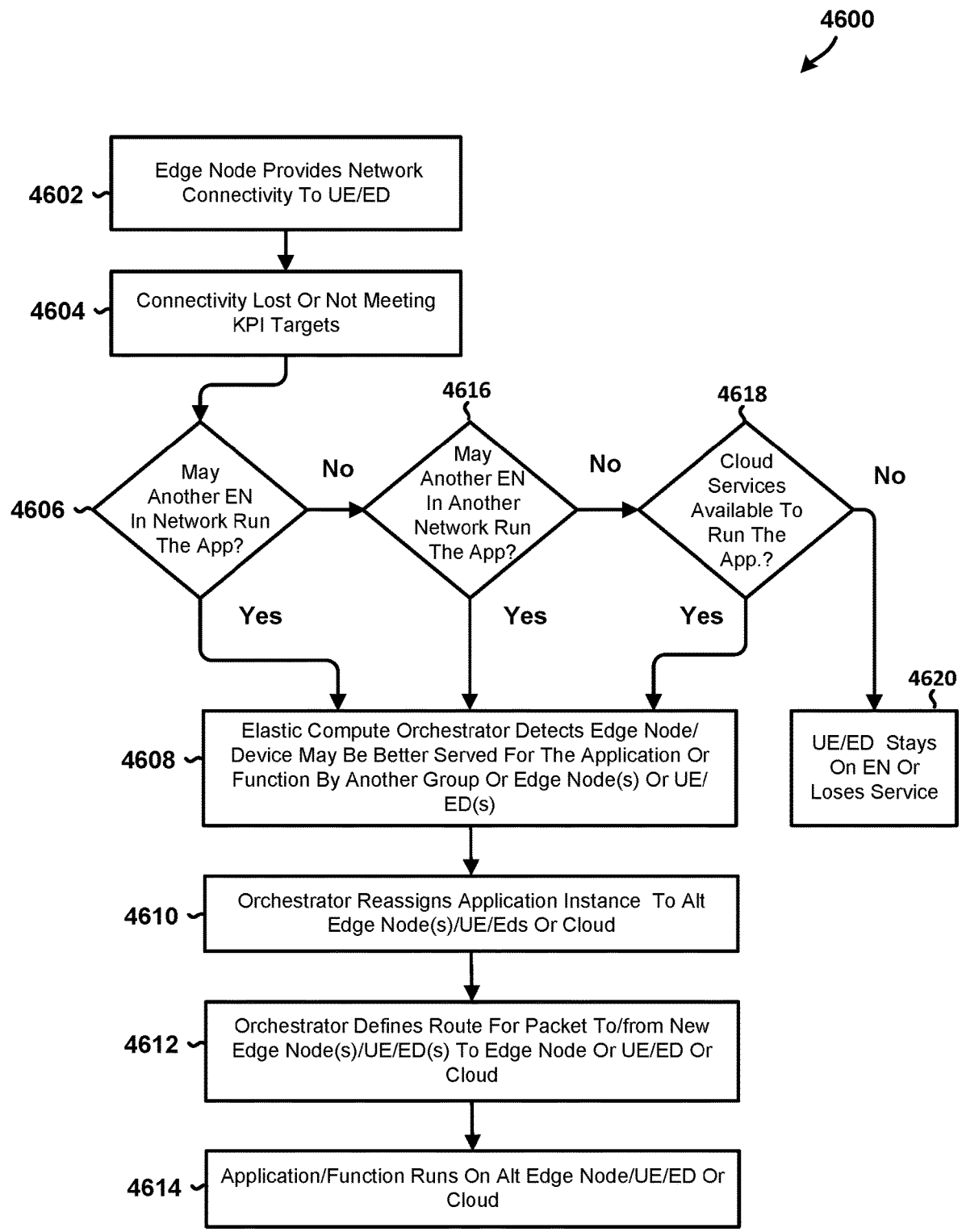
FIG. 46 is a process flow diagram illustrating a method of cross-network and cloud application reassignment in accordance with some embodiments.

FIG. 46 illustrates method 4600 of reallocating an application or function from an edge node or end device to a cloud service in accordance with some embodiments. Method 4600 may be performed by one or more processors in an edge node, which may be included as part of the ECP system 350. Method 4600 may be performed to manage application reassignment when an edge node providing network connectivity to UE/ED(s) experiences a loss or fails to meet KPI targets. The ECO may evaluate potential reassignment options, considering edge nodes within the same network, edge nodes in other networks, and available cloud services. If the ECO identifies a suitable alternative, it may reassign the application instance to the identified alternative and defines a route for packet communication between the new and original connectivity providers. If no suitable alternatives are available, the UE/ED may either stay on the current edge node or lose service, depending on the situation.

In block 4602, the edge node provides network connectivity to UE/ED(s). In block 4604, the processor may determine that connectivity between the Edge Node and UE/ED(s) is lost or not meeting KPI targets. In block 4606, the processor may, via the ECO, evaluate application reassignment options, which include determining whether another edge node within the same network is able to run the application in block 4606, determining whether another edge node in another network is able to run the application in block 4616, and determining whether cloud services are available to run the application in block 4618. If not, in block 4620 the UE/ED may either stay on the current edge node or lose service, depending on the situation. If so, in block 4608 the ECO may determine that the Edge Node/Device may be better served for the application or function by another group or Edge Node(s) or UE/ED(s) or cloud service. In block 4610, the ECO may reassign the application instance to alternate Edge Node(s)/UE/ED(s) or cloud services. In block 4612, the ECO may define a route for packets to/from the new Edge Node(s)/UE/ED(s) or cloud services to the Edge Node or UE/ED. In block 4614, the application or function may run on the alternate Edge Node/UE/ED or cloud services.

Figure 47:
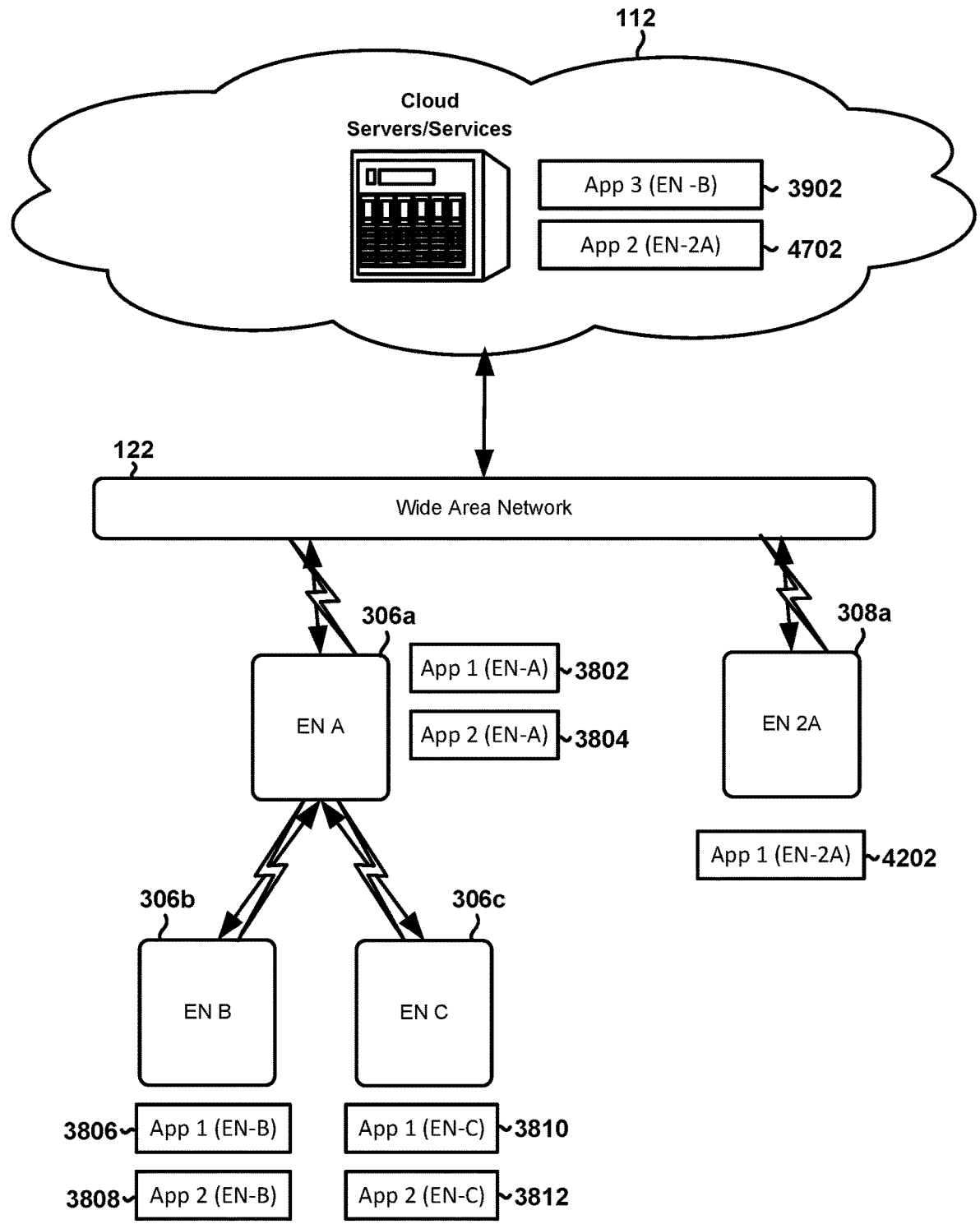
FIGS. 47-52 are component block diagrams illustrating example elastic edge computing systems configured in accordance with various embodiments.

FIG. 47 illustrates an example of applications from different groups being passed to a cloud server due to application resource requirements exceeding the performance objectives of the application or edge nodes themselves. In FIG. 47 EN A 306a, EN B 206b and EN C 306c are part of one group while EN 2A is in another group.

Figure 48:
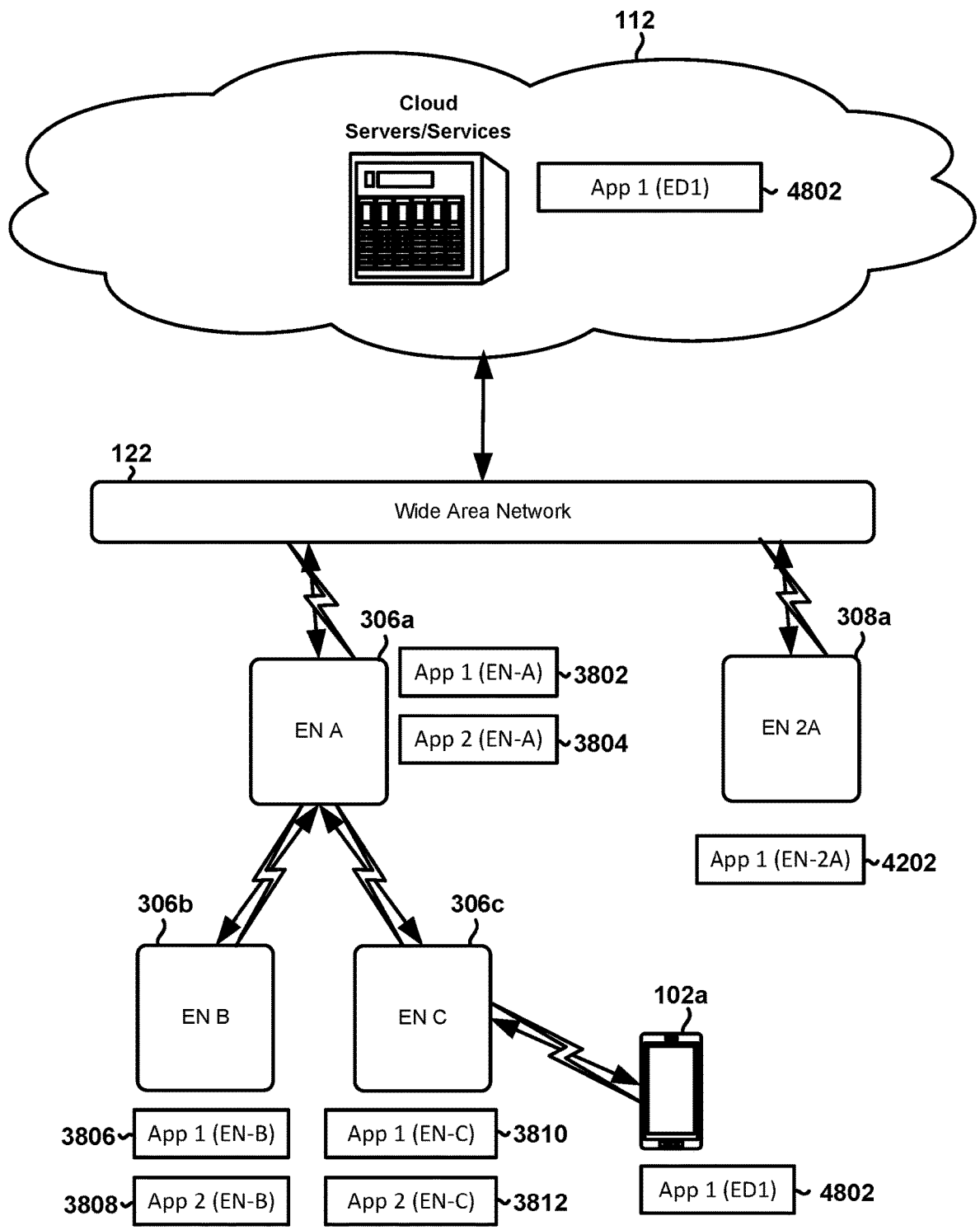

FIG. 48 illustrates an example of an application attribute that should be run on an end device (ED1) 102a. Application 1 (ED1) 4802 may be designed to run on an end device (ED) and uses another application to send or receive data. When EN C 306c has ED1 connected to it, the ECO may fetch the image or application to run on ED1.

Figure 49:
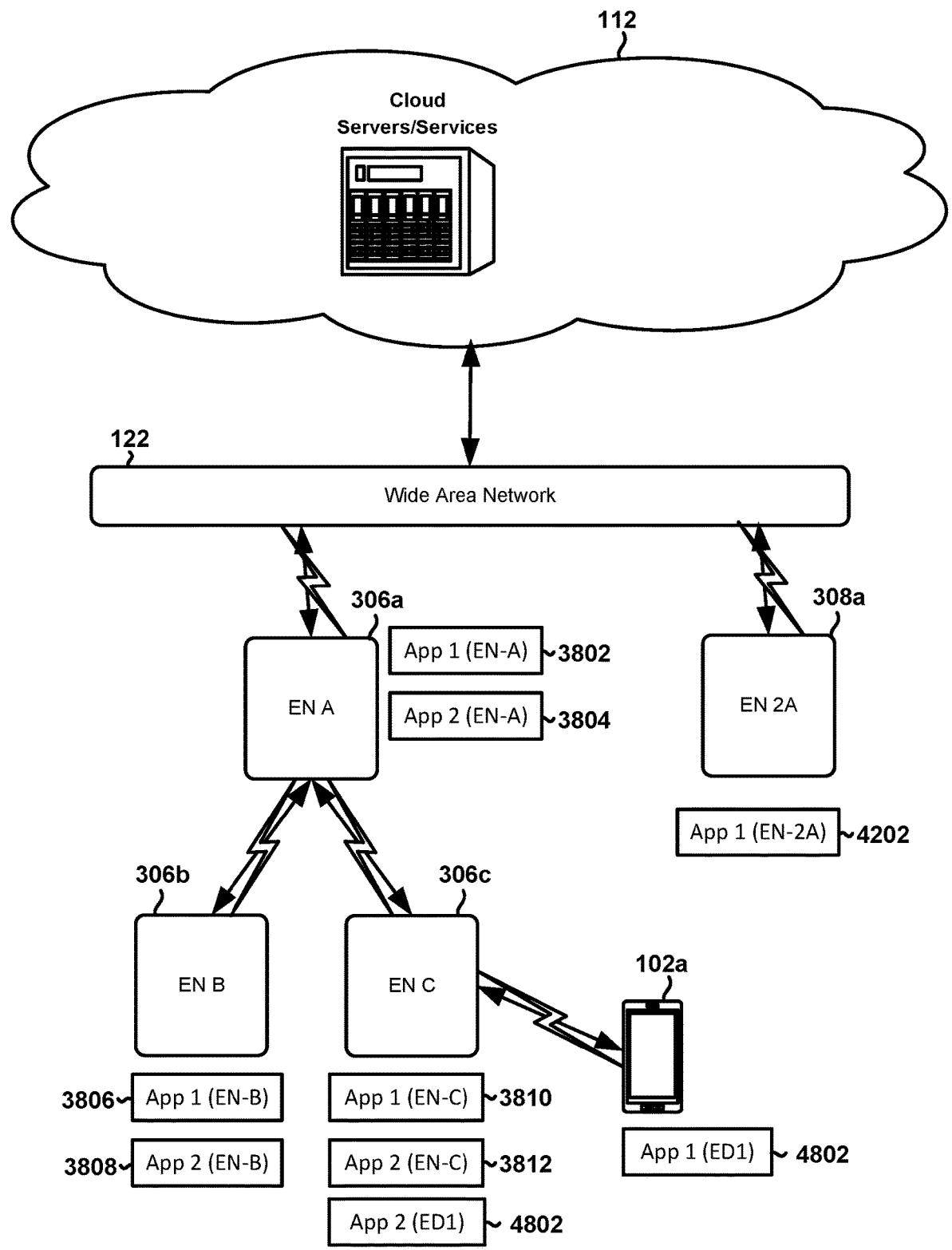

FIG. 49 illustrates an example in which an application (or a portion of an application) should be run on an end device (ED1) 102a. Application 1 (ED1) 4802 may be an application that uses another application to receive or send data. Yet, application 1 (ED1) may be meant to run on an edge device (ED). When EN C 306c has ED1 connected to it the elastic edge compute orchestrator fetches the image or application to run on ED1 and instructs EN C 306c to push the application onto ED1.

Figure 50:
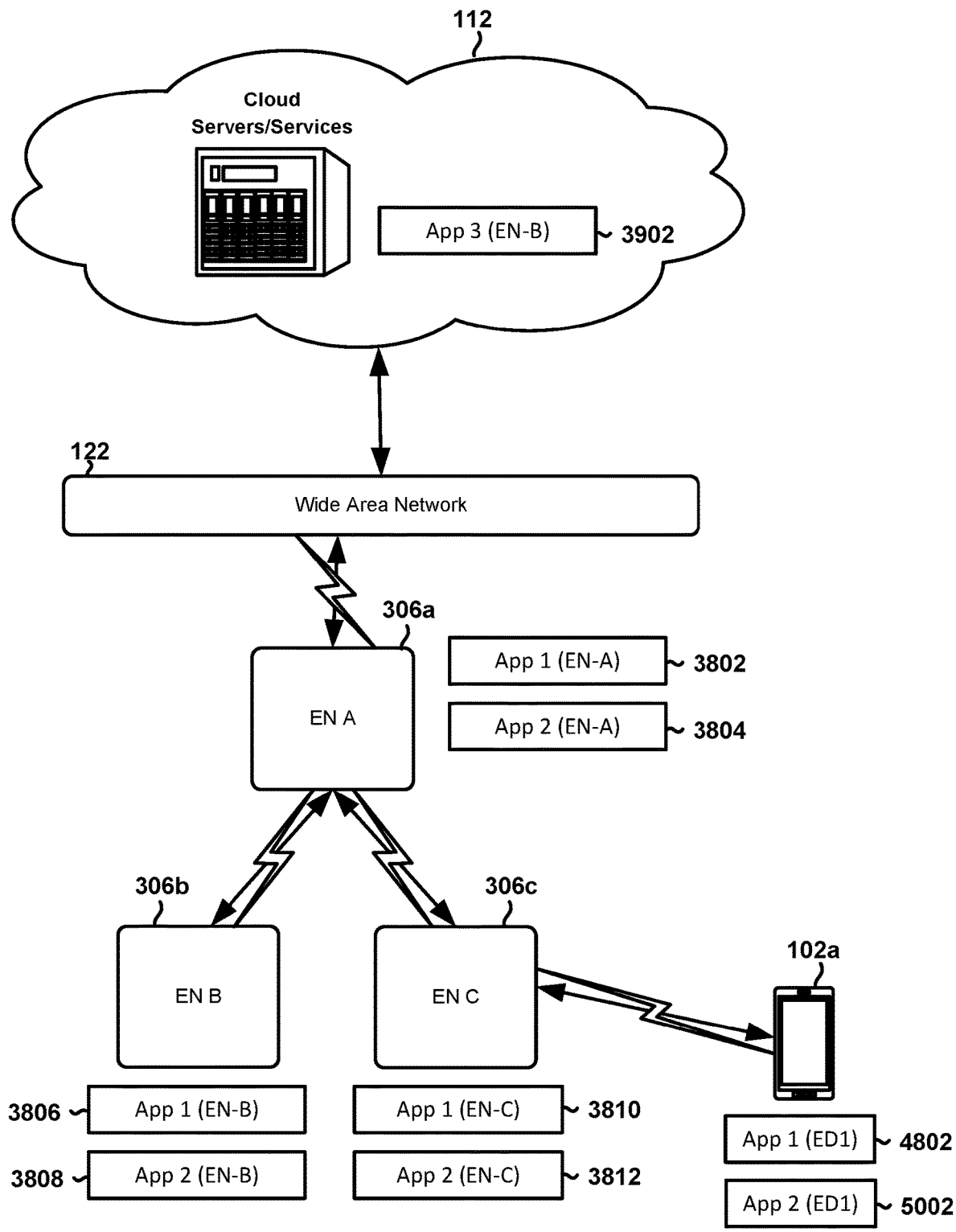

FIG. 50 illustrates an example in which an end device (ED1) 102a is connected to EN C 306c. ED1 has two applications it needs to run locally but lack the necessary resources to do so.

Figure 51:
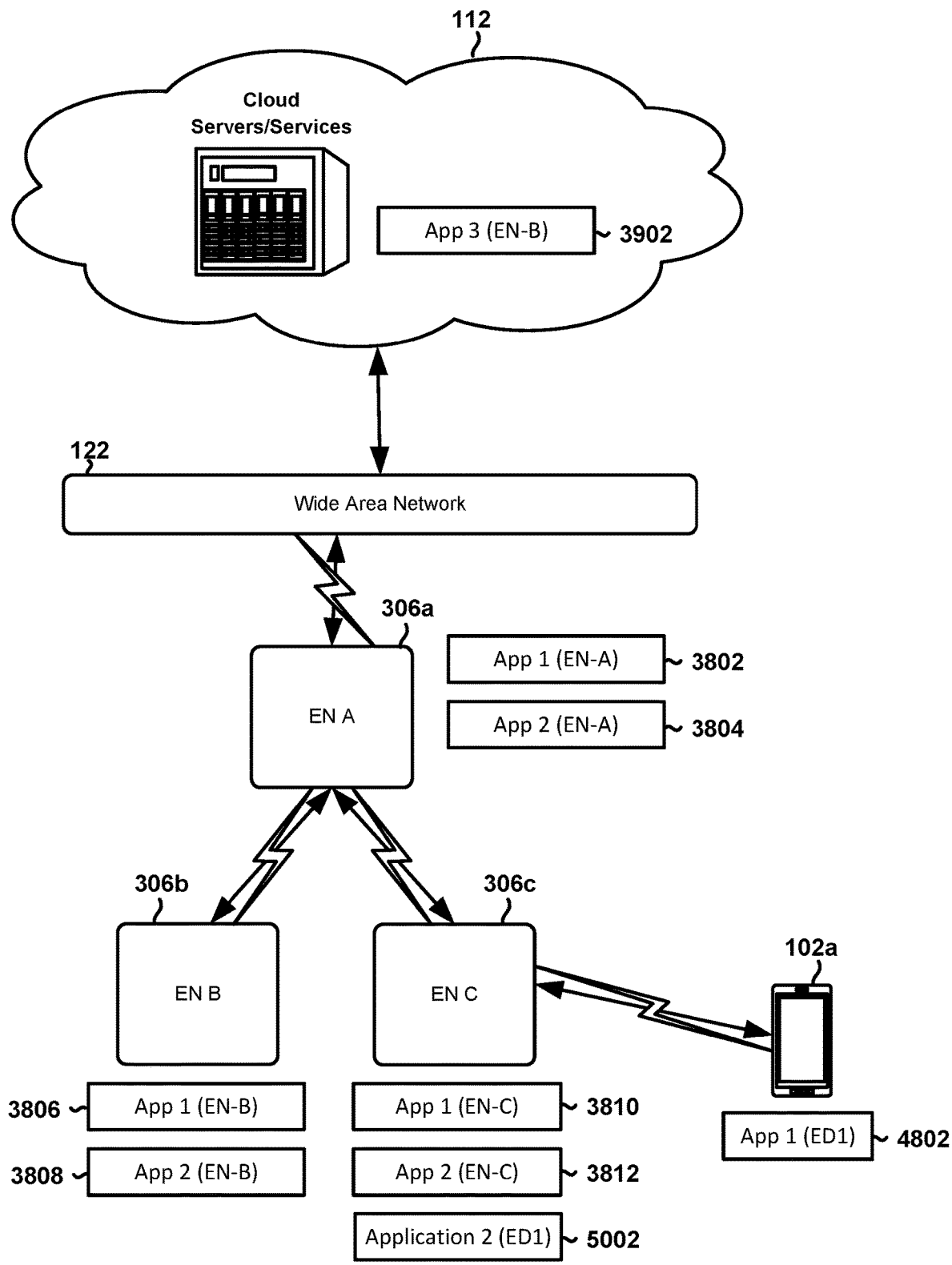

FIG. 51 illustrates an example of having an application, Application 2 (ED1) 5002, that was initially intended to run on an end device ED 102a now run on EN C 306c to resolve the resource constraint issue on ED 102a.

Figure 52:
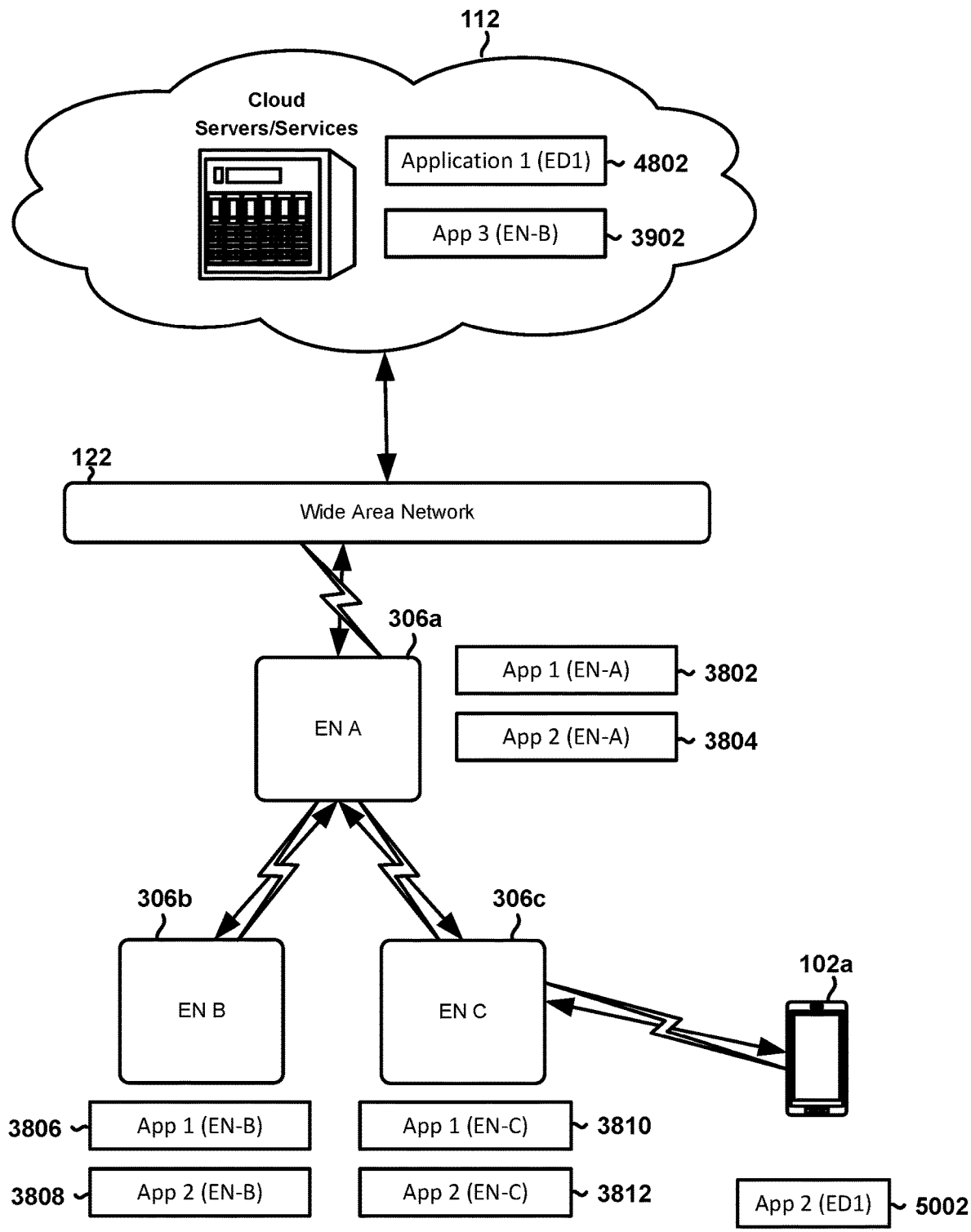

FIG. 52 illustrates another example in which an application initially meant to run on an end device (ED) 102a is now running on a cloud server 112 to address the resource constraint issue on ED 102a. The application, Application 1 (ED1) 4802, was reassigned to be run on the cloud server 112 by the ECO.

The ECP system 350 may be a fundamental enabler for allowing edge nodes to securely deploy applications across shared resources while ensuring that the applications run in isolation. It may employ various layers and radio access technologies (multi-layer/-RAT) as part of its delivery and execution methodology.

The ECP system 350 may include, implement, or incorporate many cloud architecture principles related to computing, storage, and networking infrastructure while bringing them to the edge of a network. It may allow resources, such as storage or computing, to scale up and down rapidly, leading to a demand for equally fast changes in connectivity properties. The ECP system 350 may include service attributes that adapt dynamically to the changing environment in real-time.

It may be important to distinguish network orchestration from network automation, as both involve performing functions without manual intervention. Network automation may refer to performing discrete, single-objective tasks, while network orchestration may involve performing a series of related tasks to achieve an objective. For example, network automation may involve loading a new configuration file to an edge computing platform, while network orchestration may involve configuring a new SSID for the platform and establishing related security and service credentials.

Managing an edge computing network, particularly the edge computing element itself, may present many challenges. ENs 306, whether access points or edge computing, often involve disparate networks due to the inclusion of a multivendor ecosystem with unique capabilities. The diversity of end devices connecting to the edge nodes ranges from extremely resource-limited devices to those with complex computing capabilities. The ECP system 350 encompasses the entire edge network ecosystem and addresses network deployment challenges due to diverse configuration requirements.

The ECP system 350 also tackles network security challenges stemming from the diverse ecosystem and caters to real-time needs. In traditional networks, tracking VLANs, access control lists (ACLs), and IP addresses for optimal policy and security compliance may be challenging. The ECP system 350 orchestration may also be configured to allow service providers to build and manage their edge network and edge networks more quickly, improving efficiency and enhancing the service delivered through a better user experience.

Dynamically adapting to changing network conditions by selecting the best combination of network resources is essential for providing consistent and high Quality of Experience (QoE). Performance may vary dynamically based on factors such as radio conditions, user population, and actual network utilization. Moreover, deployment configurations determine specific network path choices for applications, and different applications with varied traffic types require a network solution that addresses the entire application service delivery. Network orchestration is a necessity as part of a broader scheme for dynamic app and device awareness at different points in the network.

ENs 306 and end devices in the network will have network functions that vary in capability based on infrastructure, software, and other resources, including the network topology. The ECP system 350 may also be configured to allow service onboarding to manage software and resources at different edge nodes and devices. EN A 306 and device orchestration face multiple challenges that may be resolved with ECP system 350. Some of the orchestration challenges are listed below.

Network connectivity: The edge network or local cloud needs to operate without network connectivity to the centralized management center, which may be caused by long latency or connectivity problems.

Mobility: ENs 306 and end devices may be relocated or included in movable platforms. This requires the ability to move between separate groups or collectives based on the current geographic location of the edge node or device.

Resource constraints: Resources at the edge are finite for CPU, RAM, and persistent storage. Adding resources in an edge network is not dynamic and may not solve the underlying problem.

Security: Securing any network is always a crucial issue, especially an edge network with an expanded attack surface to protect. The ECP system 350 addresses the dynamic allocation and reallocation of resources and applications through secure container.

Bandwidth: The bandwidth available and usable bandwidth.

Self-healing: When an edge node or a connection link is not performing as expected, is offline for maintenance or software upgrades, or the device fails, requiring a replacement, the ability of the local network to dynamically adjust to the changing conditions is essential for service continuity.

The ECP system 350 orchestration may address these challenges and maintain efficient network performance while ensuring security and adaptability.

The ECO may be configured to manage and optimize edge networks. An ECO may perform various tasks, including Network Discovery, Ecosystem Discovery, Inventory, Service Inventory, Ecosystem Hierarchy, Service Hierarchy, Service Ecosystem, Path, and End device Onboarding. Each of these are explained below.

Network Discovery: The ECO may be configured to automatically discover edge compute platforms, their configurations, and capabilities.

Ecosystem Discovery: The ECO may be configured to automatically discover devices connected to the edge compute platform and identify devices the platform may communicate with.

Inventory: The ECO may be configured to collect configuration-specific information for the edge compute platform, such as IP and MAC addresses, firmware, etc.

Service Inventory: The ECO may be configured to maintain a record of allowed and running services (containers) on the system, including security information.

Ecosystem Hierarchy: The ECO may be configured to tag network devices sharing common attributes or capabilities and identify those that do not.

Service Hierarchy: The ECO may be configured to tag services that may run locally, those that may run on other ENs, and those requiring cloud support.

Service Ecosystem: The ECO may be configured to identify services (containers) that may be moved automatically.

Path: The ECO may be configured to determine the best path based on bearer traffic to use within the ecosystem and adjust dynamically based on each EN involved.

End device Onboarding: The ECO may be configured to automatically enable or remove end devices from service if a problem is detected.

Power over Ethernet (PoE): The ECO may be configured to tag ENs that use PoE or lack an uninterruptible power supply (UPS). Define which devices are associated with a particular PoE and determine which services may be added or run by another EN in the same or dynamic group based on power load.

Group Memberships and Associations: The ECO may be configured to manage relationships between ENs and their groups.

Pod/Container Grouping and Association: The ECO may be configured to manage relationships between pods or containers and their groups.

The ECO may be configured to collect and share collective information about all edge nodes and associated end devices to ensure efficient network management and optimization. This approach may allow for better adaptability and resource allocation in dynamic edge computing environments.

There are two prominent methods for sharing information between edge nodes: Link Layer Discovery Protocol (LLDP) and Cisco Discovery Protocol (CDP).

LLDP is an open IEEE-standard (802.1AB) Layer 2 protocol that operates over the data link layer, enabling edge nodes to gather hardware and protocol information about neighboring devices. As a vendor-independent link layer protocol, LLDP may allow network devices to advertise their identity and capabilities to neighbors on a LAN segment. LLDP uses a defined set of attributes called TLVs (Type, Length, Value) to discover neighboring nodes. LLDP frames contain mandatory TLVs such as Chassis ID, Port ID, and Time-to-Live (TTL). The LLDP specification permits organizations to define and encode their custom TLVs, allowing devices running LLDP on their interfaces to receive and send information to neighbors using TLVs. These devices store neighboring devices' information in a local table accessible through Simple Network Management Protocol (SNMP), including system name and description, port name and description, IP management address, VLAN, neighbor device capabilities, MAC address, MDI power, and link aggregation. LLDP-enabled devices may discover neighbors, advertise layer-2 configurations, and advertise Power over Ethernet (PoE).

LLDP is compatible with both Cisco and non-Cisco devices. On the other hand, CDP is a proprietary protocol developed by Cisco Systems for discovering other Cisco devices and sharing information between them. CDP may also be used for On-Demand Routing, which includes routing information in CDP announcements, eliminating the need for dynamic routing protocols in simple networks. All Cisco devices transmit CDP packets with a time-to-live (TTL) value indicating the number of seconds before the packet may be discarded. CDP packets are sent with a nonzero time-to-live value once an interface is enabled.

CDP may allow for quick state discovery of other neighbor nodes. All Cisco devices receive, process, and cache the information found in CDP packets, but these packets are never forwarded. However, both CDP and LLDP may only communicate with neighboring nodes they are directly connected to.

Figure 53:
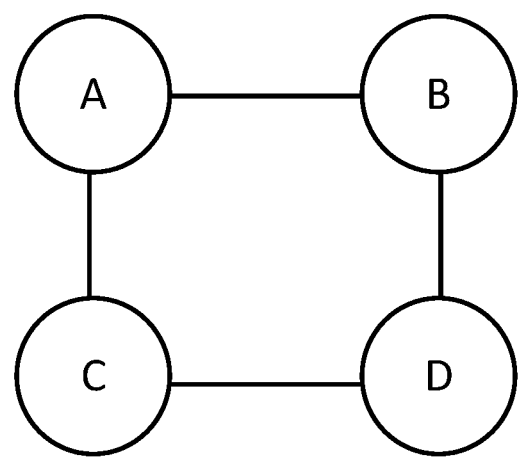
FIGS. 53-57 are block diagrams illustrating example network node configurations of elastic edge computing systems in accordance with various embodiments.

FIG. 53 illustrates an example network configuration that includes node A-D. Nodes A and B are CDP devices, while nodes C and D are non-Cisco devices. Using CDP, nodes A and B may share information between themselves, but node A may not be able to share information with node C, and node B may not be able to share information with node D. Even though nodes A, B, C, and D exist within the same network ecosystem, their capabilities and other key attributes are not shared.

Figure 54:
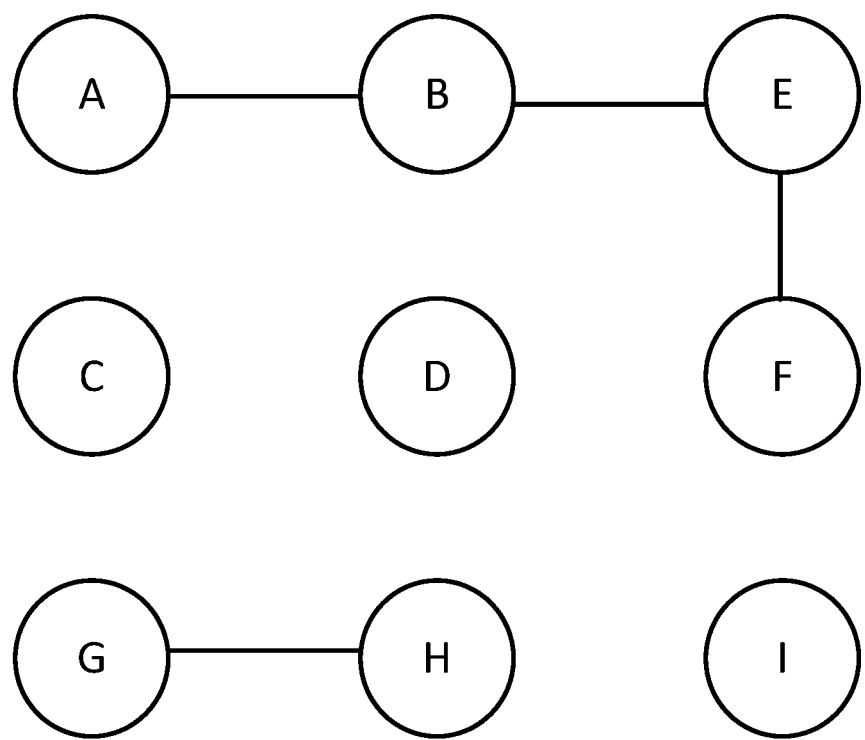

FIG. 54 illustrates a more complex example of network configuration that includes node A-I. In this example, multiple edge nodes are deployed with various vendors. Here, CDP devices include nodes A, B, E, F, G, and H, while the other nodes belong to different vendors. All nodes may have similar or different capabilities. In this scenario, nodes G and H may communicate and share information with each other but may not be able to share their configuration information with nodes A, B, E, and F due to the inclusion of non-CDP nodes. More specifically, node A shares its information with node B; node B shares its information with nodes A and E; node E shares its information with nodes F and B. However, node F may not be able to directly share its information with node B or A since it is not directly connected to them. This limitation highlights the restrictions of CDP and LLDP in sharing information across a diverse network ecosystem.

Figure 55:
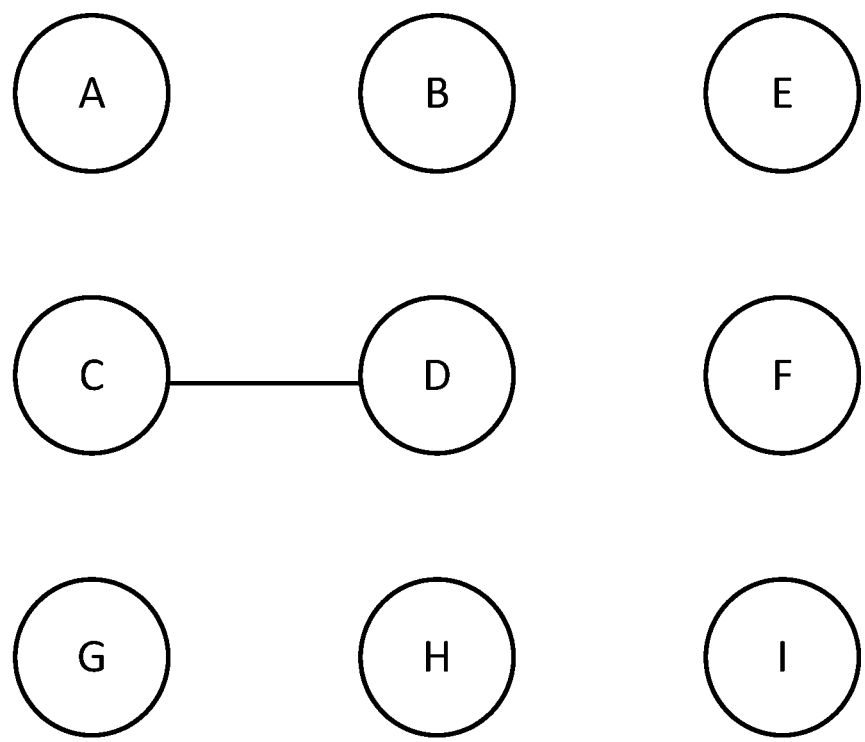

FIG. 55 illustrates a scenario involving LLDP-capable nodes. Nodes C and D may communicate and share information, but node C may not be able to share information with nodes A or G if connected to them. In addition, node D may share information with nodes B, H, and F since they are running CDP, not LLDP. Node I, however, is isolated in terms of information sharing. Both LLDP and CDP may only communicate with directly connected nodes, provided they are running the same protocol.

Figure 56:
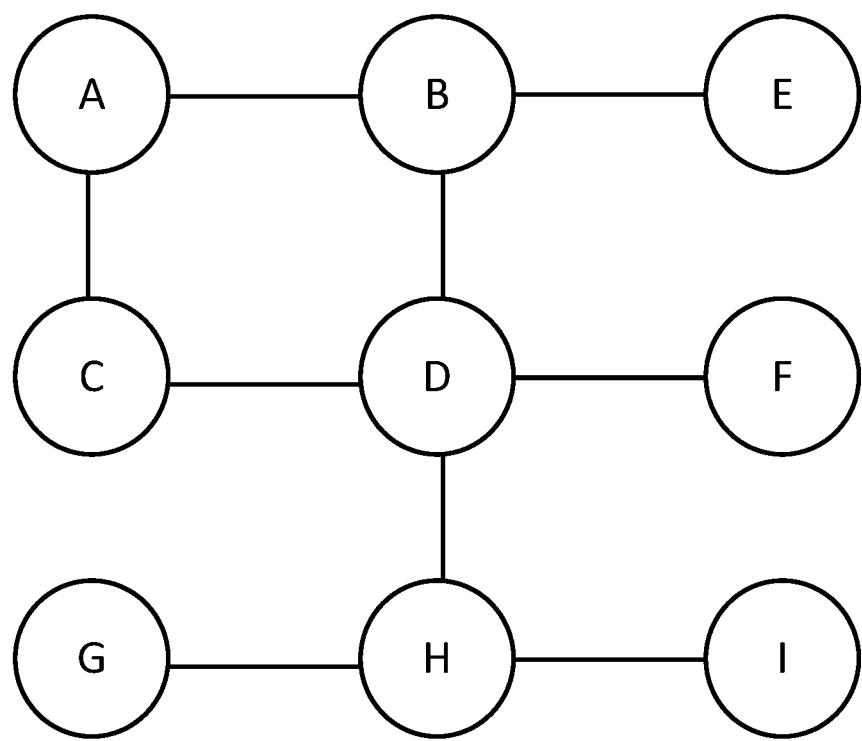

FIG. 56 illustrates that the ECP system 350 may overcome the limitations of LLDP and CDP by enabling nodes to communicate over multiple hops. This may allow the network to reconfigure itself to support specific services or address outages, enhancing information sharing between nodes.

FIG. 56 illustrates that using the ECP system 350 all the nodes, EN(s), can share information.

Figure 57:
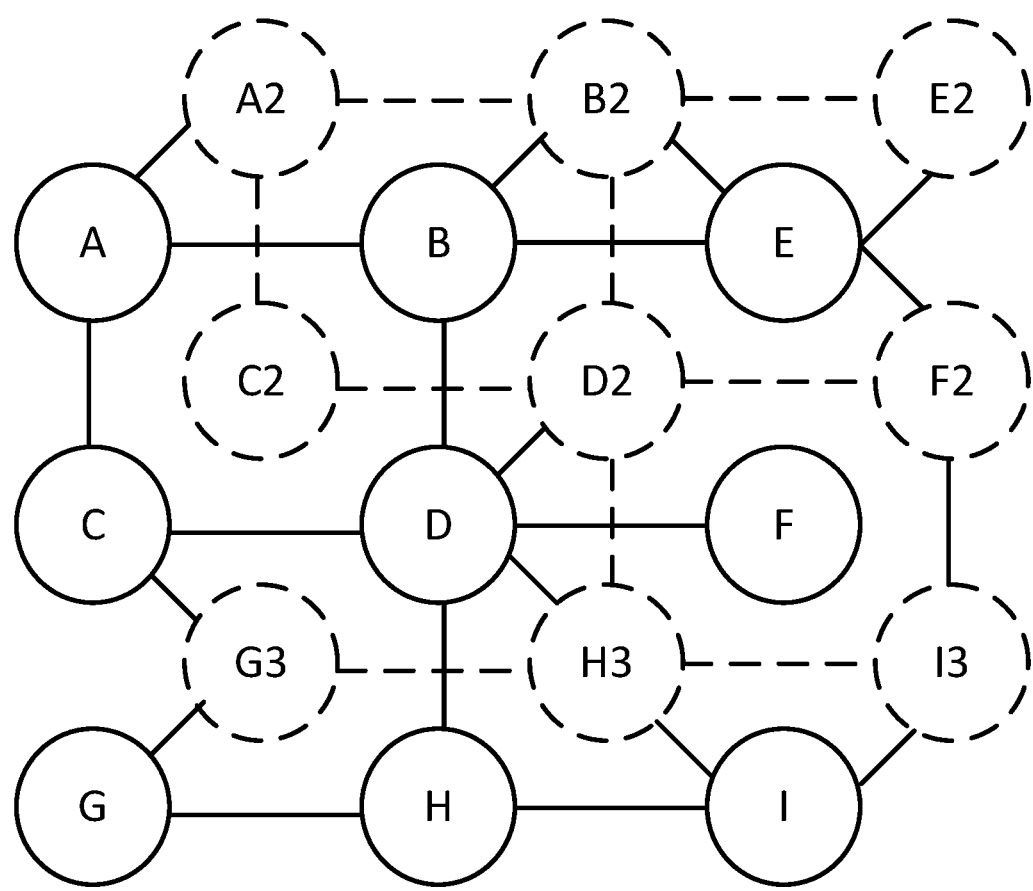

FIG. 57 illustrates a simple hypercube EN 306 deployment, where nodes may be configured to communicate with each other in a multi-dimensional plane. In such deployments, information sharing is important for automatic deployment, configuration, and service delivery.

FIG. 57 represents a possible hypercube EN 306 deployment for a multiple dwelling unit (MDU) or a large office complex or building having multiple floors and or interconnection floors between buildings.

The ECP system 350 may also be configured to allow devices to share various types of information, including system name, description, node ID, port name, description, IP management address, VLAN, neighbor device/node IDs, capabilities, CPU, RAM, storage, radio interfaces, MAC address, link aggregation, power source, WAN capabilities, location information, end devices connected, WAN/link uptime, CPU/RAM/storage performance metrics, neighbor nodes' communication status, group memberships, and group associations.

With the ECP system 350 orchestrator, the current status and KPIs for edge nodes are passed along. If a dip in KPI performance occurs, the orchestrator determines whether it is temporary, recurring, or entering a catastrophic state. Depending on the state, corrective action may take place, such as reallocating applications to other edge nodes. This approach ensures optimal performance and adaptability in complex and diverse network environments.

ENs 306 may be configured to establish communication links with multiple ENs, such as edge computing systems, access points, or other fixed infrastructure devices. These EN D 306 devices may have communication links to an OAM (Operations, Administration, and Maintenance) component of the ECP system 350 orchestrators. The OAM component may also have communication links to one or more ENs and may communicate with them as part of the orchestration process.

In a centralized network architecture, the OAM possesses complete knowledge of the entire network and its components. ENs 306 may communicate with the OAM to obtain location and configuration management information, perform various operations for device management, generate device management information, and send device management information to fixed wireless devices to manage or control the allocation and use of resources.

In distributed or hybrid architectures, each edge node, such as an edge computing system or access point, may be equipped with a location-determining component or module configured to determine its corresponding EN's precise location. Consequently, each edge node may be aware of its exact location and position, including latitude, longitude, and altitude. The self-realized information may be provided by the OAM or a combination of both OAM and edge node-to-EN C 306 communication.

ENs 306 with the ability to determine their geographic location within wired and wireless networks may utilize the ECP system 350 OAM functions to identify the active edge node in their area. This is beneficial in scenarios where an edge node is added to the network, allowing it to be automatically discovered and assigned group memberships and/or group associations along with services. When an EN D 306 device is brought back online after a maintenance window, determining its involvement or non-involvement with other edge nodes is crucial, assuming the edge node is equipped with a GIS module and a location-aware module needed for location determination.

Automated discovery and establishment of groups and services using location awareness for edge computing devices may be implemented in a network through various configurations. This approach enhances the adaptability, efficiency, and resource management of edge computing networks.

There are three possible configurations for implementing location awareness in edge computing networks: centralized, distributed, and hybrid architectures. In a centralized architecture, the OAM stores the configuration information for all the edge nodes in the area. When an EN C 306 comes online, it downloads this information from the OAM or the control EN A 306 as part of the bootstrap process. After determining its relative location to other edge nodes, the edge node may also be configured to allow the GIS module to identify the applicable edge nodes from the list downloaded from the OAM. All edge nodes with overlapping geographical areas or groups will be considered applicable. This edge node may also have a configuration indicating whether it should act as an edge node leaf or an EN B 306 branch.

In a distributed architecture, a newly deployed edge node may request other edge nodes it may communicate with to share their configuration and capability information, or the existing edge nodes may proactively share this information during the handshake process or setup procedure with the other ENs. Upon receiving the configuration and capability information, the EN triggers the GIS module to determine whether it should be included as part of a group based on its location and the capabilities of other edge nodes. The list may be further refined based on factors such as backup power, CPU, memory, and available resources. The edge node may dynamically join or leave a group as the network environment situation changes.

These configurations highlight the adaptability, efficiency, and resource management provided by location-aware edge computing networks, allowing for seamless integration and real-time response to changes in the network environment.

In a hybrid architecture, each edge node may follow either a centralized or distributed approach as described earlier. Once the applicable groupings of edge nodes are determined, they may either self-configure or report their configuration and capabilities to the configuring entity in the network. The ECP system 350 may include or utilize a computing mesh, an application mesh, and/or a connectivity mesh. For example, the ECP system may include several edge nodes connected by wireless or wired communication links and configured to operate as a computing mesh in which the computing resources of each EN A 306 are shared with one another.

When several edge nodes are part of a computing mesh and simultaneously served by the same cloud server, the ECP system may intelligently and dynamically allocate available cloud computational resources to each end device based on their workload, local computation capacities, and performance requirements. In some embodiments, this may be accomplished by using convex and/or non-convex optimization tools to solve specific optimization problems and derive a detailed resource allocation policy.

The ECP system may determine whether additional computational resources are required, which may be obtained from cloud resources, in addition to the existing cloud resources already being utilized. The ECP system 350 may also obtain computational resources to assist edge nodes and end devices with less computation capacity or heavier workloads, in order to balance resource and workload distributions across multiple edge nodes and improve the platform's overall performance.

The ECP system 350 may be configured to categorize software applications (e.g., latency-sensitive applications) into several major classes based on computational and application requirements. The most basic example of software application categorization involves two major classes. In one example, the ECO may use classes as part of the logic algorithm to determine whether an application may be segmented for potential partial offloading using other resources within the ECP system 350 network.

Below is a brief example of two major application classes. The first class may include applications requiring uninterrupted execution that may not be able to be fragmented, thus necessitating No Offloading (NOL), while the second class may include applications that could benefit from fractional or partial offloading (POL). By identifying which applications may be fractionalized, the ECP system 350 may utilize other devices (edge nodes or end devices) in the program or service's delivery and execution. This knowledge may also be configured to allow the ECP system to employ external resources, such as cloud services, for these tasks. Ultimately, the ECP system may leverage all available resources, including edge nodes, end devices, and external resources, to deliver and execute the program or service.

The ECP system may formulate and solve a joint optimization problem for each class of applications to minimize overall resource consumption across the sub-network, subject to latency, transmission quality, computational budget, and/or transmit power constraints. By jointly optimizing communication and computational resource allocation and offloading the most latency-sensitive computations to an edge node or device, the ECP system may significantly reduce the resource consumption or usage characteristics of the user edge node or end device while meeting the stringent delay requirements for this category of applications.

The ECP system 350 network may be configured to run a computing mesh, an application mesh, and/or a connectivity mesh in a container. The ECP system may offload the main components of an application from an end device (e.g., mobile device, HMD, etc.) to one or more edge nodes or end devices of the ECP system. In addition, the ECP system may offload the main components of an application to one or more cloud computing systems.

The ECP system 350 may be configured to offload the main components of an application to one or more edge nodes, end devices, or cloud computing systems. In addition, the ECP system may enforce rules or policies at the edge of the network or through an edge node, as well as via a mesh network. The system may also manage inputs to applications from different channels with varying resolutions due to channel conditions.

The ECP system may work in conjunction with artificial intelligence/machine learning (AI/ML) components, which may be included in or used by edge nodes, end devices, the ECP system, cloud-based systems, or other components located at the edge of the network. By communicating with AI/ML entities, the ECP system may enhance the delivery and performance of applications. The system may also perform machine learning operations, such as generating node and application performance vectors, applying feature vectors to machine learning models, and generating analysis results to improve the overall performance, delivery, and functionality of applications.

The ECP system may be configured for various interactions between edge nodes, end devices, and cloud services. It may determine the functionalities, capabilities, and resource requirements associated with a particular application, and decide whether to run an application locally, within the ECP system 350 ecosystem, in a cloud environment, or a combination thereof based on these factors.

Below is a brief example of how the resource requirements for an application or function may be run on a particular edge node that is part of the ECP system 350 network. The system may determine the compatibility of various applications with edge nodes in an ECP system 350, which nodes are capable of running specific applications and which nodes lack the necessary internal capabilities, the compatibility of applications with end devices in the ECP system, and/or which devices may run each application and which devices are unable to do so due to limitations in their internal capabilities.

The ECP system may be configured to restrict, limit, or reduce the functions, features, operations, characteristics, or requirements of an application based on the determined functionalities, capabilities, and resource requirements of that application. It may also determine the functionalities, capabilities, and resource availability of components within the ECP system's ecosystem, such as edge nodes, end devices, and cloud networks. This information may be used to adjust the application's attributes based on the available resources in the ECP system, edge nodes, end devices, or cloud networks. For example, the ECP system may reduce the Quality of Service (QoS) of an application if all edge nodes are operating at or near their processing or resource capacities.

A brief example of the connectivity requirements for different applications. The system may determine whether the application requires continuous cloud connectivity, may run if disconnected from the cloud, or may start without cloud connectivity. The ECP system may be configured to restrict, limit, or reduce the functions, features, operations, characteristics, or requirements of an application based on the existence or availability of connectivity between any or all of the edge nodes, end devices, cloud networks, or any other platform that may be needed, utilized, or available to the application.

The ECP system 350 may be configured to determine whether there are multiple resource requests and, if so, to determine the order in which each application obtains the required resources. The ECP system may restrict one application in favor of another with higher priority based on resource requirements, latency requirements, or policy-based decisions.

The edge nodes, end devices, and cloud layer in the ECP system 350 network may include one or more artificial intelligence/machine learning (AI/ML) components. The AI/ML operations may be performed by a single edge node or device, multiple edge nodes or devices, or other devices as part of a computing mesh. The ECP system 350 network may acquire and maintain both user priority and channel state information. ENs 306 may prioritize traffic based on application requirements in real-time, maximizing resources available through a dynamic resource allocation scheme. This dynamic resource allocation scheme may add or remove resources in real-time, enabling better edge performance and ensuring the local computing resources are used to the fullest extent.

Network slicing may be associated with an edge node or end device, either application-specific or based on the required KPI/QoS requirements. The ECP system 350 network slicing uses physical or logical slices, or a combination of both, and may involve static or dynamic allocations. Network slicing may include the use of specific radio spectrum for groups, providing unique routes or connectivity resources to a group of edge nodes and devices.

Network slicing by group may be dynamic, static, or a combination of both. The static slicing allocates particular resources exclusively for a specific application or group. Multiple end devices and edge nodes may be associated with a particular network slice, and they may also be associated with several network slices depending on the bearer traffic and resource requirements.

Network slicing in ECP system 350 may include a Pre-Shared Key (PSK) associated with an end device. Multiple PSKs may be assigned to groups, and a PSK may also be associated with other groups. This flexibility in network slicing may allow for efficient resource allocation and improved performance in the ECP system 350 network.

Network slicing by end device. The ECP system 350 network may be configured to collaboratively execute a resource allocation policy by optimizing a specific objective function, such as minimizing end-to-end latency under a prescribed resource utilization constraint, maximizing mobile energy efficiency under an offloading latency constraint, or an optimally balanced combination of both constraints. The network may monitor the specific requirements of different application tasks in real-time and adaptively adjust the resource allocation to meet diverse user demands according to policies that establish priorities based on certain criteria, such as those associated with different tasks or use cases, user classes, or event triggers.

The ECP system 350 network, using a computing mesh, may distribute and manage resources across all mesh nodes and device nodes, extending the collaborative cloud and edge computing capabilities across an entire edge network. The computing mesh may include both wireless and wired connectivity. The network may consist of or have virtualized applications, which may be executed on the edge layer in another edge node or end device or projected to the cloud layer. By distributing various applications or their subcomponents, a more efficient collective computing environment may be achieved, leveraging all available resources required to process and deliver the service the application is designed to perform.

With ECP system 350, access to remote cloud databases is minimized, significantly reducing end-to-end latency by utilizing the cloud layer as a database retrieval system while performing analytics and other computational requirements within the edge layer itself. The communication resources of the wireless network and the computational resources of the ECP system 350 network may be shared by all edge nodes and end devices within the coverage area of a computing and communication mesh network.

The collaborative hybrid cloud and edge computing supported by the ECP system, along with the unique content-based image retrieval and multicast delivery from edge nodes to end devices within the computing mesh coverage area, may substantially improve end-to-end latency, computational performance, and energy consumption performance of user devices for practical and cost-effective delivery of highly immersive applications.

Collaboration among meshed edge nodes and cloud resources may be facilitated by Kubernetes (K8/K3s), KubeEdge, or another container orchestration system, extending native application orchestration and device management from the cloud layer to end devices operating at the edge layer for orchestration of containerized applications. KubeEdge, which includes CloudCore and EdgeCore, is built upon Kubernetes and provides core infrastructure support for networking, application deployment, and metadata synchronization between the cloud and edge layers.

The ECP system 350 may allow various functions and application delivery to be performed through the use of containers, such as container or similar solutions. The AI/ML components in the ECP system 350 network may be dedicated to a specific EN A 306 and connected through wired or wireless point-to-point configurations. These components may also be connected to the ECP system via an interface located on the edge node or as a component within the ECP system itself.

AI/ML components may be shared with other edge nodes and devices in the ECP system's mesh environment, communicating through wireless or wired mesh configurations. Improved efficiency using AI/ML may also reduce the ECP system 350 resource requirements.

Applications demand a minimum Quality of Experience (QoE), as users are highly sensitive to latency and typically require ultra-low latency and high rates of communication.

The ECP system may facilitate the delivery and execution of applications either on a stand-alone basis or in combination with any number of edge nodes and devices.

Some networks have wireless or constrained wired backhaul connections between edge nodes and cloud computing systems, such as connections to the internet, which are inherently unreliable. Other constrained connections may exist between edge nodes, or between edge nodes and end devices. ENs 306 and devices may have limited resources, as they may not be able to be physically augmented dynamically. Specifically, resource limitations on end devices may impede their ability to perform the desired application functions.

In an ECP system 350 environment, end devices, whether they are edge nodes or a combination of multiple devices, may perform multiple functions and applications. However, they may not be able to run all applications based on the available resources at the time the application starts or while it is running. The ECP system may provide sufficient processing capacity, RAM, and storage from a single edge node or device or from a local network of edge nodes and devices that form a multi-layer computing mesh.

ECP system 350 may determine an application class type for each application to be run on the ecosystem, assess the capabilities of each device in the ECP system, and evaluate available cloud network resources. Based on the determined application class, end device capabilities, and cloud computing capabilities, ECP system 350 may decide whether to allow an application to run on an edge node or device and how it should be executed.

Some applications may run or continue to run on the edge node or device, even when isolated or cut off from the rest of the network, which may include other edge nodes or devices in the same group(s), external resources like cloud network resources, or a combination thereof. Edge nodes and devices in the ECP system may communicate with other local end devices to determine whether another device has the necessary capabilities. Alternatively, the edge node or device may communicate with other edge computing devices in the ECP system to ascertain whether specific application functions may be better performed by those platforms.

The capabilities and requirements may include security and application requirements necessary to collect, process, and deliver the appropriate application or service(s). In the ECP system 350 network, if connected end devices lack the required capability for a particular application, the end device will signal back to an application store or a similar database that it may not be able to accept or run the application as requested. If the edge node or device does not have the necessary resources, it registers which functions need to be executed on other platforms.

The ECP system 350 may determine where the required functions may or should be run to fulfill the necessary tasks. When an edge node receives multiple requests to initiate an application or function, its resources may be insufficient to complete the required tasks. In such cases, the edge node may inform the elastic ECP system 350 of the need for additional resources, whether from another node, device, or external platform.

The ECP system may evaluate other resources in the local mesh environment for performing the function. If another edge node or device in the local mesh environment may run the function, it is assigned to that edge node or device for execution. However, depending on the current status of each edge computing node or device in the local mesh environment, the functions may need to be processed in an external system, such as a cloud environment.

An edge node or device may perform at least one portion of the software application in response to sending a capabilities message identifying the portions of the software application it may run. With ECP system 350, the edge node or device may receive an updated request message identifying one or more portions of the software application to be performed by the edge node or device. The edge node or device may then perform the identified portions of the software application in response to receiving the updated request message.

ECP system 350 may be configured to combine the advantages of remote cloud servers and close-by end devices, providing a powerful collaborative cloud and edge computing system that improves performance, end-to-end latency, and resource consumption in the delivery and execution of applications and services. These networks may intelligently and efficiently balance trade-offs between performance and latency or resource capacity and latency by intelligently partitioning, organizing, and distributing tasks and information among edge nodes, devices, and cloud servers.

In some embodiments, the ECP system may include multiple edge computing systems connected in a mesh environment, with heterogeneous hardware where different edge computing nodes or devices have various capabilities depending on their internal architectures, including CPU type, RAM, storage, wireless and wired capabilities, as well as kernel capabilities and versions. This heterogeneous environment may also include edge nodes or devices with identical platforms but operating with different software versions.

The ECP system may include a processor (e.g., an edge node processor, etc.) configured with processor-executable software instructions to implement or perform dynamic and/or self-adaptive methods. The processor may reallocate end devices 102 to different edge nodes 306, 308 based on available resources. The processor may configure edge nodes and end devices to work together to optimize resource allocation and overall performance. The processor may reallocate end devices to different edge nodes based on the available resources on each edge node. Such operations may ensure efficient utilization of computing power and other resources.

The processor may optimize its radio spectrum usage for front haul or backhaul, share resources to improve performance, and/or run a computing mesh, an application mesh, and/or a connectivity mesh in a container. The processor may dynamically group edge nodes and end devices, generate an N-Dimensional correlation for edge nodes and devices, perform network automation, network slicing, reallocation operations, divide software applications, and enforce rules or policies via an edge node and/or at the network's edge. The processor may dynamically group edge nodes and/or end devices, which may include sharing collective information about all edge nodes and associated devices, running containers on edge nodes and devices, dynamically allocating container groups, dynamically reallocating group memberships, and/or using different groups or collectives to enhance resiliency or functionality. The processor may be configured network automation operations, which may include sharing collective information about edge nodes and associated end devices, performing functions without manual intervention, executing discrete tasks with a single objective, loading new configuration files to edge computing platforms, facilitating node communication over multiple hops, and allowing the network to reconfigure itself to support specific services or address outages. The processor may also be configured to allow hypercube deployment and information sharing among nodes for automatic deployment, configuration, and service provision.

The processor may also be configured to allow network slicing in the ECP system, which may be vertical, horizontal, diagonal, or a combination thereof. The network slicing operations may include reallocating resources within edge nodes and devices, both within groups and between groups, for reasons such as stable power, reliable backhaul, and other factors. The processor may also be configured to allow reallocation in the ECP system, which may include reallocating applications in a vertical domain, securely deploying applications on edge nodes across shared resources, and employing vertical, horizontal, diagonal, or any combination of reallocations. Applications may be run and processed elsewhere, including moving from edge nodes to the cloud, cloud to edge nodes, end devices to the cloud, edge nodes to end devices, and end devices to edge nodes. This flexibility may allow for improved network performance, adaptability, and efficiency in various scenarios.

The processor may also be configured to generate an N-Dimensional correlation for edge nodes. The processor may be configured to allow edge nodes them to be automatically formed into logical groups, including associations of common criteria, automatic formation of logical groups, overlapping groupings, and formation of multiple group memberships or associations for edge nodes and devices. This grouping may involve edge nodes only, end devices only, or a combination of both, allowing for a flexible and adaptive system that caters to various network requirements and configurations. The processor may also be configured to store frequently accessed information for common groups in an edge database on the edge node or device.

The processor may also be configured to divide software applications, which may include categorizing them into several major classes based on computational and application requirements. The processor may also determine whether an application may be segmented for potential partial offloading using other resources within the ECP system 350 network. Offloading the main components of the application may occur from an end device (such as a mobile device or HMD) to one or more edge nodes, end devices, or cloud computing systems within the ECP system. Such offloading may provide flexibility and adaptability in the network.

The processor may also be configured to enforce rules or policies via an edge node (e.g., EN 306, etc.) and/or at the edge of the network, which may include implementing edge nodes through a mesh network, managing inputs to applications from different channels with varying resolutions due to channel conditions, and using a computing mesh that may be distributed and managed across all mesh nodes and/or device nodes. The enforcement operations may ensure that the ECP system operates securely and efficiently, adhering to set guidelines and maintaining optimal performance.

Figure 58:
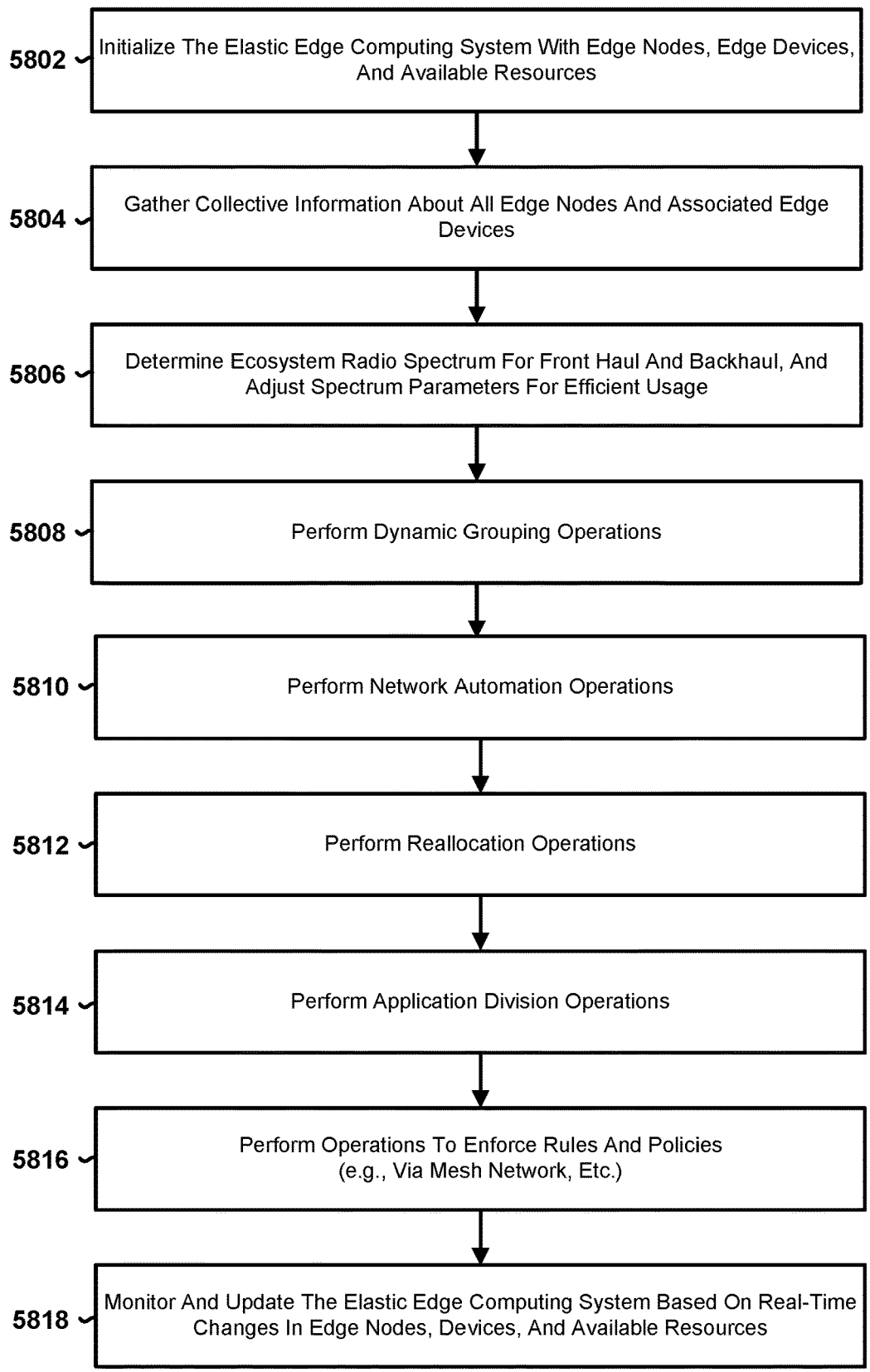
FIG. 58 is a process flow diagram illustrating a method of operating edge nodes and devices in an elastic edge computing (EEC) system to use available resources more efficiently and/or to otherwise improve the performance and functioning of the edge network in accordance with some embodiments.

FIG. 58 illustrates a method 5800 of utilizing edge nodes and devices in an Elastic Edge Computing (EEC) system, such as ECP system 350, to use available resources more efficiently and otherwise improve the performance and functioning of the edge network in accordance with some embodiments. The operations of method 5800 may be performed by one or more processors in one or more edge nodes (e.g., edge devices 106, EN 306, etc.).

In block 5802, the processor may initialize the elastic edge computing system (e.g., ECP system 350) with edge nodes, edge devices, and available resources. For example, the processor may configure edge device(s) with necessary software and hardware components, identify available edge nodes within the network, etc. In block 5804, the processor may gather collective information about all edge nodes and associated edge devices. In some embodiments, the processor may continuously monitor the available resources (e.g., compute power, memory, bandwidth) on edge nodes and edge devices, and report the resource usage and availability to other edge devices or to a centralized or distributed resource management system.

In block 5806, the processor may determine ecosystem radio spectrum for front haul and backhaul and adjust spectrum parameters for efficient usage. In various embodiments, as part of the operations in block 5806, the processor may allocate tasks to edge nodes and edge devices based on resource availability and current workload, periodically evaluate the efficiency of the current allocation, reallocate tasks based on the updated resource availability information (e.g., if the allocation is deemed inefficient, etc.), optimize the use of radio spectrum for front-haul and backhaul connections, share resources among edge nodes and devices to improve application delivery or resilience, and/or implement a computing mesh, application mesh, or connectivity mesh within a container to provide a flexible and adaptive infrastructure.

In block 5808, the processor may perform dynamic grouping operations. Dynamic grouping operations may allow for the automatic formation of logical groups based on common criteria, enabling more efficient resource sharing among edge nodes and devices. In some embodiments, the dynamic grouping operations may include sharing collective information about edge nodes and devices, identifying common criteria for grouping edge nodes and devices, forming logical groups of edge nodes and devices using N-Dimensional correlation based on common criteria, allowing overlapping groupings and multiple group associations for edge nodes and devices, and updating and/or maintaining groups as new edge nodes and devices are added to the EEC system. In some embodiments, the dynamic grouping operations may include sharing collective information about all edge nodes and associated edge devices, grouping containers within and between edge nodes and devices based on their resource requirements and availability, dynamically allocating container groups, allowing new edge nodes and devices to join and automatically form groups, and enabling dynamic reallocation of group memberships for edge nodes and devices.

In block 5812, the processor may perform network automation operations. Network automation may simplify network management and allow the system to perform functions without manual intervention or adapting to specific services or network outages. In some embodiments, the network automation operations may include sharing collective information about edge nodes and devices, performing functions without manual intervention, loading new configuration files to edge computing platforms, enabling multi-hop communication between nodes, allowing network reconfiguration to support specific services or address network outages, and/or implementing hypercube deployment for automatic deployment, configuration, and/or service provisioning.

In block 5814, the processor may perform reallocation operations. The reallocation operations may reduce or minimize latency by strategically relocating applications to the most suitable edge nodes, devices, or cloud systems. In some embodiments, the reallocation operations may include identifying applications that require reallocation, determine the type of reallocation (e.g., vertical, horizontal, diagonal, combination, etc.), and reallocating applications to minimize latency and/or improve performance.

In block 5816, the processor may perform application division operations. The application division operations may efficiently divide software applications based on their computational and application requirements, offloading parts of the applications to appropriate resources within the network. In some embodiments, the application division operations may include dividing software applications into classes based on computational and application requirements, determining whether the applications may be partially offloaded using elastic edge network resources and offloading main components of the application to appropriate edge nodes, devices, or cloud computing systems.

In block 5818, the processor may perform operations to enforce rules and policies (e.g., via mesh network, etc.). These operations may help ensure adherence to established rules and policies via a mesh network, managing inputs from various channels and distributing the computing mesh across nodes and devices. In some embodiments, the processor may utilize a mesh network for enforcing rules and policies, manage inputs to applications from different channels with varying characteristics, and distribute and manage computing mesh across all mesh nodes and device nodes.

In block 5820, the processor may monitor and update the elastic edge computing system based on real-time changes in edge nodes, devices, and available resources. These operations may generate more agile, robust, and high-performing networks and/or computing devices at the edge of the network. These operations may also optimize the allocation of resources, improve network performance, and enhance resilience by dynamically adapting to changes in the environment.

Figure 59:
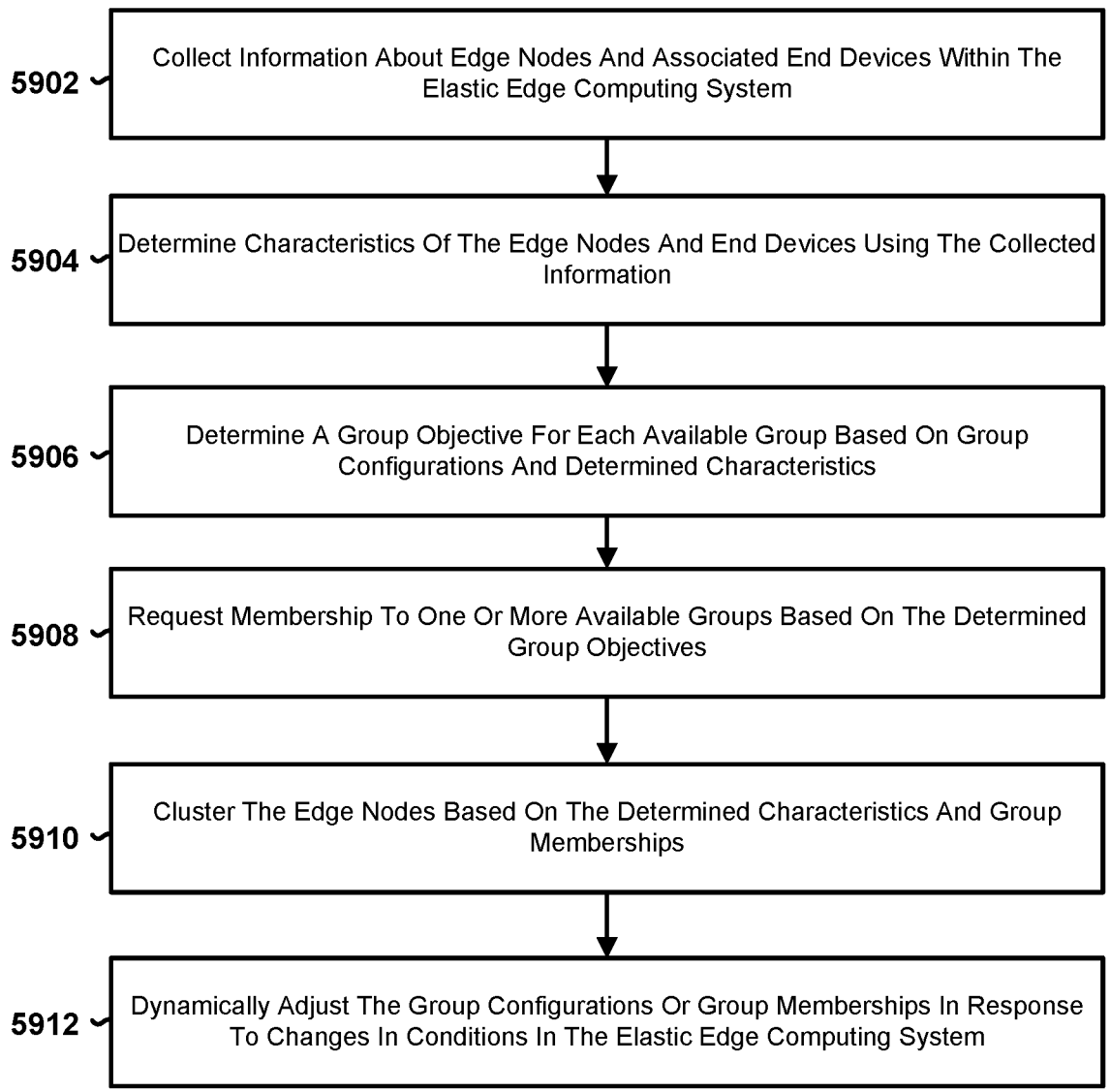
FIG. 59 is a process flow diagram illustrating a method of dynamically grouping edge nodes within an elastic edge computing system in accordance with some embodiments.

FIG. 59 illustrates a method 5900 of dynamically grouping edge nodes within an elastic edge computing system (e.g., ECP system 350) in accordance with some embodiments. This dynamic grouping may allow the ECP system 350 to dynamically adapt to changing conditions and optimize resource allocation by intelligently clustering nodes based on their characteristics, group objectives, and N-dimensional correlation. The operations of method 5900 may be performed by one or more processors in one or more edge nodes (e.g., edge devices 106, EN 306, etc.).

In block 5902, the processor may collect information about edge nodes and associated end devices within the elastic edge computing system. In block 5904, the processor may determine the characteristics of the edge nodes and end devices using the collected information.

In block 5906, the processor may determine a group objective for each available group based on group configurations and determined characteristics. For example, the processor may use the collected information to determine the characteristics of nodes and devices, such as their capabilities, location, network parameters, and more. Based on these characteristics, the processor may define a group objective for each available group that outlines the desired configuration and purpose of the group. By defining group objectives, the processor may allocate resources and tasks efficiently, ensuring that edge nodes and end devices with similar characteristics and requirements collaborate seamlessly. For example, the processor may identify and match edge nodes and end devices with similar characteristics, capabilities, and requirements, ensuring that they may collaborate efficiently within the group. In addition, setting group objectives may enable the processor to better adapt to dynamic changes in the system, such as variations in resource availability, network conditions, or application requirements.

In some embodiments, determining a group objective may include determining a specific goal or set of goals that a collection of edge nodes and end devices may achieve within an elastic edge computing system. Examples of such goals may include network optimization, security enhancement, energy efficiency, data processing and analytics, emergency recovery and redundancy, etc. In some embodiments, the processor may determine group objectives based on any or all of device capabilities, intended functions or services, communication protocols, network architecture, redundancy, resiliency, geographic coverage, security, privacy, performance metrics, quality of service (QoS) criteria, energy consumption, device management, data storage, processing requirements, and container distribution.

In various embodiments, the processor may determine the group objective for each of the plurality of available groups by determining a specific set of device capabilities or resources required for each group, determining an intended function or service to be provided by the edge nodes within each group, determining a specific communication protocol or network architecture to be used by the edge nodes within each group, determining a desired level of redundancy or resiliency for each group, determining a specific geographic coverage area or proximity for each group, determining a specific set of security or privacy requirements for each group, determining a specific set of performance metrics or quality of service (QoS) criteria for each group, determining a specific set of energy consumption or power management requirements for each group, determining a specific set of device management or maintenance requirements for each group, determining a specific set of data storage or processing requirements for each group, and/or determining a distribution of containers within the edge nodes, between edge nodes, within end devices, between end devices, and/or between edge nodes and end devices.

In block 5908, the processor may request membership to one or more available groups based on the determined group objectives. In block 5910, the processor may cluster the edge nodes based on the determined characteristics and group memberships. In some embodiments, the edge nodes and/or end devices run containers, and the method may further include dynamically allocating container groups within the edge nodes, between edge nodes, within end devices, between end devices, and/or between edge nodes and end devices. In block 5912, the processor may dynamically adjust the group configurations or group memberships in response to changes in conditions in the elastic edge computing system. That is, the processor may continuously monitor the performance and status of edge nodes and end devices within each group, as well as any changes in the overall system, and dynamically adjust group memberships and configurations to optimize resource allocation and improve system performance based on the results of the monitoring.

In some embodiments, the method may further include dynamically allocating container groups within the edge nodes, between edge nodes, within end devices, between end devices, or between edge nodes and end devices. In some embodiments, the method may further include grouping the containers based on information collected about the containers running on the edge nodes and end devices. In some embodiments, the method may further include using a hierarchy to deploy containers into known groups to allow for seamless integration of new edge nodes and end devices.

In some embodiments, the method may further include monitoring the performance of the containers within the edge nodes, between edge nodes, within end devices, between end devices, or between edge nodes and end devices, and dynamically adjusting group configurations or memberships based on the monitored performance. In some embodiments, the method may further include offloading main components of an application from an end device to one or more edge nodes, end devices, or cloud computing systems running containers.

In some embodiments, the method may further include using a container orchestration system, such as Kubernetes or KubeEdge to facilitate collaboration among meshed edge nodes and cloud resources. In some embodiments, the method may further include to using container technologies, such as "containerd", for the execution of various functions and application delivery within the elastic edge computing system. In some embodiments, the method may further include enabling AI/ML components in the elastic edge computing system network to be dedicated to a specific edge node and connected through wired or wireless point-to-point configurations or via an interface located on the edge node or as a component within the elastic edge computing system itself.

Figure 60:
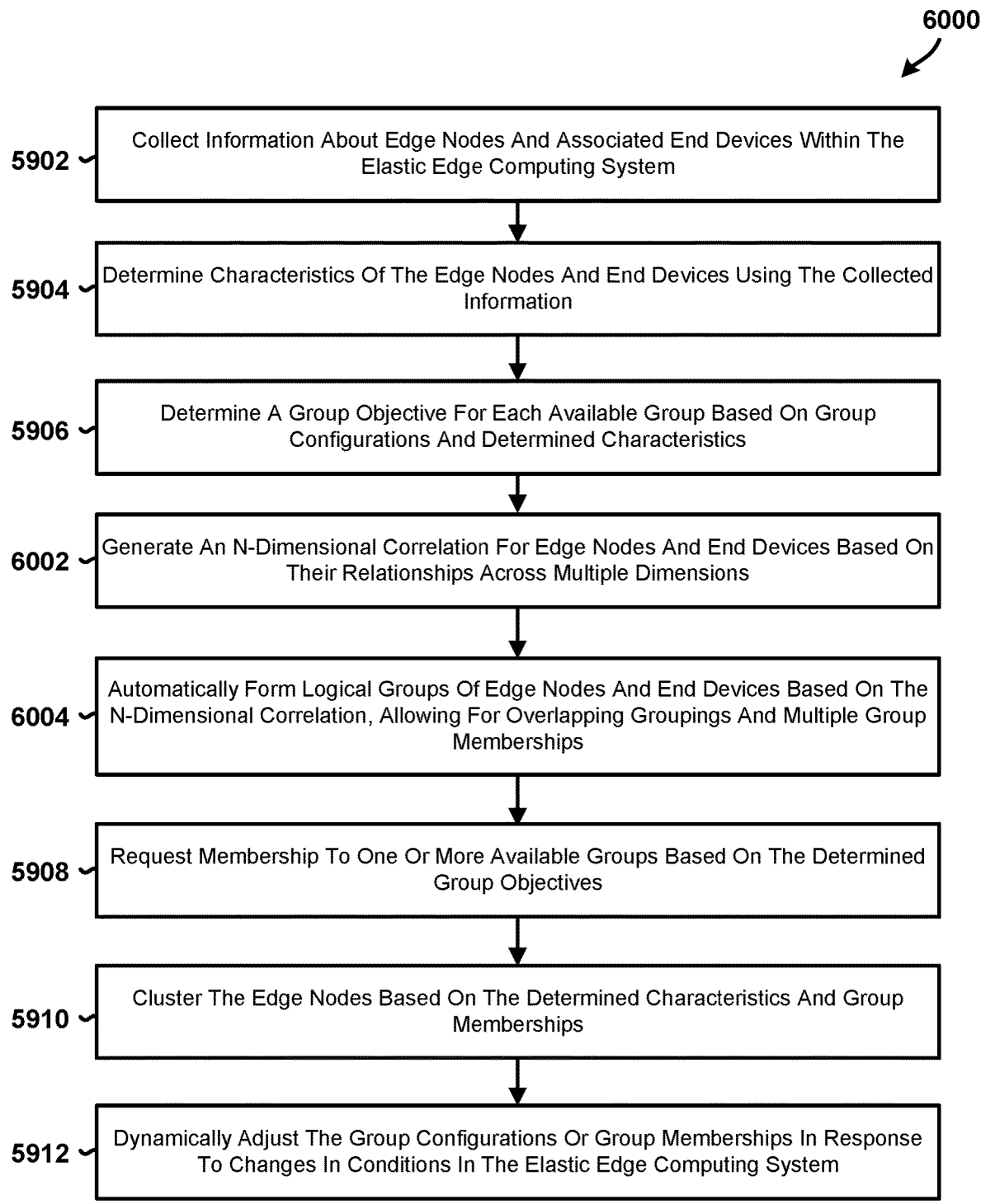
FIG. 60 is a process flow diagram illustrating another method of dynamically grouping edge nodes within an elastic edge computing system in accordance with some embodiments.

FIG. 60 illustrates another method 6000 of dynamically grouping edge nodes within an elastic edge computing system (e.g., ECP system 350) in accordance with some embodiments. This dynamic grouping may allow the ECP system 350 to dynamically adapt to changing conditions and optimize resource allocation by intelligently clustering nodes based on their characteristics, group objectives, and N-dimensional correlation. The operations of method 6000 may be performed by one or more processors in one or more edge nodes (e.g., edge devices 106, EN 306, etc.).

In block 5902-5906, the processor may perform the operations discussed above with reference to FIG. 59. In block 6002, the processor may generate an N-dimensional correlation for edge nodes and end devices based on their relationships across multiple dimensions. For example, the processor may determine relationships among the nodes and devices across multiple dimensions, identify a set of common criteria representing similarities among the various nodes and/or devices, and use criteria to allocate each node and device to an appropriate logical group. In various embodiments, generating the N-dimensional correlation for edge nodes and end devices across multiple dimensions may include generating an N-dimensional correlation for edge nodes and end devices across any or all of device capabilities, scalability, device location, network parameters, application requirements, device classification, power consumption, security requirements, privacy requirements, device reliability, resource availability, and/or device interoperability information. In some embodiments, generating the N-dimensional correlation may include using machine learning or clustering to generate the N-dimensional correlation for edge nodes and end devices. In block 6004 the processor may automatically form logical groups of edge nodes and end devices based on the N-dimensional correlation, allowing for overlapping groupings and multiple group memberships. In block 5908-5912, the processor may perform the operations discussed above with reference to FIG. 59.

Figure 61:
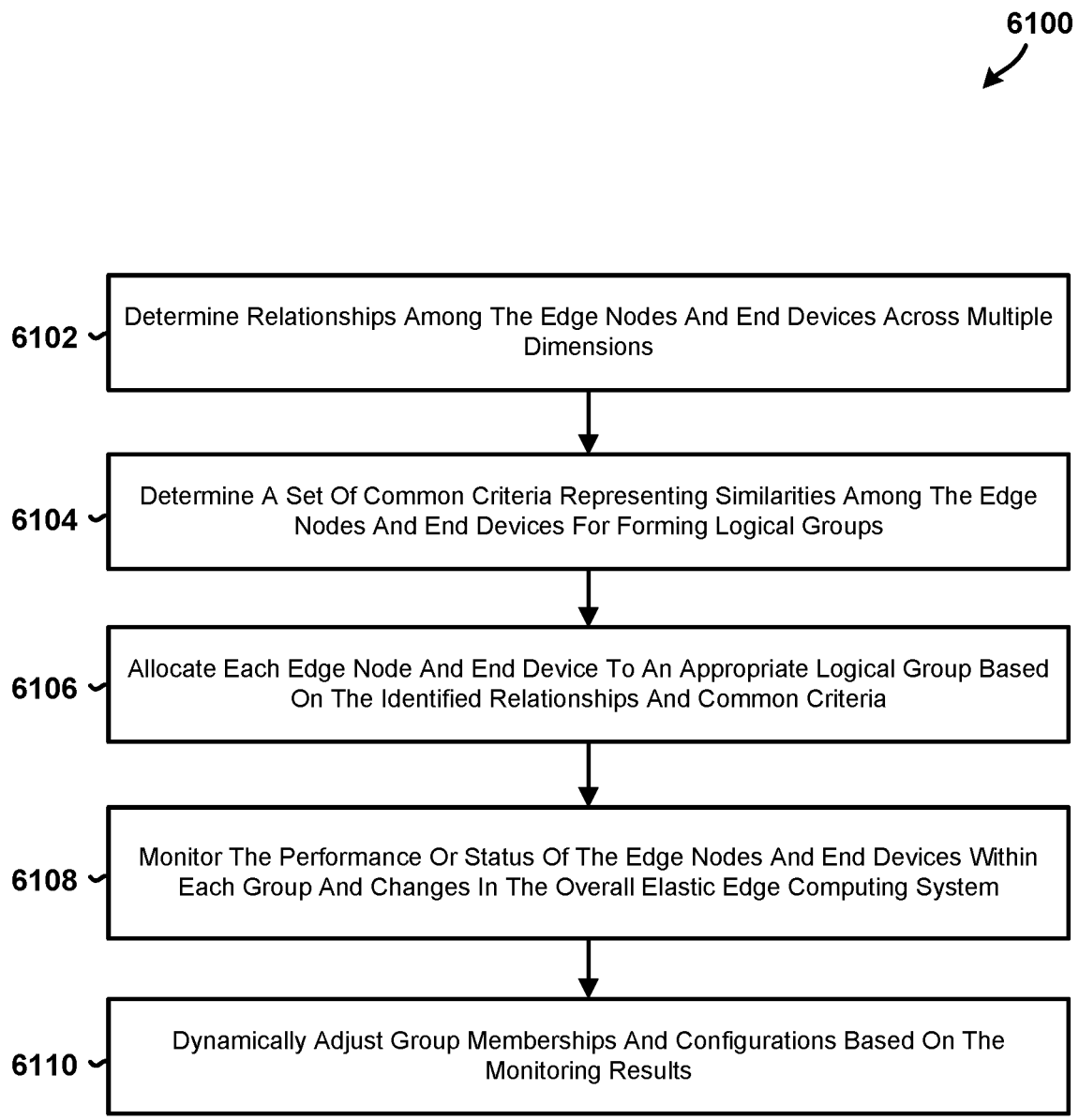
FIG. 61 is a process flow diagram illustrating a method of generating an N-dimensional correlation for edge nodes and end devices across multiple dimensions in accordance with some embodiments.

FIG. 61 illustrates method 6100 of generating the N-dimensional correlation for edge nodes and end devices across multiple dimensions in accordance with some embodiments. The operations of method 6100 may be performed by one or more processors in one or more edge nodes (e.g., edge devices 106, EN 306, etc.).

In block 6102, the processor may determine relationships among the edge nodes and end devices across multiple dimensions. The multiple dimensions may include any or all of device capabilities, scalability, device location, network parameters, application requirements, device classification, power consumption, security requirements, privacy requirements, device reliability, resource availability, and/or device interoperability information. In block 6104, the processor may determine a set of common criteria representing similarities among the edge nodes and end devices for forming logical groups. In block 6106, the processor may allocate each edge node and end device to an appropriate logical group based on the identified relationships and common criteria. In block 6108, the processor may monitor the performance or status of the edge nodes and end devices within each group and changes in the overall elastic edge computing system. In block 6110, the processor may dynamically adjust group memberships and configurations based on the monitoring results.

The processors discussed in this application may be any programmable microprocessor, microcomputer or multiple processor chip or chips that may be configured by software instructions (applications) to perform a variety of functions, including the functions of the various aspects described in this application. In some wireless devices, multiple processors may be provided, such as one processor dedicated to wireless communication functions and one processor dedicated to running other applications. Typically, software applications may be stored in the internal memory before they are accessed and loaded into the processor. The processor may include internal memory sufficient to store the application software instructions.

As used in this application, the terms "component," "module," "system," and the like may refer to a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

Various aspects illustrated and described are provided merely as examples to illustrate various features of the claims. However, features shown and described with respect to any given aspect are not necessarily limited to the associated aspect and may be used or combined with other aspects that are shown and described. Further, the claims are not intended to be limited by any one example aspect. For example, one or more of the operations of the methods may be substituted for or combined with one or more operations of the methods.

The foregoing method descriptions and the process flow diagrams are provided merely as illustrative examples and are not intended to require or imply that the operations of various aspects must be performed in the order presented. As will be appreciated by one of skill in the art the order of operations in the foregoing aspects may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the aspects disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such aspect decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. In addition, the operations of a method or algorithm may reside as one or any combination or set of codes and/or instructions on a non-transitory processor-readable storage medium and/or computer-readable storage medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects without departing from the scope of the claims. Thus, the present disclosure is not intended to be limited to the aspects shown herein but is to be accorded the widest scope consistent with the following claims and the principles and novel features disclosed herein.

What is claimed is:

1. A method of dynamically grouping edge nodes within an elastic edge computing system that includes a container orchestration service and a mesh of edge nodes that communicate over wired or wireless links, the method comprising:
    collecting, by a processor in an edge node, information about the edge nodes and associated end devices within the elastic edge computing system;
    using, by the processor, the collected information to determine characteristics of the edge nodes and end devices;
    determining, by the processor, a group objective for each of a plurality of available groups based on group configurations and the determined characteristics;
    requesting, by the processor, membership to one or more of the plurality of available groups based on the determined group objectives;
    clustering, by the processor, the edge nodes based on the determined characteristics and group memberships; and
    dynamically adjusting, by the processor, group configurations or the group memberships in response to changes in conditions in the elastic edge computing system,
    wherein the dynamic adjustments include at least one of:
        instantiating a container on a selected edge node,
        reassigning an application instance or an end device to the selected edge node, and
        defining a packet route between the selected edge node and a prior edge node, an end device, or a cloud service.

2. The method of claim 1, wherein determining the group objective for each of the plurality of available groups based on the group configurations and the characteristics of the edge node comprises one or more of:
    determining a specific set of device capabilities or resources for each group;
    determining an intended function or service to be provided by the edge nodes within each group;
    determining a specific communication protocol or network architecture to be used by the edge nodes within each group;
    determining a desired level of redundancy or resiliency for each group;
    determining a specific geographic coverage area or proximity for each group;
    determining a specific set of security or privacy requirements for each group;

determining a specific set of performance metrics or quality of service (QOS) criteria for each group;
determining a specific set of energy consumption or power management requirements for each group;
determining a specific set of device management or maintenance requirements for each group;
determining a specific set of data storage or processing requirements for each group; or
determining a distribution of containers within the edge nodes, between edge nodes, within end devices, between end devices, or between edge nodes and end devices.

3. The method of claim 1, wherein:
the edge nodes and end devices run containers; and
the method further comprises dynamically allocating container groups:
within the edge nodes,
between edge nodes,
within end devices,
between end devices, or
between edge nodes and end devices.

4. The method of claim 1, further comprising:
determining relationships among the edge nodes and end devices across multiple dimensions;
determining a set of common criteria representing similarities among the edge nodes and end devices for forming logical groups;
automatically forming logical groups of edge nodes and end devices based on the determined common criteria, wherein each group consists of devices sharing similar characteristics or devices configured to implement a corresponding group objective;
allocating each edge node and end device to an appropriate logical group based on the identified relationships and common criteria;
monitoring a performance or status of the edge nodes and end devices within each group and changes in the overall elastic edge computing system; and
dynamically adjusting group memberships and configurations based on a result of the monitoring.

5. The method of claim 1, further comprising dynamically forming, by the processor, a group based on two or more of a unique identifier parameter, edge node capability parameter, an edge node location parameter, a subnet parameter, an application parameter, a classification parameter, or an amount of time one or more of the edge nodes or associated end devices have been active and connected to the elastic edge computing system.

6. The method of claim 1, further comprising:
generating, by the processor, an N-dimensional correlation for edge nodes and end devices based on their relationships across multiple dimensions; and
automatically forming, by the processor, logical groups of edge nodes and end devices based on the N-dimensional correlation, wherein the logical groups may include overlapping groupings and multiple group memberships.

7. The method of claim 6, wherein generating the N-dimensional correlation for edge nodes and end devices across multiple dimensions comprise one or more of:
generating the N-dimensional correlation for edge nodes and end devices based on collected information, the collected information identifying at least one or more of device capabilities, scalability, device location, network parameters, application requirements, device classification, power consumption, security requirements, privacy requirements, device reliability, resource availability, or device interoperability information; or
using machine learning or clustering to generate the N-dimensional correlation for edge nodes and end devices.

8. An edge node, comprising:
a processor configured to:
collect information about edge nodes and associated end devices within an elastic edge computing system that includes a container orchestration service and a mesh of edge nodes that communicate over wired or wireless links;
use the collected information to determine characteristics of the edge nodes and end devices;
determine a group objective for each of a plurality of available groups based on group configurations and the determined characteristics;
request membership to one or more of the plurality of available groups based on the determined group objectives;
cluster the edge nodes based on the determined characteristics and group memberships; and
dynamically adjust group configurations or the group memberships in response to changes in conditions in the elastic edge computing system,
wherein the dynamic adjustments include at least one of:
instantiating a container on a selected edge node,
reassigning an application instance or an end device to the selected edge node, and
defining a packet route between the selected edge node and a prior edge node, an end device, or a cloud service.

9. The edge node of claim 8, wherein the processor is configured to determine the group objective for each of the plurality of available groups based on the group configurations and the characteristics of the edge node by determining one or more of:
a specific set of device capabilities or resources for each group;
an intended function or service to be provided by the edge nodes within each group;
a specific communication protocol or network architecture to be used by the edge nodes within each group;
a desired level of redundancy or resiliency for each group;
a specific geographic coverage area or proximity for each group;
a specific set of security or privacy requirements for each group;
a specific set of performance metrics or quality of service (QOS) criteria for each group;
a specific set of energy consumption or power management requirements for each group;
a specific set of device management or maintenance requirements for each group;
a specific set of data storage or processing requirements for each group; or
a distribution of containers within the edge nodes, between edge nodes, within end devices, between end devices, or between edge nodes and end devices.

10. The edge node of claim 8, wherein the edge nodes and end devices run containers, and wherein the processor is configured to dynamically allocate container groups within the edge nodes, between edge nodes, within end devices, between end devices, or between edge nodes and end devices.

11. The edge node of claim 8, wherein the processor is further configured to:
- determine relationships among the edge nodes and end devices across multiple dimensions;
- determine a set of common criteria representing similarities among the edge nodes and end devices for forming logical groups;
- automatically form logical groups of edge nodes and end devices based on the determined common criteria, wherein each group consists of devices sharing similar characteristics or devices configured to implement a corresponding group objective;
- allocate each edge node and end device to an appropriate logical group based on the identified relationships and common criteria;
- monitor a performance or status of the edge nodes and end devices within each group and changes in the overall elastic edge computing system; and
- dynamically adjust group memberships and configurations based on a result of the monitoring.

12. The edge node of claim 8, wherein the processor is further configured to dynamically form a group based on two or more of a unique identifier parameter, edge node capability parameter, an edge node location parameter, a subnet parameter, an application parameter, a classification parameter, or an amount of time one or more of the edge nodes or associated end devices have been active and connected to the elastic edge computing system.

13. The edge node of claim 8, wherein the processor is further configured to:
- generate an N-dimensional correlation for edge nodes and end devices based on their relationships across multiple dimensions; and
- automatically form logical groups of edge nodes and end devices based on the N-dimensional correlation, wherein the logical groups may include overlapping groupings and multiple group memberships.

14. The edge node of claim 13, wherein the processor is configured to generate the N-dimensional correlation for edge nodes and end devices across multiple dimensions by:
- generating the N-dimensional correlation for edge nodes and end devices based on collected information, the collected information identifying at least one or more of device capabilities, scalability, device location, network parameters, application requirements, device classification, power consumption, security requirements, privacy requirements, device reliability, resource availability, or device interoperability information; or
- using machine learning or clustering to generate the N-dimensional correlation for edge nodes and end devices.

15. A non-transitory computer readable storage medium having stored thereon processor-executable software instructions configured to cause a processor to perform operations for dynamically grouping edge nodes within an elastic edge computing system that includes a container orchestration service and a mesh of edge nodes that communicate over wired or wireless links, the operations comprising:
- collecting information about edge nodes and associated end devices within the elastic edge computing system;
- using the collected information to determine characteristics of the edge nodes and end devices;
- determining a group objective for each of a plurality of available groups based on group configurations and the determined characteristics;
- requesting membership to one or more of the plurality of available groups based on the determined group objectives;
- clustering the edge nodes based on the determined characteristics and group memberships; and
- dynamically adjusting the group configurations or group memberships in response to changes in conditions in the elastic edge computing system,
- wherein the dynamic adjustments include at least one of:
  - instantiating a container on a selected edge node,
  - reassigning an application instance or an end device to the selected edge node, and
  - defining a packet route between the selected edge node and a prior edge node, an end device, or a cloud service.

16. The non-transitory computer readable storage medium of claim 15, wherein the stored processor-executable software instructions are configured to cause a processor to perform operations such that determining the group objective for each of the plurality of available groups based on the group configurations and the characteristics of the edge node comprises one or more of:
- determining a specific set of device capabilities or resources for each group;
- determining an intended function or service to be provided by the edge nodes within each group;
- determining a specific communication protocol or network architecture to be used by the edge nodes within each group;
- determining a desired level of redundancy or resiliency for each group;
- determining a specific geographic coverage area or proximity for each group;
- determining a specific set of security or privacy requirements for each group;
- determining a specific set of performance metrics or quality of service (QOS) criteria for each group;
- determining a specific set of energy consumption or power management requirements for each group;
- determining a specific set of device management or maintenance requirements for each group;
- determining a specific set of data storage or processing requirements for each group; or
- determining a distribution of containers within the edge nodes, between edge nodes, within end devices, between end devices, or between edge nodes and end devices.

17. The non-transitory computer readable storage medium of claim 15, wherein the stored processor-executable software instructions are configured to cause a processor to perform operations such that the edge nodes and end devices run containers, the method further comprising dynamically allocating container groups within the edge nodes, between edge nodes, within end devices, between end devices, or between edge nodes and end devices.

18. The non-transitory computer readable storage medium of claim 15, wherein the stored processor-executable software instructions are configured to cause a processor to perform operations further comprising:
- determining relationships among the edge nodes and end devices across multiple dimensions;
- determining a set of common criteria representing similarities among the edge nodes and end devices for forming logical groups;
- automatically forming logical groups of edge nodes and end devices based on the determined common criteria, wherein each group consists of devices sharing similar characteristics or devices configured to implement a corresponding group objective;

allocating each edge node and end device to an appropriate logical group based on the identified relationships and common criteria;

monitoring a performance or status of the edge nodes and end devices within each group and changes in the overall elastic edge computing system; and dynamically adjusting group memberships and configurations based on a result of the monitoring.

19. The non-transitory computer readable storage medium of claim 15, wherein the stored processor-executable software instructions are configured to cause a processor to perform operations further comprising dynamically forming, by the processor, a group based on two or more of a unique identifier parameter, edge node capability parameter, an edge node location parameter, a subnet parameter, an application parameter, a classification parameter, or an amount of time one or more of the edge nodes or associated end devices have been active and connected to the elastic edge computing system.

20. The non-transitory computer readable storage medium of claim 15, wherein the stored processor-executable software instructions are configured to cause a processor to perform operations further comprising:

generating, by the processor, an N-dimensional correlation for edge nodes and end devices based on their relationships across multiple dimensions; and automatically forming, by the processor, logical groups of edge nodes and end devices based on the N-dimensional correlation, wherein the logical groups may include overlapping groupings and multiple group memberships, wherein generating the N-dimensional correlation for edge nodes and end devices across multiple dimensions comprise one or more of:

generating the N-dimensional correlation for edge nodes and end devices based on collected information, the collected information identifying at least one or more of device capabilities, scalability, device location, network parameters, application requirements, device classification, power consumption, security requirements, privacy requirements, device reliability, resource availability, or device interoperability information; or using machine learning or clustering to generate the N-dimensional correlation for edge nodes and end devices.

* * * * *